(12) United States Patent
Locke

(10) Patent No.: US 11,902,664 B2
(45) Date of Patent: Feb. 13, 2024

(54) CELLULAR TELEPHONE WITH PROTRACTING MONITOR SCREEN AND CAMERA

(71) Applicant: Adam Artell Locke, Fort Dix, NJ (US)

(72) Inventor: Adam Artell Locke, Fort Dix, NJ (US)

(73) Assignee: Adam A. Locke, Racine, WI (US)

( * ) Notice: Subject to any disclaimer, the term of this patent is extended or adjusted under 35 U.S.C. 154(b) by 0 days.

(21) Appl. No.: 17/300,682

(22) Filed: Sep. 22, 2021

(65) Prior Publication Data

US 2023/0092100 A1    Mar. 23, 2023

(51) Int. Cl.
| | | |
|---|---|---|
| *H04N 23/695* | (2023.01) | |
| *G06F 3/0338* | (2013.01) | |
| *H04R 1/02* | (2006.01) | |
| *G06F 3/16* | (2006.01) | |
| *H04M 1/03* | (2006.01) | |
| *H04N 23/62* | (2023.01) | |
| *H04N 23/63* | (2023.01) | |
| *H04N 23/66* | (2023.01) | |

(Continued)

(52) U.S. Cl.
CPC ......... *H04N 23/695* (2023.01); *G06F 3/0338* (2013.01); *G06F 3/165* (2013.01); *H04M 1/03* (2013.01); *H04N 23/531* (2023.01); *H04N 23/62* (2023.01); *H04N 23/63* (2023.01); *H04N 23/66* (2023.01); *H04N 23/667* (2023.01); *H04N 23/698* (2023.01); *H04R 1/025* (2013.01); *H04R 1/028* (2013.01); *H04R 2499/11* (2013.01)

(58) Field of Classification Search
CPC .... H04N 23/695; H04N 23/531; H04N 23/62; H04N 23/63; H04N 23/66; H04N 23/667; H04N 23/698; G06F 3/0338; G06F 3/165; H04M 1/03; H04R 1/025; H04R 1/028; H04R 2499/11

See application file for complete search history.

(56) References Cited

U.S. PATENT DOCUMENTS

| | | | | |
|---|---|---|---|---|
| 6,728,556 B1 * | 4/2004 | Whitley | ................ | A45F 5/021 |
| | | | | 455/100 |
| 6,731,956 B2 * | 5/2004 | Hanna | .................. | H04M 1/15 |
| | | | | 379/433.02 |

(Continued)

FOREIGN PATENT DOCUMENTS

AU    2007288454 B2    2/2008

*Primary Examiner* — Chiawei Chen

(57) ABSTRACT

A cellular telephone comprising a flat monitor screen that tilts and maneuvers in a 360° degree rotation while remaining within the inner frame/body of said cellular telephone or while in the course of protracting outward extending from with the inner body of said cellular telephone or while in the course of retracting inward back inside the inner body of said cellular telephone. One embodiment of said cellular telephone comprises a flat monitor screen camera that tilts and maneuvers in synchronization with said cellular telephone monitor screen in a 360° degree rotation while remaining within the frame/body of said cellular telephone or while in the course of protracting extending outwards extending from within the inner body of said cellular telephone. Another embodiment of said cellular telephone comprising a flat speaker/transmitter button that protracts outward 'creating' a (four) level speaker/transmitter pyramid that also retracts inward reverting back to its original origin.

2 Claims, 29 Drawing Sheets

(51) Int. Cl.
*H04N 23/53* (2023.01)
*H04N 23/667* (2023.01)
*H04N 23/698* (2023.01)

(56) References Cited

U.S. PATENT DOCUMENTS

| | | | |
|---|---|---|---|
| 6,777,632 B1* | 8/2004 | Tamaki | H01H 13/70 200/302.3 |
| 9,173,104 B2 | 10/2015 | Raleigh | |
| 9,549,103 B2* | 1/2017 | Sung | H01Q 5/378 |
| 9,654,610 B1* | 5/2017 | Alavian | H04R 1/34 |
| 10,484,770 B1* | 11/2019 | Rao | H04R 1/04 |
| 10,572,230 B2 | 2/2020 | Lucas et al. | |
| 2006/0109354 A1* | 5/2006 | Yoon | H04N 23/69 348/240.99 |
| 2006/0109355 A1* | 5/2006 | Yoon | H04N 23/73 348/240.99 |
| 2010/0178959 A1* | 7/2010 | Fish | H04M 1/15 455/569.1 |
| 2011/0074678 A1* | 3/2011 | Reinecke | G06F 3/0338 345/161 |
| 2012/0256867 A1* | 10/2012 | Annacone | G06F 3/044 345/173 |
| 2013/0120258 A1* | 5/2013 | Maus | A63F 13/98 345/161 |
| 2013/0135512 A1* | 5/2013 | Kim | H04N 23/50 348/335 |
| 2014/0240581 A1* | 8/2014 | Sung | G03B 17/02 348/335 |
| 2017/0244903 A1* | 8/2017 | Yang | H04N 23/631 |
| 2019/0335031 A1* | 10/2019 | Nahum | F16M 11/041 |
| 2020/0025561 A1 | 1/2020 | Konolige | |
| 2020/0150721 A1* | 5/2020 | Barnett | A63F 13/23 |
| 2020/0319695 A1* | 10/2020 | DeLorenzo | G10L 25/78 |
| 2020/0351446 A1* | 11/2020 | Maalouf | H04N 23/66 |
| 2021/0289130 A1* | 9/2021 | Zhong | H04M 1/0264 |
| 2023/0305595 A1* | 9/2023 | Barnett | H01L 31/042 455/575.8 |

\* cited by examiner

94 —   95 —

65

65

CELLULAR TELEPHONE WITH PROTRACTING MONITOR SCREEN AND CAMERA

Cellular telephones have become a major part of our everyday lives and activities. We have seen the advancement of some amazing technology. However, the physical Shape(s), physical design(s), physical features, and functions of modern-day cellular telephone technology remains traditional and conventional

Cellular Telephone Monitor Screen

The shape and design of the cellular telephone monitor screen in which is popularly oblong in shape rounding off at its four corners and is flatten in length and width.

Cellular Telephone Monitor Camera

The shape(s) and design(s) of said cellular telephone monitor camera in which is popularly flatten and circular in shape and minute in size. The shape(s) and design(s) of said cellular telephone monitor screen and monitor camera as seen in the Apple iPhone 12 or the Samsung Galaxy S10 plus or the Google pixel 4XL and all other known cellular telephone technology limits the user's ability to capture additional and desirable 360 degree ultra-wide angles positions and dimensional images while taking group photographs—video recording—selfies—face timing—texting or gaming. The quality of group pictures—selfies—video recording and face timing depends on the preciseness and steadiness of the user's arm hand and wrist motions and movements, angling and positioning the bulky cellular telephone. The user's arm(s) are limited in movement and are more so only being used as a post to extend the cellular telephone by hand. The user's wrist movements are also extremely limited and are more so used to capture images within limited wrist rotations. In most cases one of the user's hands are always occupied by the presence of said cellular telephone further adding complications in angling and posing.

a). I have found that if the user tilts said cellular telephone monitor camera at an angle that is too sharp in any direction consequently images will be partially cut out or completely cut out of group photographs—video recording—selfies or face timing.

b). I have found that when the cellular telephone user decides to take selfies the user again faces identical obstacles when the user tilts the cellular telephone monitor screen camera at an angle that is too sharp in any direction the user will lose sight of the cellular telephone monitor screen. Therefore, losing the ability to view desired poses and positions within the cellular telephone monitor screen before snapping desirable selfies. Seeking aid users have turned to mirrors as an aid in capturing additional angles and positions. However, the mirror does not solve said disadvantages in capturing all desirable positions and images in hard to see and reach spots. The present design of the cellular telephone monitor screen and monitor camera makes the capturing of 360 degree angling and dimensional images impossible for the user.

c). I have found that when the user decides to video record with their cellular telephone monitor screen camera the user must physically follow all motions and movements of moving people and other images that the user intend to video record. As a result, fast movements can blur and distort recorded images.

d). I have found that when the user decides to face time by means of the cellular telephone monitor screen camera the main objective of this cellular telephone feature is for the users face(s) and or other image(s) to remain visual within said cellular telephone monitor screen which requires the users limited arm hand and wrist motions and movements to remain steady the slightest adjustment or movement from the user will compromise there face timing removing face(s) and or image(s) from the cellular telephone monitor screen.

e). I have found that when the user decides to place. their cellular telephone up right-side ways or in any other position on a flat surface then set said cellular telephone programming feature to "snap" group pictures—selfies or record video recordings and face timing. The user will then face additional challenges and frustrations such as losing the ability to maintain control. of there cellular telephone in its entirety and will be compelled to remain in a very confined space directly in front of said cellular telephone monitor screen/monitor screen camera.

f). I have found that when texting and playing video games on said cellular telephones such as the Apple iPhone 12 or the Samsung Galaxy S10 plus or the Google pixel 4XL and all other know cellular telephone technologies. Users are face with the arduous task of texting and playing video games on a flat monitor screen surface. As an alternative some users will hold their cellular telephone at an angle by hand while texting or while playing video games or prop their cellular telephone up in a slanted or tilted position to text or play video games more comfortably and efficiently.

Cellular Telephone Speaker/Transmitter

I have found that the physical feature and design of the cellular telephone speaker/transmitter in which has slight variations in some cellular telephone technologies as seen in the Apple Promax 11 in which has 2 speakers located on the front side of said cellular telephone and 1 additional speaker/transmitter located on the back side of said cellular telephone. Said speaker(s)/transmitter is still flat and circular in shape enclosed and confined with small minute openings for sound travel limiting the speaker's ability to reach its maximum potential in emitting and receiving sound.

g). As a result, I have found that users struggle with audio problems when communicating via speaker phone. Communications are broken and or distorted and distant in sound forcing all parties to remain in proximity while speaking directly into the cellular telephone speaker/transmitter defeating the purpose of said speaker phone feature.

h). I have found that when the user plays music via said cellular telephone speaker/transmitter music often sound distorted and or muffled when said speaker/transmitter volume is increased.

Cellular Telephone Rear Camera Design

I have found that the physical shape(s) and design(s) of said cellular telephone rear camera(s) which are found on the back side of said cellular telephone remain traditionally flat and circular in shape. And have only slightly been changed in shape(s) and conformed with configurations of added crowed rear cameras as seen in the Apple ProMax 11 in which has 3 crowded rear cameras which are found on the back side of said cellular telephone. The Galaxy S10 plus also has 5 crowed rear cameras also found on the back side of said cellular telephone. The purpose for said additional rear cameras are to provide the user with options to obtain a clear close and wider view when taking photographs—video recording—selfies and face timing.

j). I have found that the physical features and functions of the cellular telephone rear camera(s) located on the back side of said cellular telephone are minute in size confined within the body of the bulky telephone making it very uncomfortable and difficult to obtain desired positions and images when taking photographs—video recordings and face timing. We often see in selfies via mirror said users are extremely limited in positioning and posing and are uncomfortably twisting and turning with said bulky cellular telephone in hand trying to capture the best photo possible without cutting their head legs and feet out of said selfie.

k). I have found that when the user decides to place said cellular telephone on a flat surface at any angle then set their cellular telephone programming features to snap pictures—video record or face time via rear camera(s) the user will lose the ability to adjust the cellular telephone by hand and will also loose a visual of their cellular telephone monitor screen. Said user will also loose complete control over their cellular telephone within its entirety while participating in group photographs—video recordings and face timing.

j). I have found that when the user decides to video record by means of the cellular telephone rear camera(s) located on the back side of the cellular telephone the user must physically follow all motions and movements of moving people and or images that the user intends to capture without any assistance from their cellular telephone. As a result, any fast movements by the user can blur and distort recorded images.

SUMMARY

In accordance with one embodiment a cellular telephone comprising a flat monitor screen that tilts and maneuvers in a 360 degree rotation while remaining within the inner frame/body of said cellular telephone or while protracting outward extending from with the inner body of said cellular telephone or while retracting inward back inside the inner body of said cellular telephone. In accordance with another embodiment of said cellular telephone comprising a flat monitor screen camera that tilts and maneuvers in synchronization with said cellular telephone monitor screen in a 360 degree rotation while remaining within the frame/body of said cellular telephone or while protracting extending outwards extending from within the inner body of said cellular telephone. In accordance with another embodiment of said cellular telephone comprising a flat speaker/transmitter button that protracts
outward creating a four-level speaker/transmitter pyramid that also retracts inward reverting to its original origin.

In accordance with another embodiment of said cellular telephone comprising a circular full length rear camera—that lies directly beneath the surface of said full length rear camera lens. Said full length rear camera design is found on the back side of said cellular telephone covering said area in its capacity. In accordance with another embodiment of said cellular telephone comprising said full length rear camera that lens lies on the surface of said cellular telephone which is found on the back side of said cellular telephone. Said cellular telephone full length rear camera can also tilt and maneuver in a full and complete 360 degree angle rotation while remaining within the inner frame/body of said cellular telephone or while protracting outwards extending from within said body of said cellular telephone or while retracting inward back inside of the inner body of said cellular telephone.

In accordance with another embodiment of said cellular telephone includes a flat button that when pressed down slowly protracts a joystick that extends outward protracting from within the inner body of said cellular telephone. Said joystick is designed to control the functions and movements of said cellular telephone monitor screen and monitor camera in synchronization and can also control the functions and movements of said cellular telephone full length rear camera when programmed via cellular telephone programming and setting features. Said joystick feature slowly retracts back inside of the inner body of said cellular telephone when held down for 2 seconds by the user reverting back to said joystick button. In accordance with another embodiment of said cellular telephone comprises a remote control having a small touch screen monitor in which captures and displays a visual of all depicted programming and setting features of said cellular telephone as well as of all images that are captured by said cellular telephone monitor screen/monitor screen camera or said cellular telephone full length rear camera such as photographs—video recordings—face timing—texting or gaming features. Said cellular telephone touch screen remote control is designed to control all functions and movements of said cellular telephone monitor screen and monitor screen camera in synchronization. Said cellular telephone touch screen remote control can also control said full length rear camera in the same manner when programmed via said cellular telephone programming and setting features. Said cellular telephone touch screen remote control further allows the user to control the protraction and retraction of said cellular telephone speaker/transmitter button and speaker/transmitter pyramid and volume control.

In accordance with another embodiment of said cellular telephone comprising a motion sensor which is designed to detect, measure, and record physical movements captured by said cellular telephone monitor camera and by said full length rear camera. Responding by transmitting said information initiating said cellular telephone monitor screen and monitor screen camera in synchronization or said full length rear camera to physically move, adjust, rotate, and maneuver in accordance with their functions and features thus following said detected measured movements. In accordance with another embodiment of said cellular telephone comprising a hidden compartment that slowly slides from within the inner body of said cellular telephone when initially pressed down.

Advantages

Accordingly, several advantages of more than one aspect are as follows: To provide the user with a cellular telephone that monitor screen and monitor screen camera in synchronization or said full length rear camera can physically protract—retract and or rotate and maneuver in a full and complete 360 degree angle rotation assisting the user while taking pictures—video recordings and face timing. That will provide the user with a broader variety of options and selections when posing taking selfies—group pictures—video recording and face timing. Said cellular telephone touch screen remote control feature will also allow the user to obtain ultra-wide dimensional images without the need for aid. Said cellular telephone touch screen remote control feature will allow the user to place their cellular telephone up right-side ways or at any other angle on a sustainable surface and participate in any picture—video recording or face timing while being able to physically adjust rotate and or maneuver said cellular telephone monitor screen and monitor camera in synchronization or said full length rear camera. The user will then be able to keep a visual of all images depicted on the user's cellular telephone monitor screen via said cellular telephone touch screen remote control "monitor" feature. Said cellular telephone touch screen remote control feature will allow the user to obtain a full and complete 360 degree ultra-wide dimensional angle rotations while maintaining full and complete control over their cellular telephone. That allows the cellular telephone company/user to use said cellular telephone touch That allows the cellular telephone company/user to user said cellular telephone as an anti-theft device to prevent the theft of their cellular telephone. Said cellular telephone company/user will always retain access and control of said cellular telephone programming and setting features and will be able to use said cellular telephone touch screen remote control to activate and access said cellular telephone and its programming and setting features. Thus, the user will be able to capture a visual of said cellular telephone surrounding location and perpetrator(s) through said cellular telephone monitor screen camera/monitor screen or through said full length rear camera said images will be depicted on the user's cellular telephone touch screen remote control "monitor screen".

That provides the cellular telephone user with a full-length rear camera that occupies the back side of said cellular telephone within its entirety also allowing the user to protract—retract and or rotate and maneuver said full length rear camera in a full and complete 360 degree and rotation assisting the user in capturing ultra-wide dimensional images and angles when taking photographs—video recording—selfies and face timing. That provides the user with the option to protract said cellular telephone speaker/transmitter button in which is designed to protract said 4 level speaker/transmitter pyramid allowing the user to obtain a crisp clear and louder sound when communicating via said cellular telephone or while communicating via said cellular telephone speaker phone or while listening to music via said cellular telephone. Other advantages and more aspects will be clear from a consideration of drawings and ensuing descriptions.

DRAWINGS—FIGURES

Figure 1A:
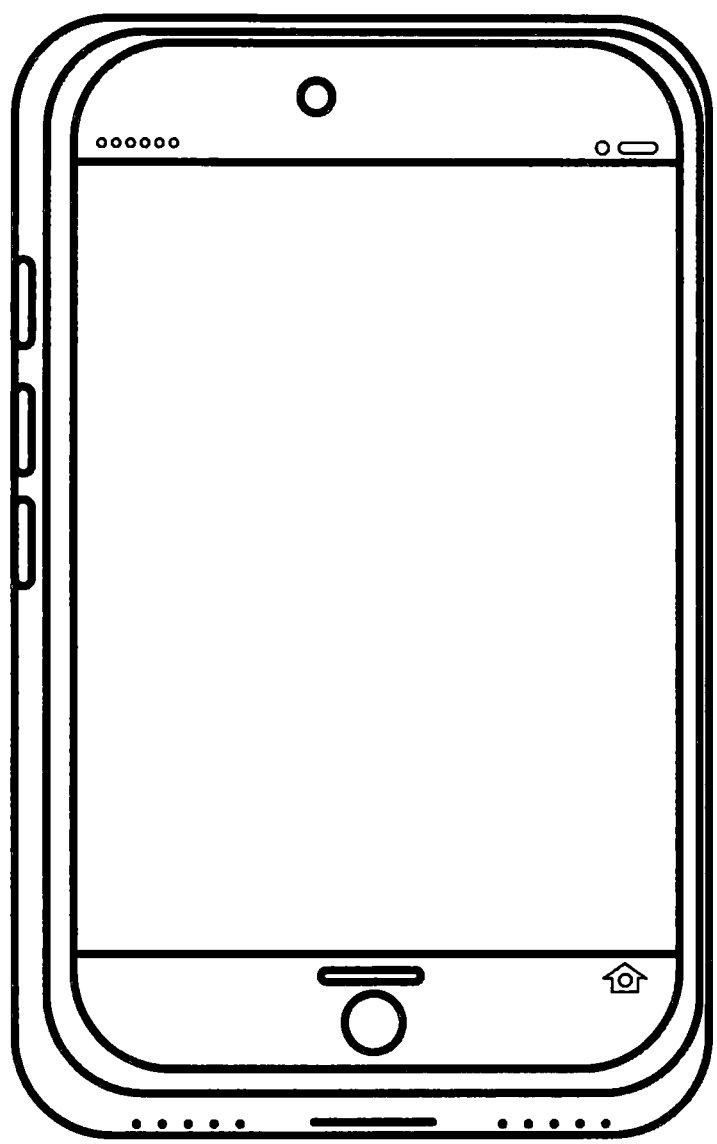
FIG. 1A shows a front view of a prior art cellular telephone.
Figure 1B:
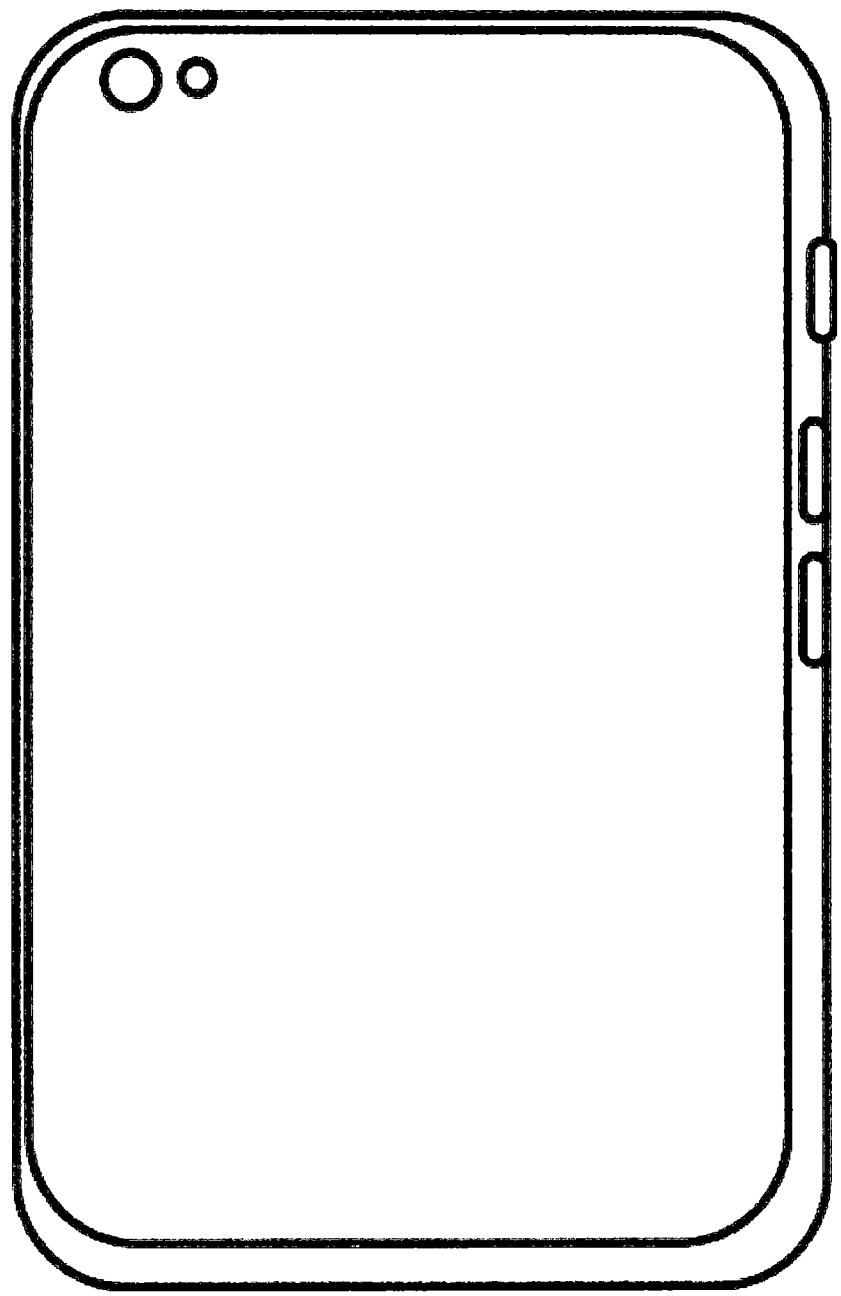
FIG. 1B shows a back view of a prior art cellular telephone.
Figure 1C:
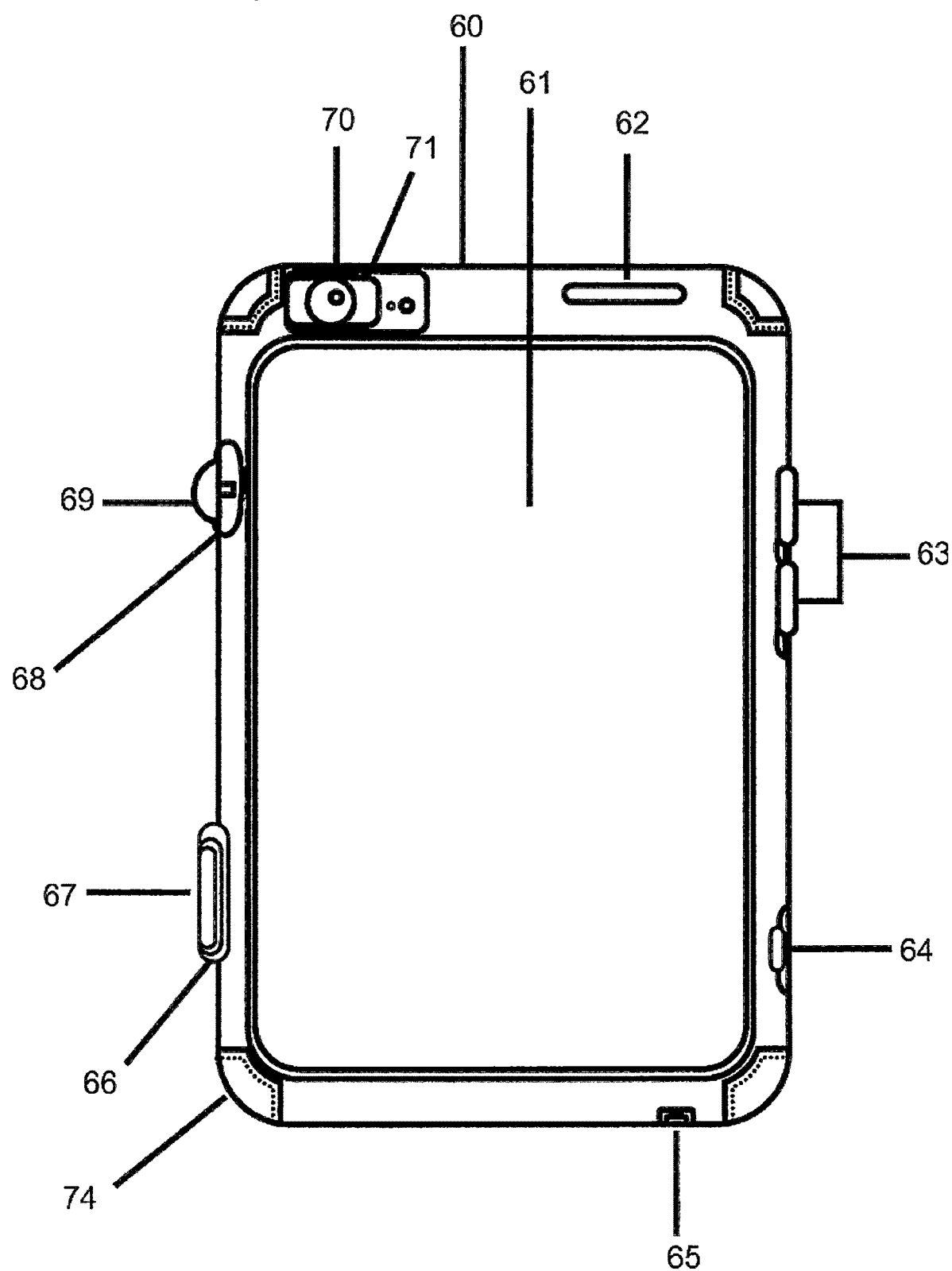
FIG. 1C shows a front view of the inventive cellular telephone.

In the drawings figures have the numerals of 1 through 53. And reference numerals are numbered 60 through 96. FIG. 1. Shows front view of said cellular telephone. Reference number 60 shows said, "cellular telephone". Reference number 61 shows said cellular telephone "monitor screen/retracted" "monitor screen protracted" Reference number 62 shows said cellular telephone speaker/receiver. Reference number 63 shows said cellular telephone "volume buttons". Reference number 64 shows said cellular telephone "power button". Reference number 65 shows said cellular telephone "input" opening. Reference number 74 shows said cellular telephone "grips". Reference number 66 shows said cellular telephone "speaker/transmitter button". Reference number 67 shows said cellular telephone "speaker/transmitter pyramid protracted".

Figure 2:
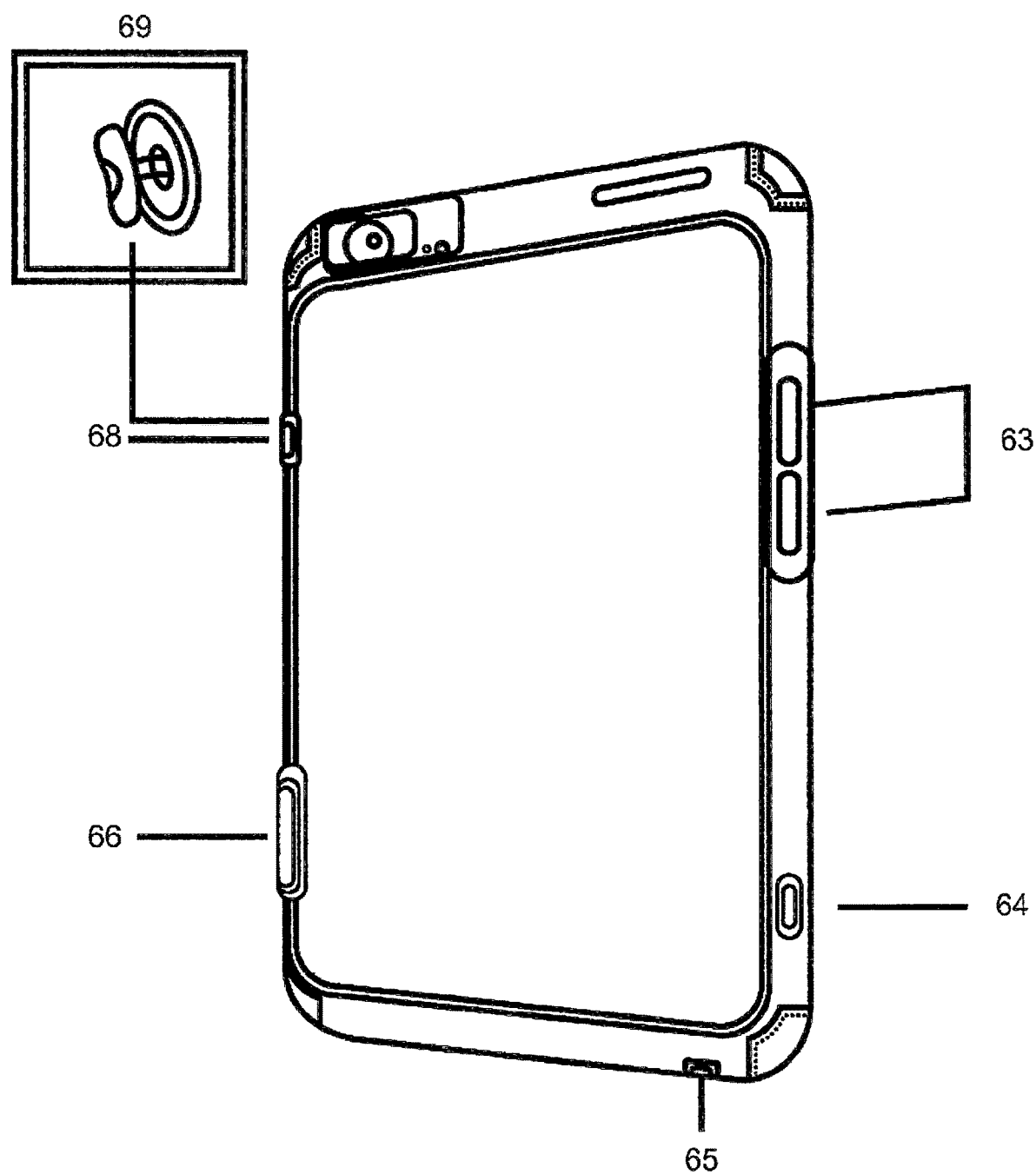
FIG. 2 shows a right-side perspective view of the inventive cellular telephone.
Figure 3:
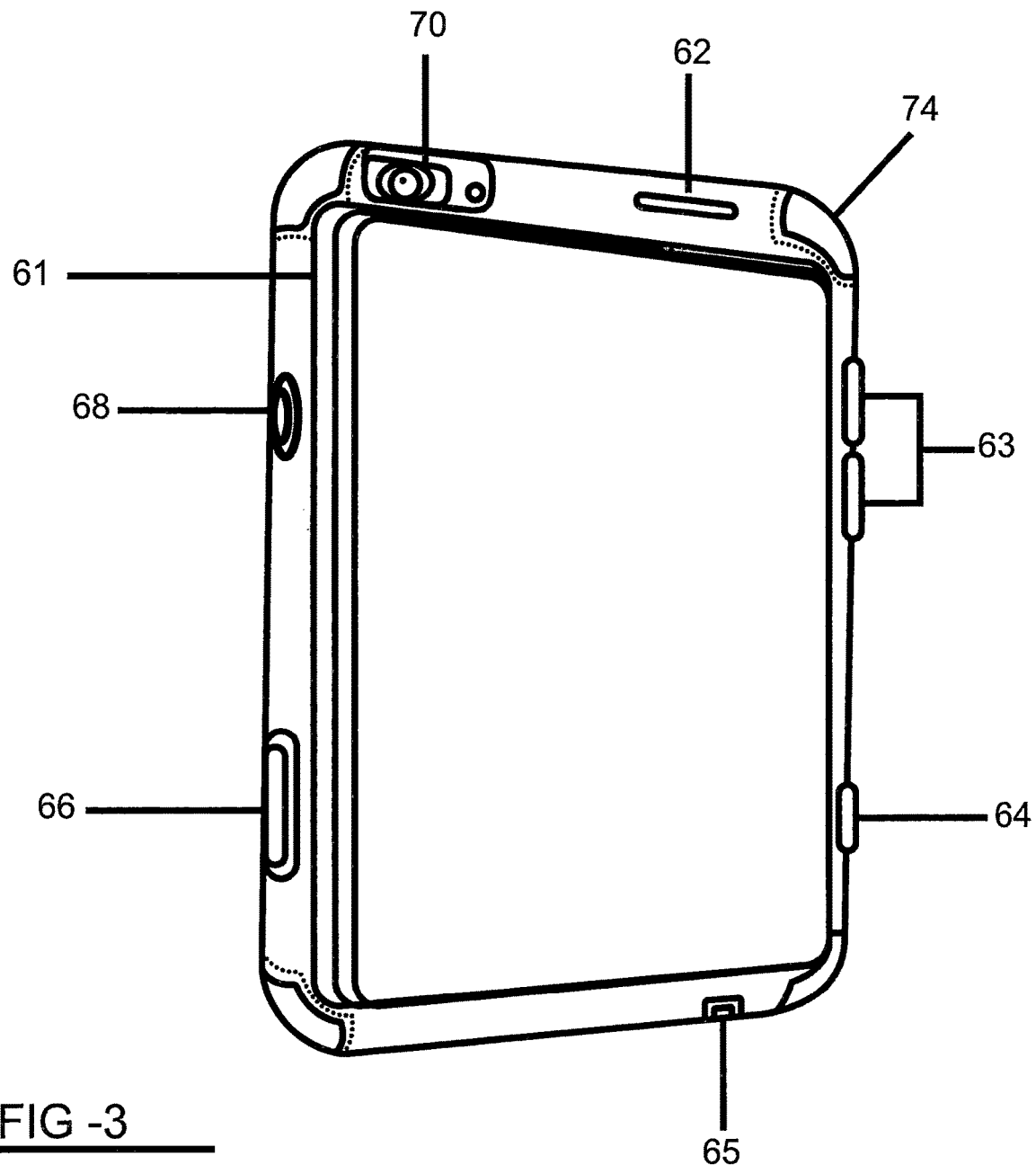
FIG. 3 shows a left-side perspective view of the inventive cellular telephone.
Figure 4:
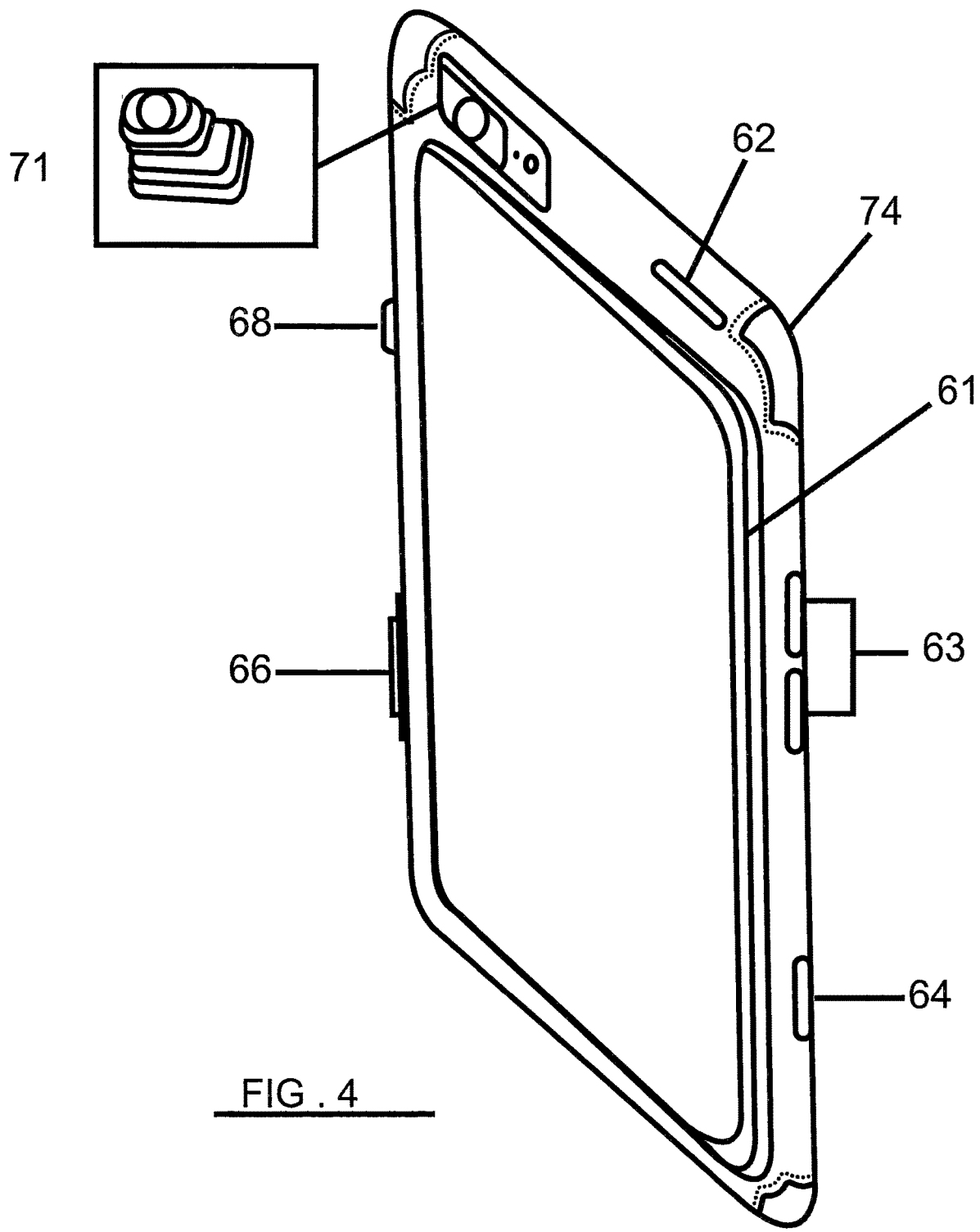
FIG. 4 shows a view of the inventive cellular telephone featuring the monitor camera.
Figure 5:
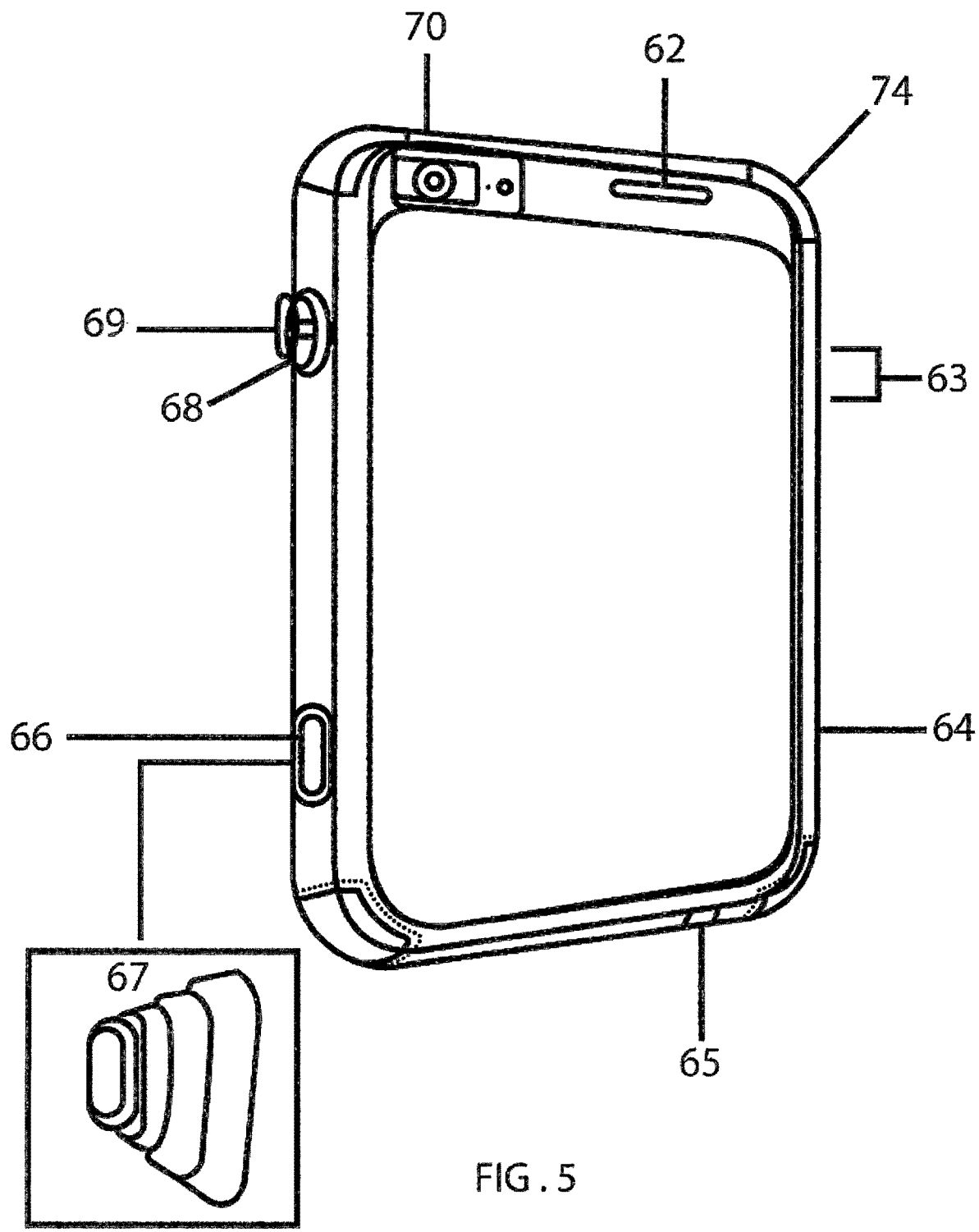
FIG. 5 shows a view of the inventive cellular telephone featuring a speaker/transmitter pyramid.
Figure 6:
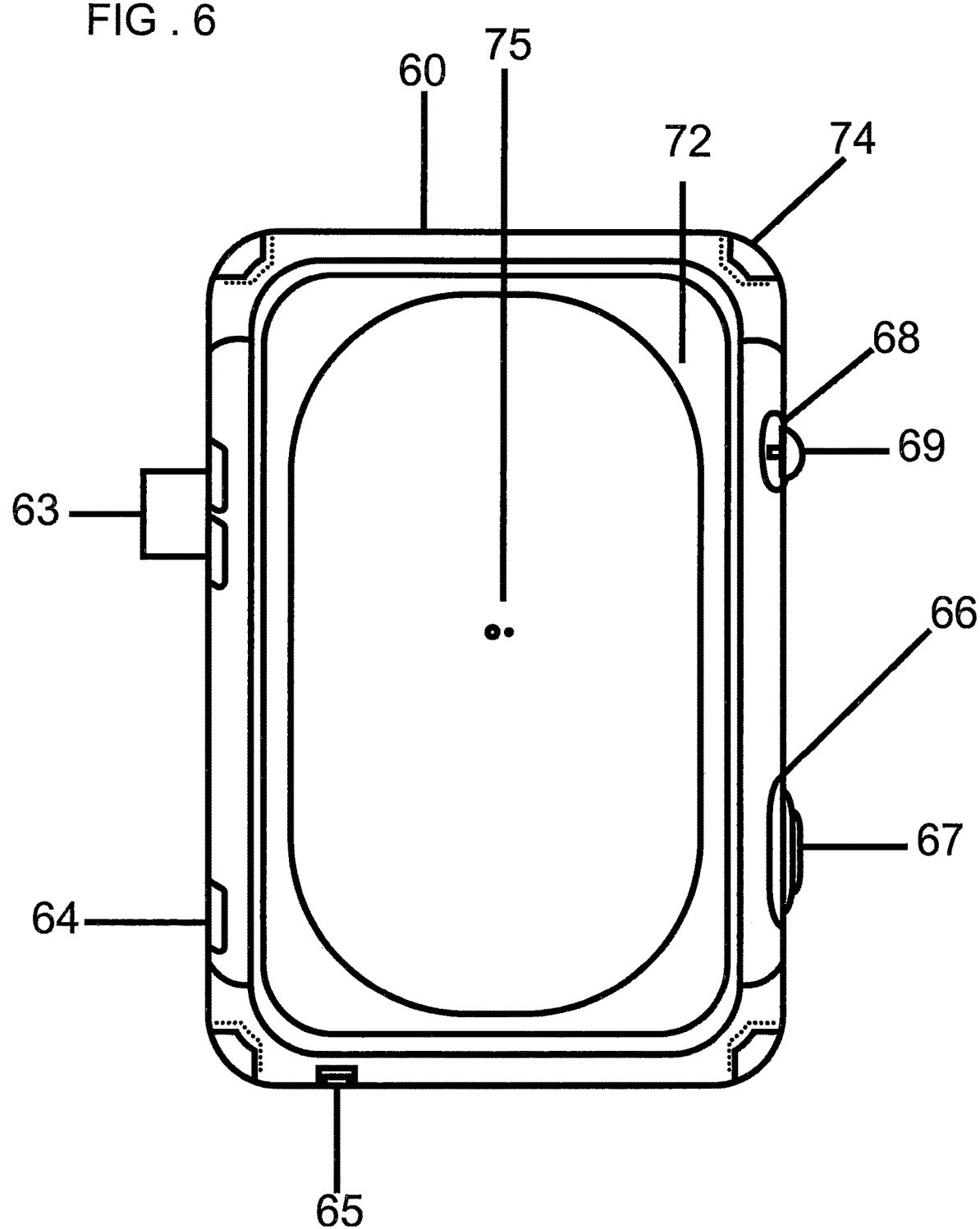
FIG. 6 shows a clear back view of the inventive cellular telephone.
Figure 7:
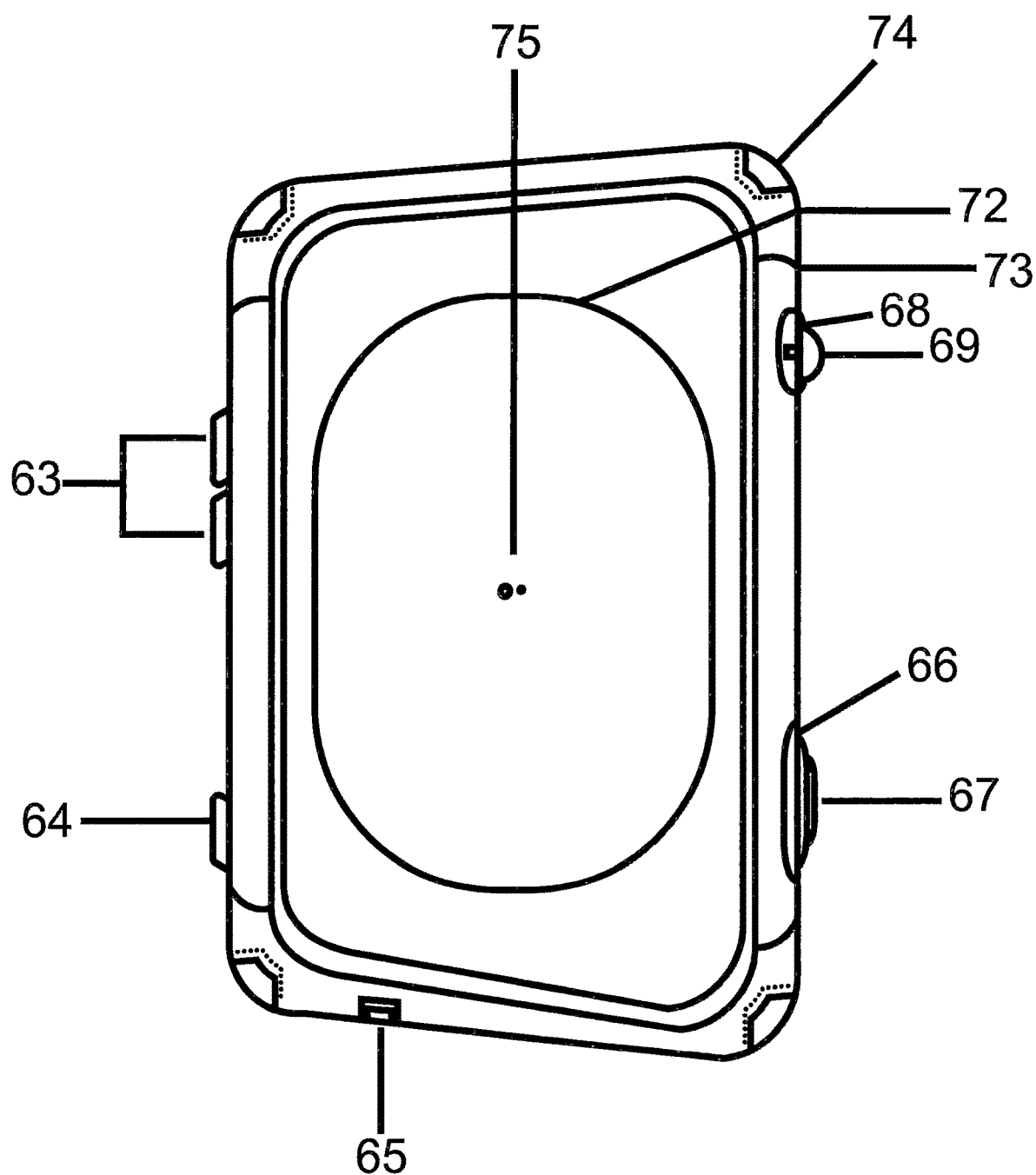
FIG. 7 shows the inventive cellular telephone featuring a full-length rear camera.
Figure 8:
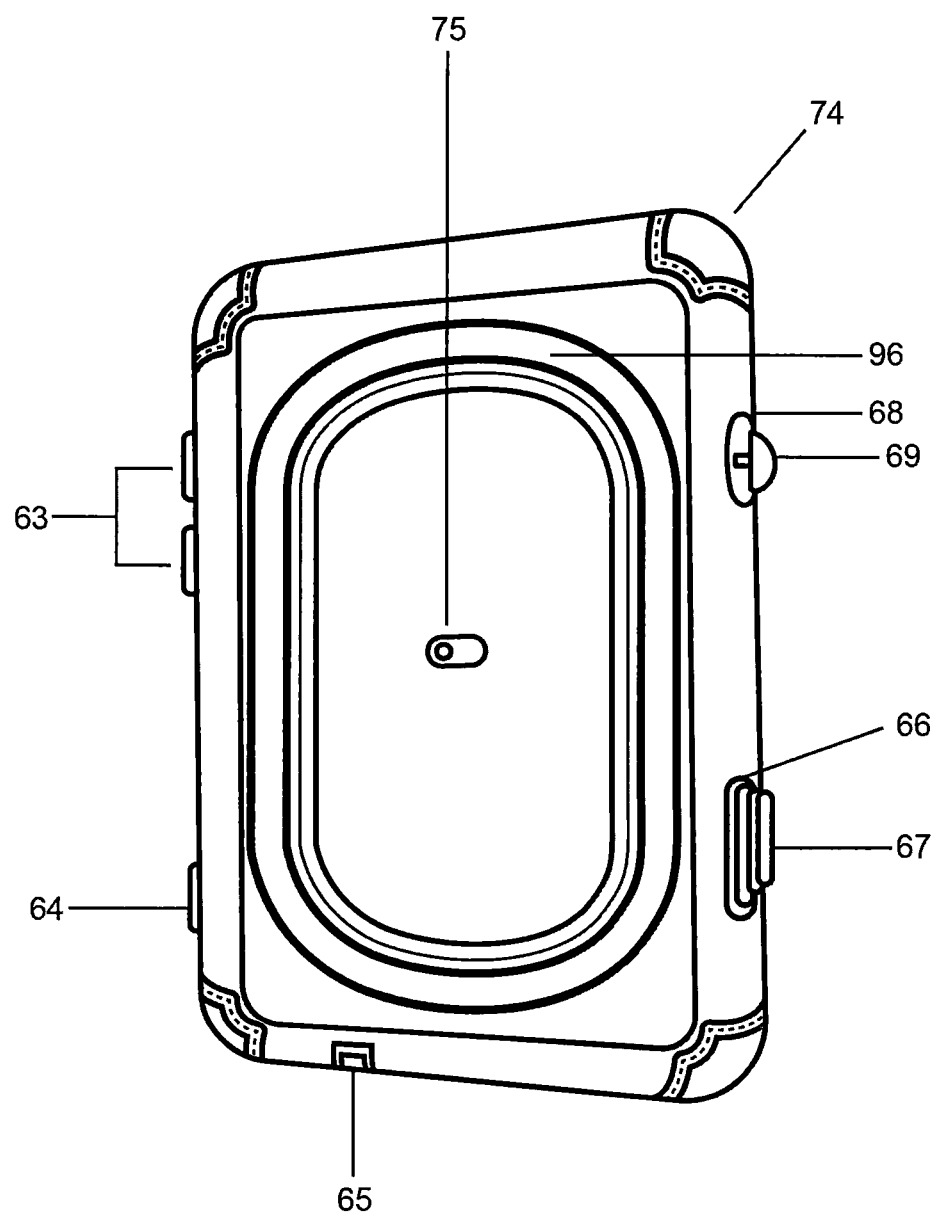
FIG. 8 shows a back view of the inventive cellular telephone featuring a retracted secondary tech full length rear camera.
Figure 9:
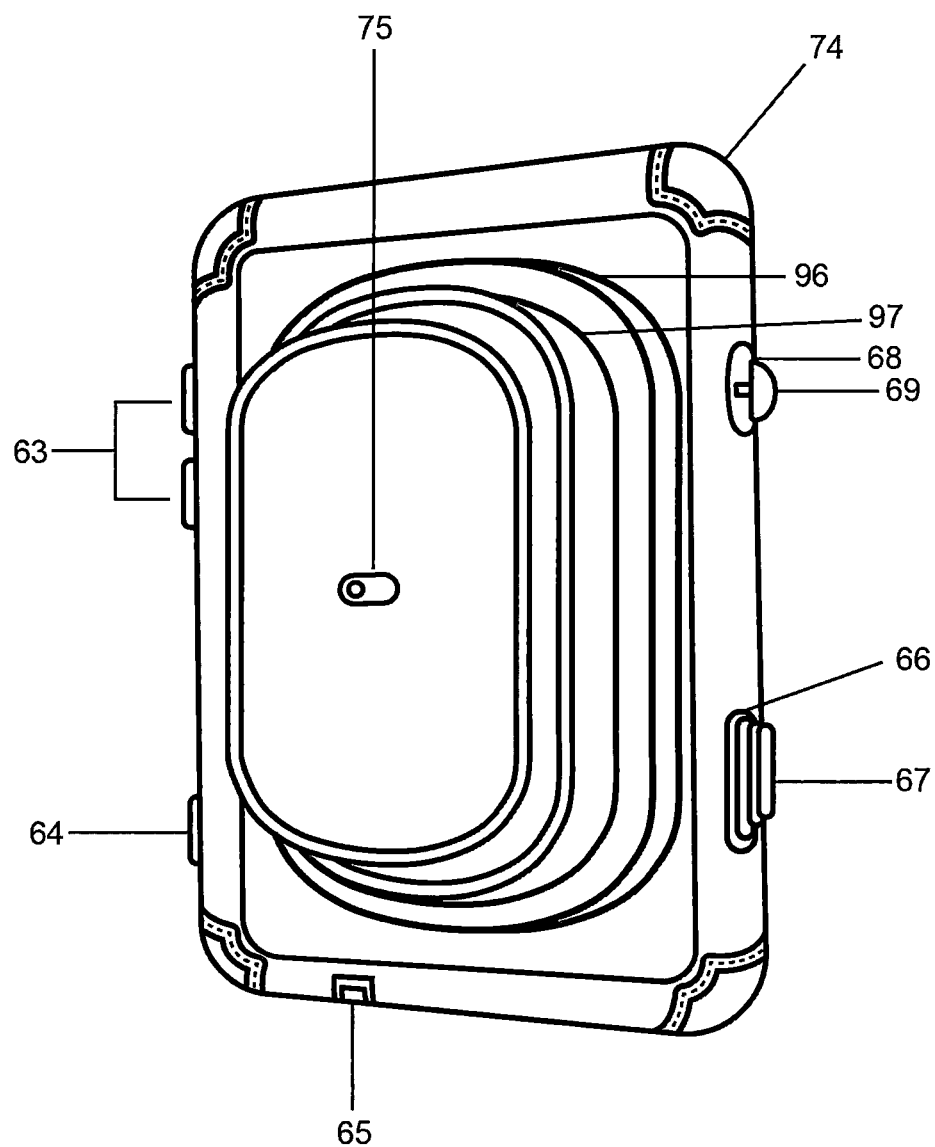
FIG. 9 shows a back view of the inventive cellular telephone featuring a protracted secondary tech full length rear camera.
Figure 10:
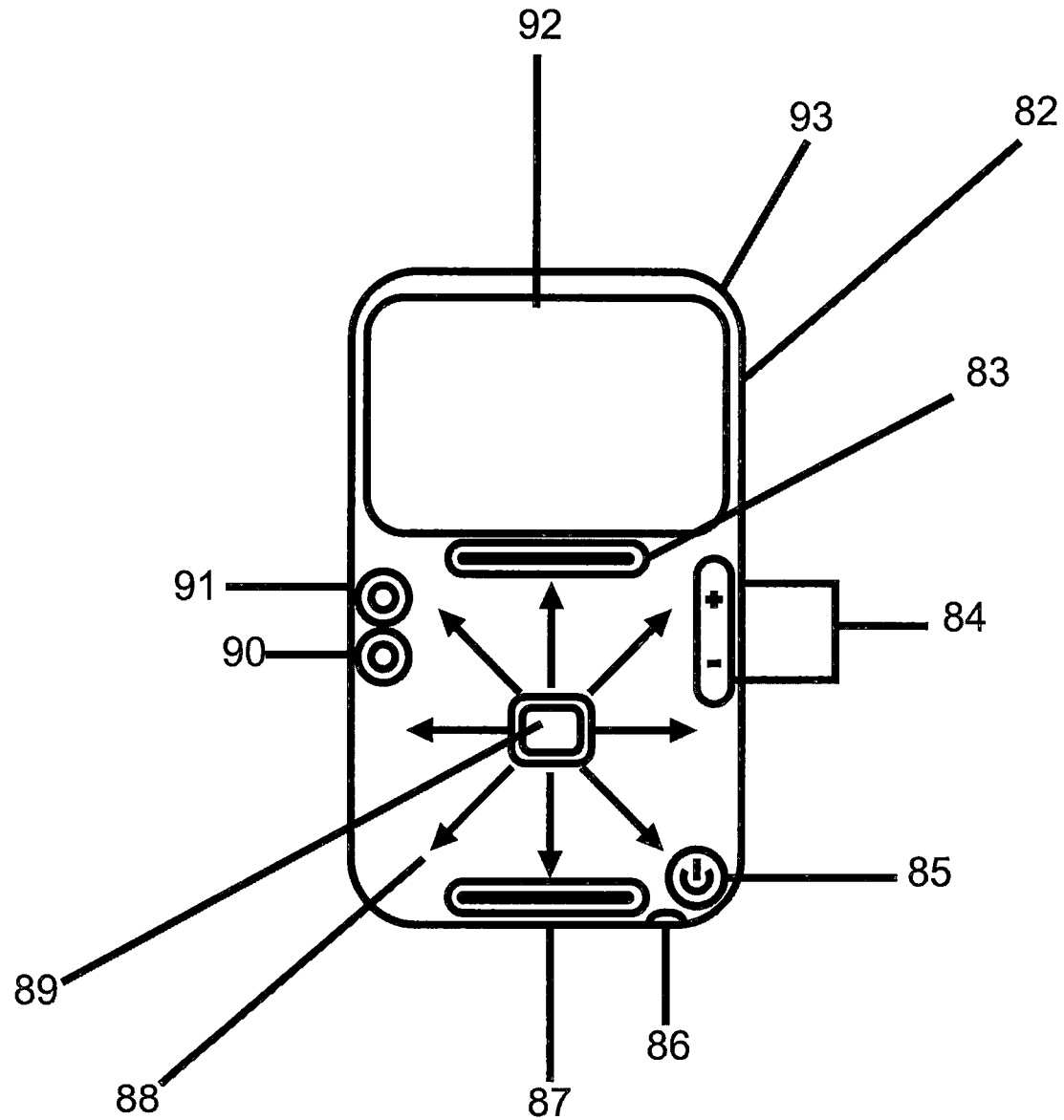
FIG. 10 shows the inventive cellular telephone featuring front view of a touch screen remote control.
Figures 11, 12:
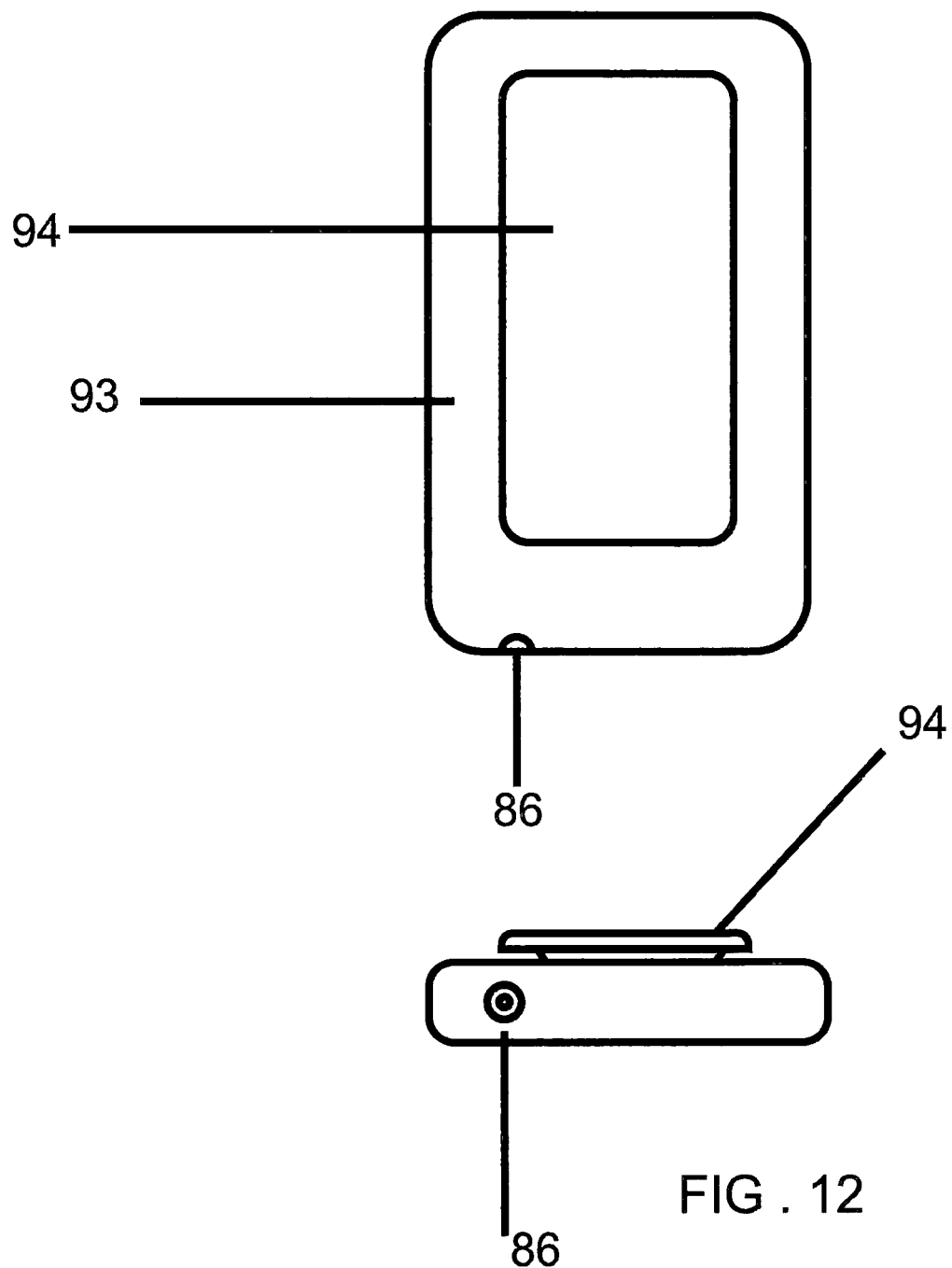
FIG. 11 shows the inventive cellular telephone featuring a back view of a touch screen remote control.
FIG. 12 shows an end view of the inventive cellular telephone featuring a holding clip.
Figure 13:
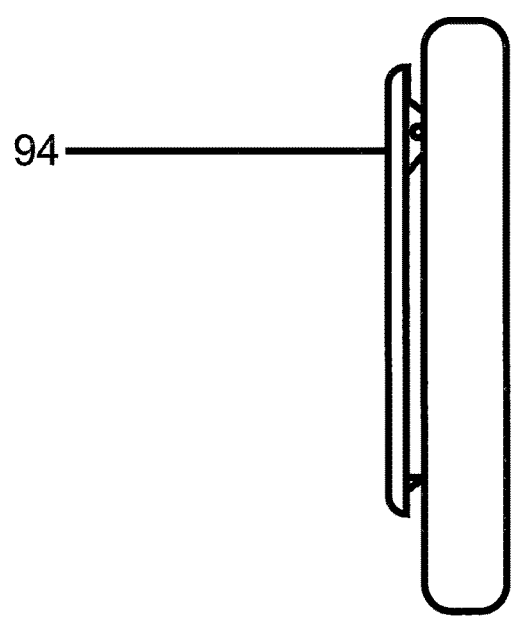
FIG. 13 shows a left-side view of the inventive cellular telephone as a touch screen remote control.
Figure 14:
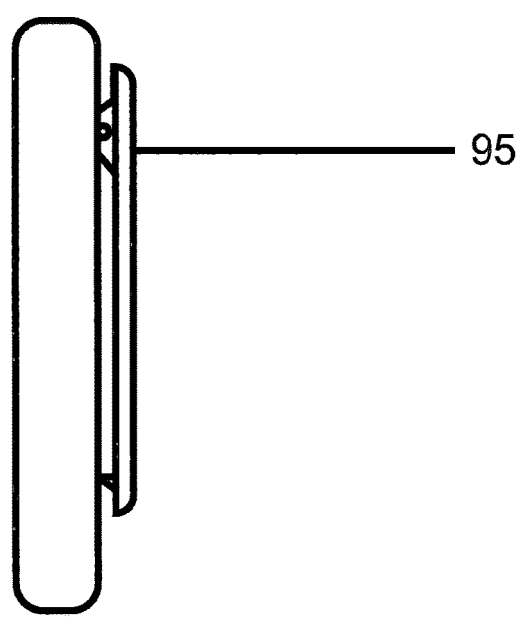
FIG. 14 shows a right-side view of the inventive cellular telephone as a touch screen remote.
Figure 15:
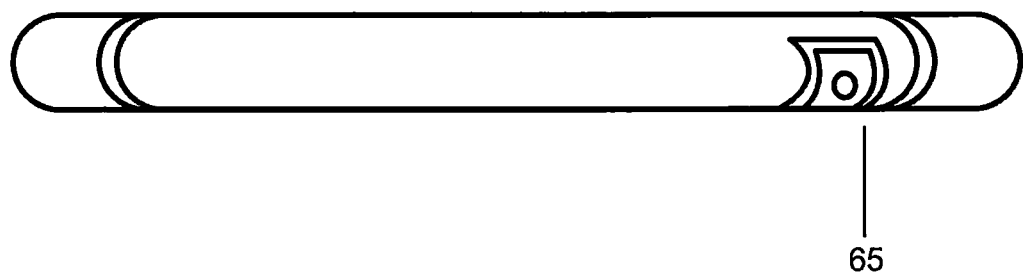
FIG. 15 shows a bottom view of the inventive cellular telephone.
Figure 18:
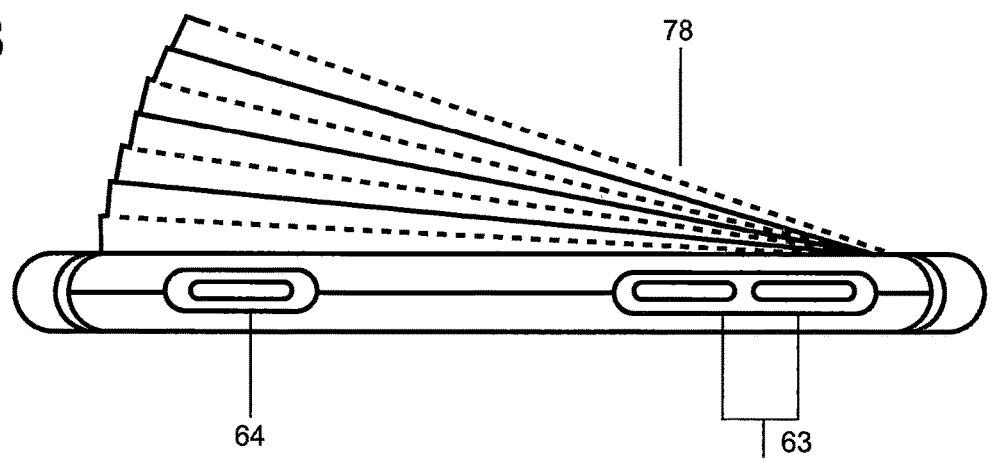
FIG. 18 shows a right-side view of the inventive cellular telephone showing the monitor screen slowly protracting in accordance with another embodiment.
Figure 17:
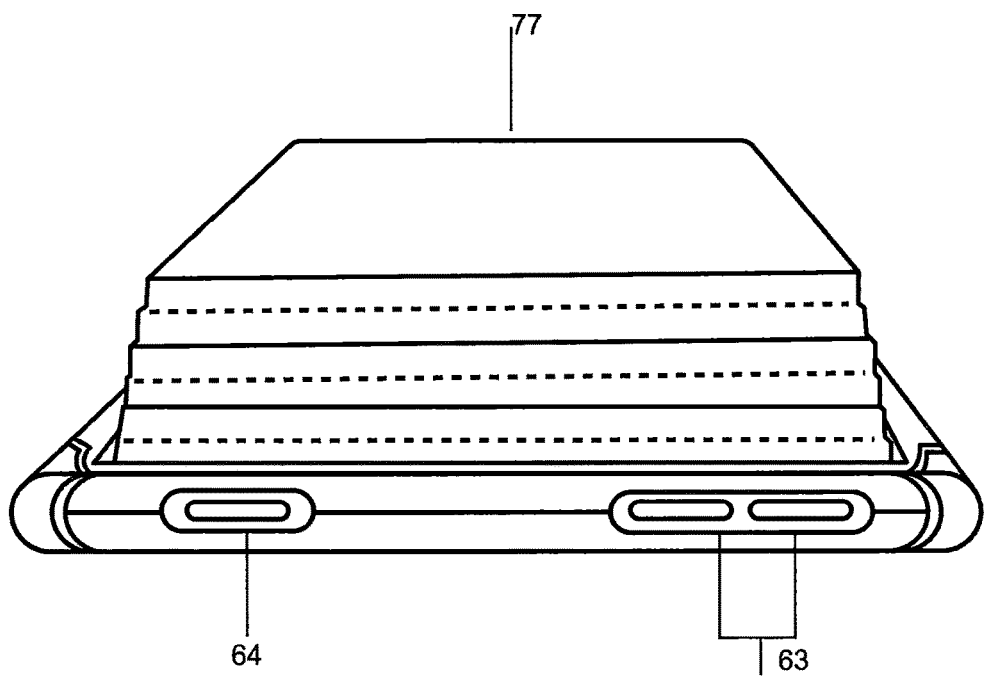
FIG. 17 shows a right-side view of the inventive cellular telephone with a protracted monitor screen.
Figure 16:
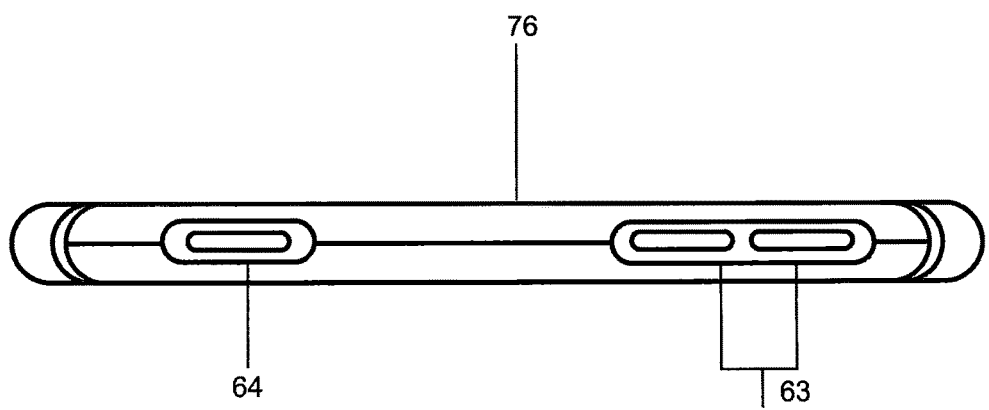
FIG. 16 shows a right-side view of the inventive cellular telephone with a retracted monitor screen.
Figure 21:
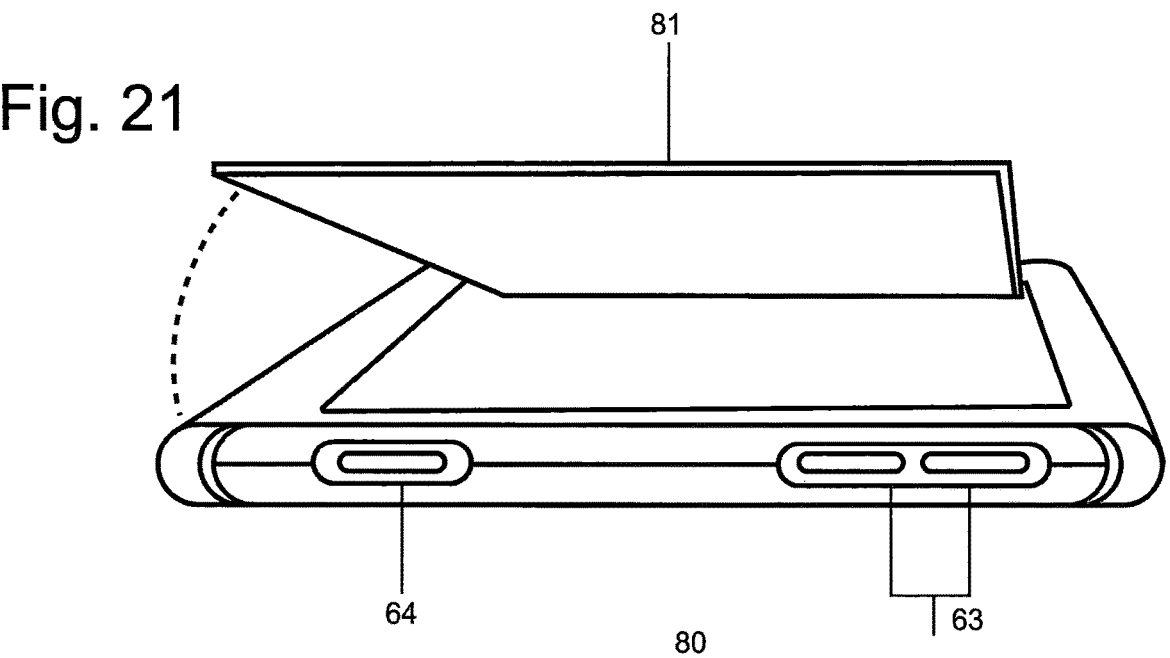
FIG. 21 shows a right-side view of the inventive cellular telephone showing the monitor screen slowly protracting in accordance with another embodiment.
Figure 20:
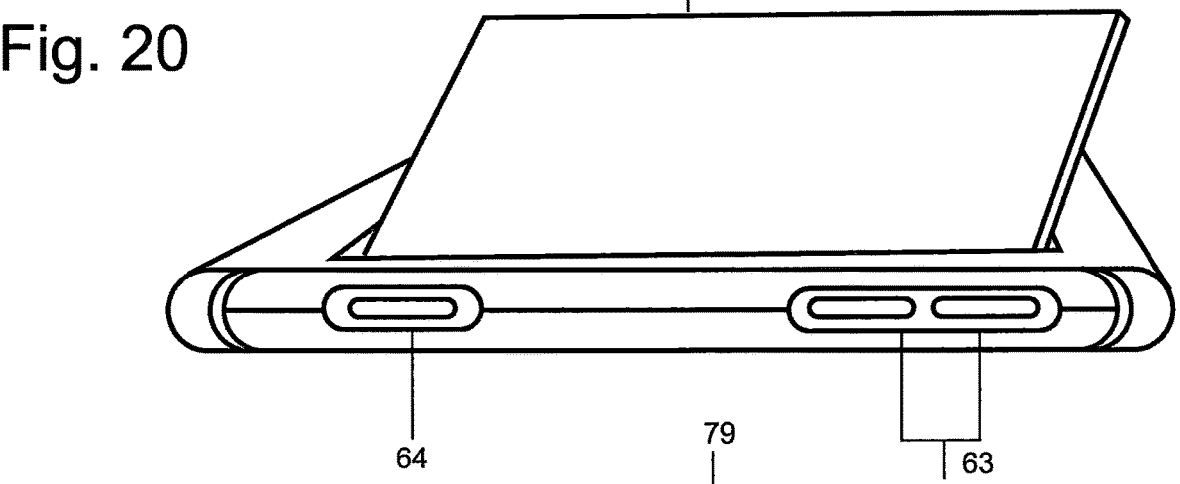
FIG. 20 shows a right-side view of the inventive cellular telephone showing the monitor screen slowly protracting in accordance with another embodiment.
Figure 19:
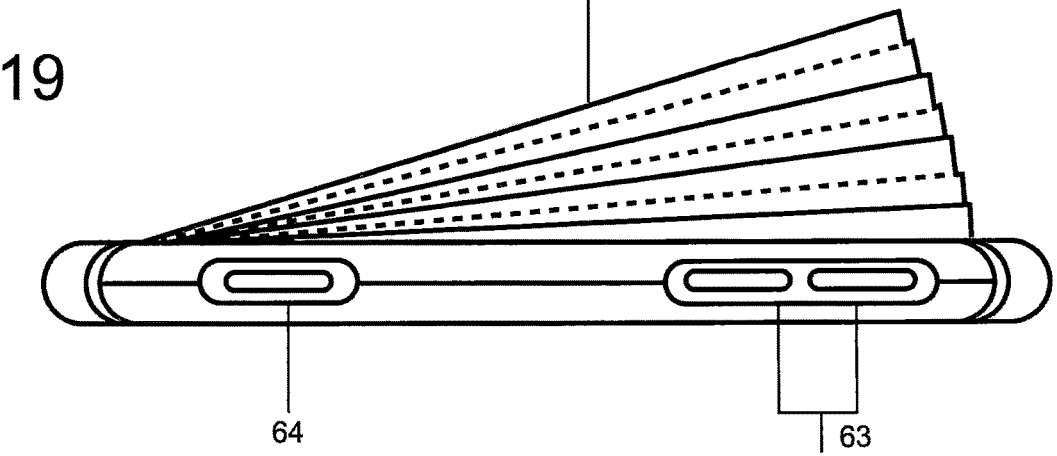
FIG. 19 shows a right-side view of the inventive cellular telephone showing the monitor screen slowly protracting in accordance with another embodiment.
Figure 24:
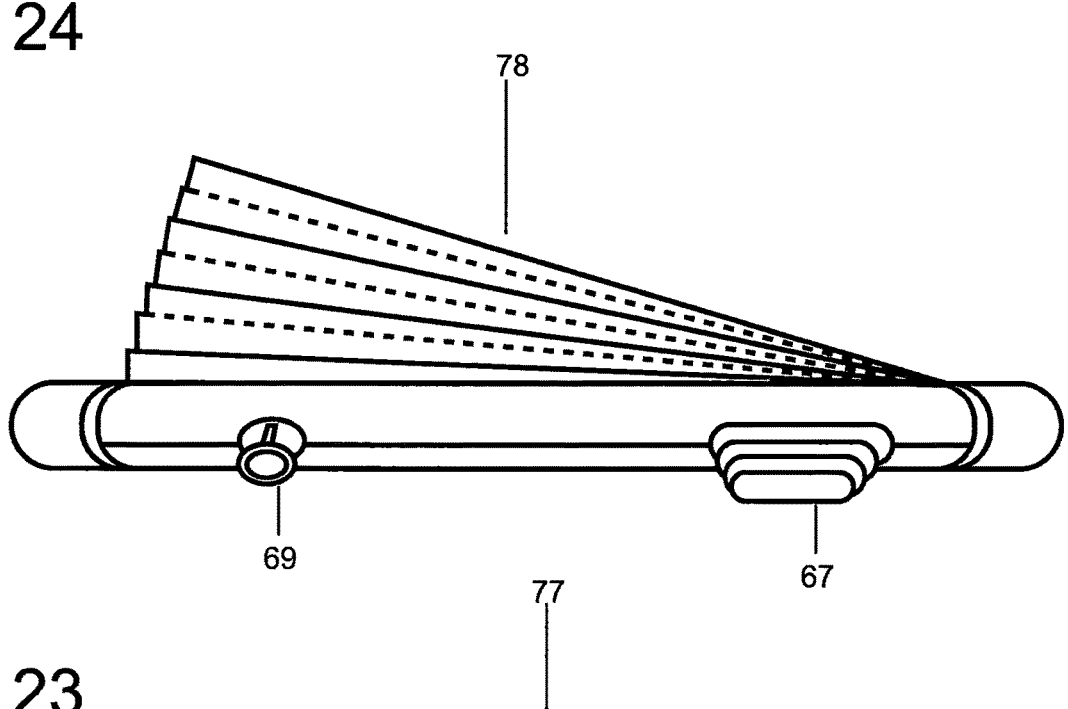
FIG. 24 shows a left-side view of the inventive cellular telephone showing a monitor screen protracting at an angle in accordance with another embodiment.
Figure 23:
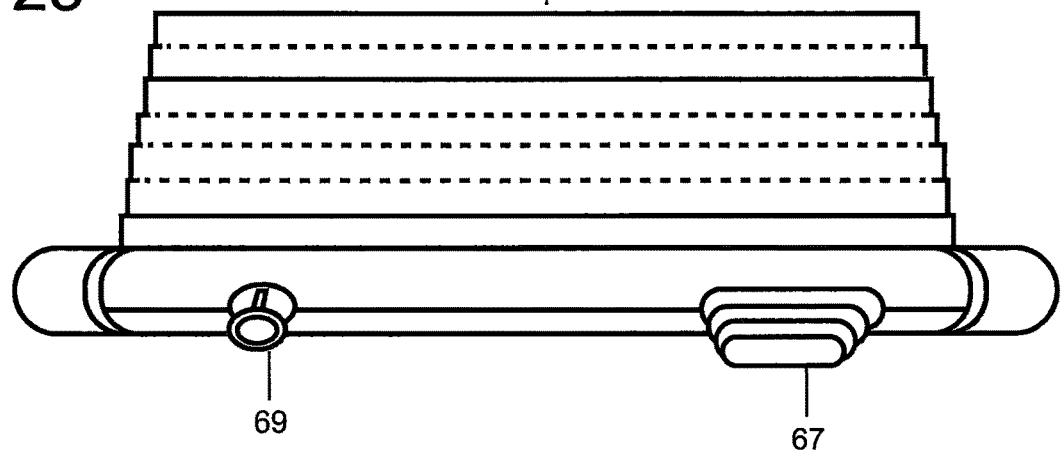
FIG. 23 shows a left-side view of the inventive cellular telephone showing a monitor screen slowly protracting in accordance with another embodiment.
Figure 22:
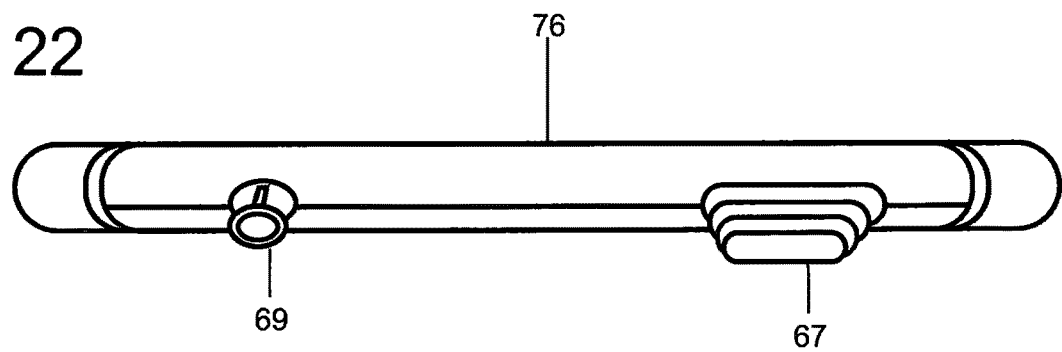
FIG. 22 shows a left-side view of the inventive cellular telephone showing a retracted monitor screen in accordance with another embodiment.
Figure 27:
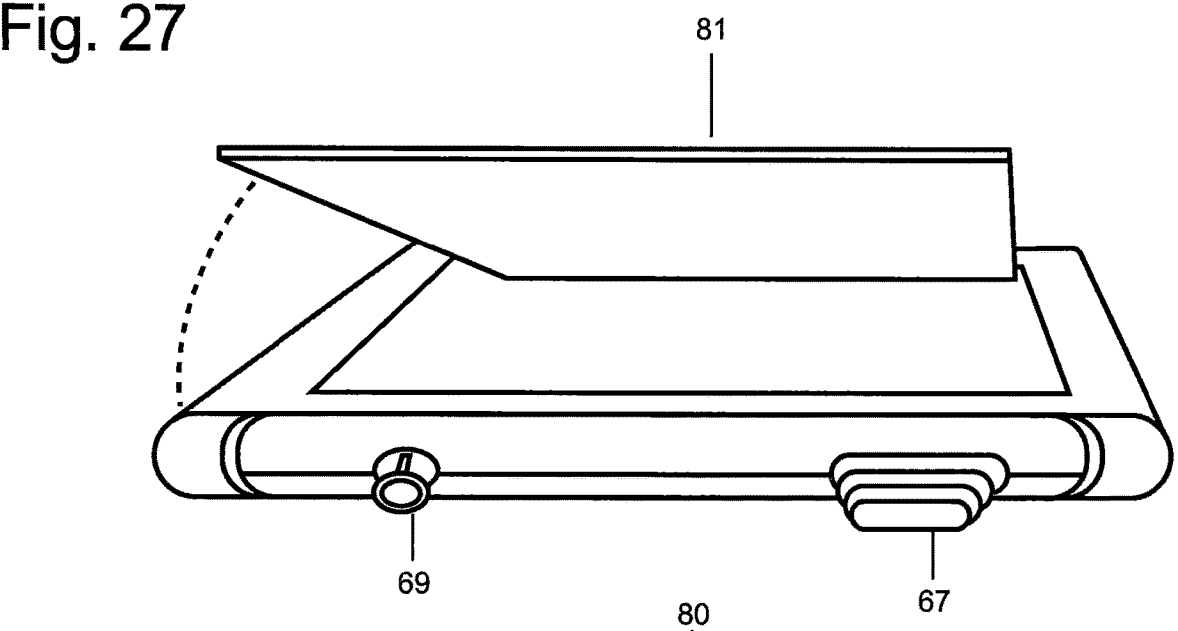
FIG. 27 shows a left-side view of the inventive cellular telephone showing a monitor screen slowly protracting in accordance with another embodiment.
Figure 26:
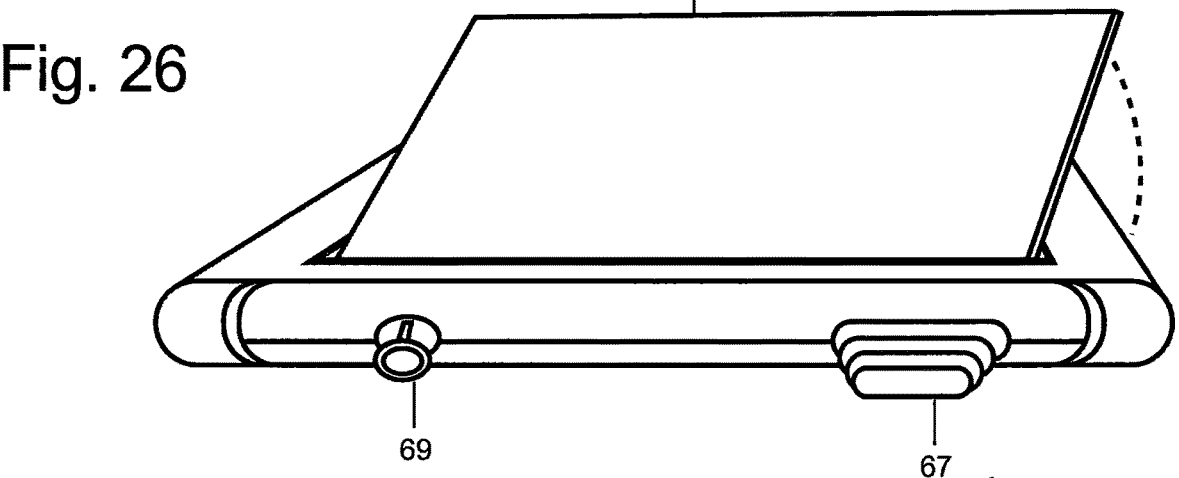
FIG. 26 shows a left-side view of the inventive cellular telephone showing a monitor screen slowly protracting in accordance with another embodiment.
Figure 25:
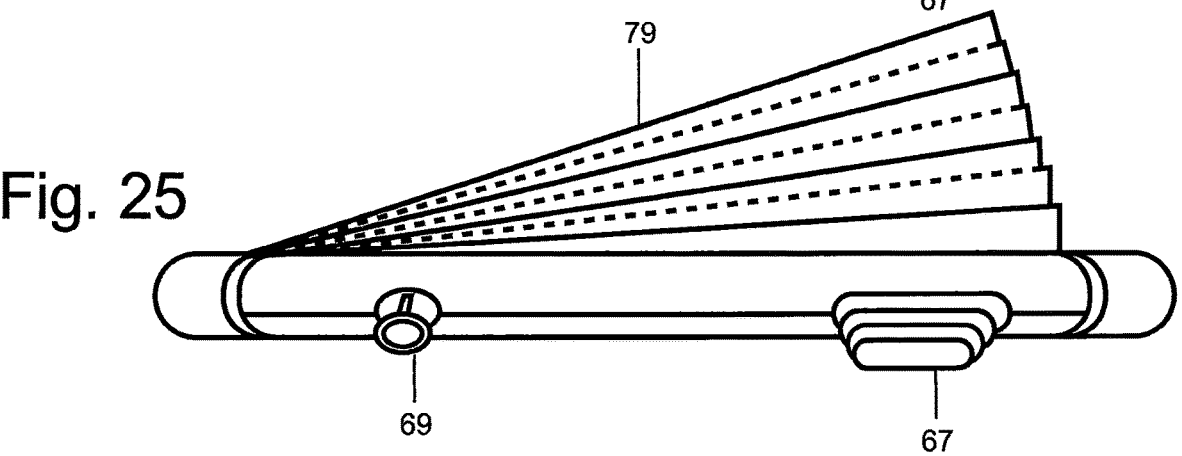
FIG. 25 shows a left-side view of the inventive cellular telephone showing a monitor screen slowly protracting in accordance with another embodiment.
Figure 29:
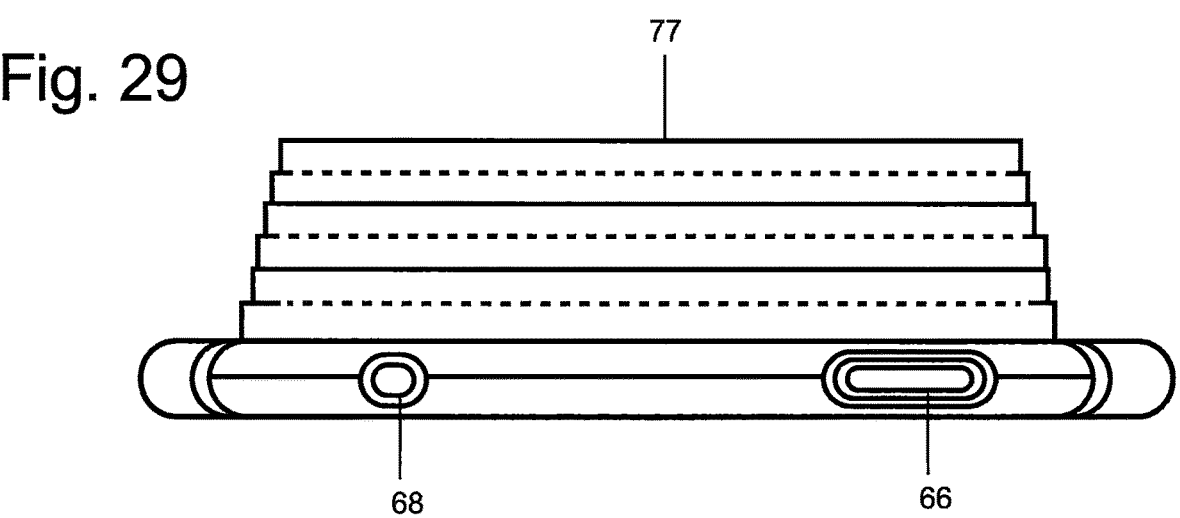
FIG. 29 shows a left-side view of the inventive cellular telephone with a slowly protracting monitor screen in accordance with another embodiment.
Figure 28:
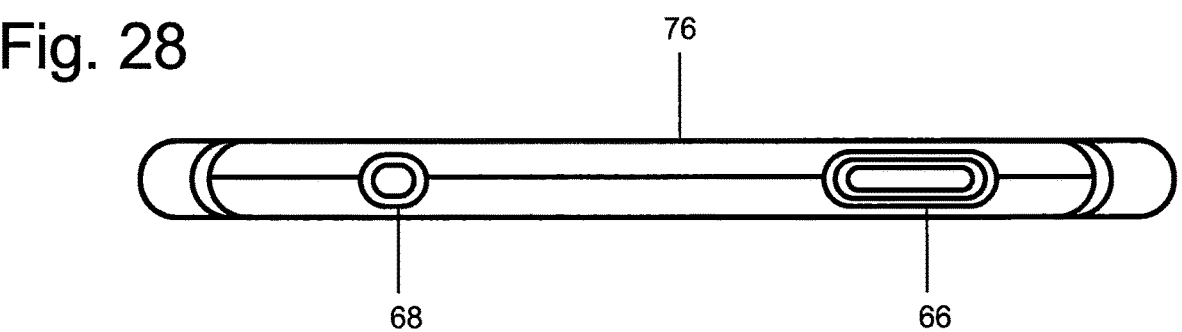
FIG. 28 shows a left-side view of the inventive cellular telephone with a fully retracted monitor screen in accordance with another embodiment.

Reference number 68 shows said cellular telephone "joystick protracted." Reference number 70 shows said cellular telephone "monitor camera". Reference number 71 shows said cellular telephone "monitor camera protracted" in accordance with said embodiments. FIG. 2. Reference number 68 shows said cellular telephone "joystick button" that protracts said reference number 69 "joystick protracted" when initially pressed down. Reference number 69 shows said cellular telephone "joystick protracted" that is designed to slowly protract from within the inner body of said cellular telephone in accordance with another embodiment. FIG. 3. Reference number 61 shows said cellular telephone "monitor screen" slowly protracting from within the inner body of said cellular telephone in accordance with another embodiment. FIG. 4. Reference number 71 shows said cellular telephone "monitor camera" slowly protracting from within the inner body of said cellular telephone in accordance with another embodiment. FIG. 5. shows Reference number 66 cellular telephone "speaker/transmitter button" which protracts said reference number 67 "speaker/transmitter pyramid protracted" when initially pressed down. FIG. 6. Shows a clear back view of said cellular telephone. Reference number 72 shows a transparent circler outline of said cellular telephone "full length rear camera" which lies directly beneath the surface/lens of said transparent "full length rear camera design" in accordance with another embodiment. FIG. 7. Reference number 73 shows said cellular telephone "full length rear camera functions" slowly protracting from within the inner body of said cellular telephone in accordance with another embodiment. FIG. 8. Reference number 96 shows a clear back view of said cellular telephone. Reference number 96 shows a separate "secondary tech full length rear camera design" fully retracted in accordance with another embodiment. FIG. 9. Reference number 97 shows said cellular telephone "secondary tech full length rear camera protracting" slowly protracting from within the inner body of said cellular telephone in accordance with another embodiment. FIG. 10. shows a front view of reference number 82 "cellular touchscreen remote control". In which possess the following embodiments. Reference number 83 "protraction button". Reference number 84 up and down "volume buttons". Reference number 85 "remote control power button". Reference number 86 "remote control input". Reference number 87 "retraction button". Reference number 88 "360 degree rotation dial". Reference number 89 "snap picture button". Reference number 98 "speaker pyramid button". Reference number 91 "cellular telephone programming and settings button". Reference number 92 "touch screen monitor" in accordance with said embodiments. FIG. 11. Shows a back view of said "cellular telephone touch screen remote control". Reference number 86 shows said touch screen remote control "input'. Reference number 94 shows said touch screen remote control "holding clip" in accordance with another embodiment. FIG. 12. Shows, reference number 93 "reverse side of touch screen remote control". Reference number 86 shows said "input". Reference number 94 "holding clip" in accordance with another embodiment. FIG. 13. Shows side view of said cellular telephone touch screen remote control". Reference number "remote control clip" which is optional in accordance with another embodiment. FIG. 14. Shows a side view of reference number 82 "cellular telephone touch screen remote control". Reference number 95 shows "remote control clip hinge" in accordance with another embodiment. FIG. 15. Shows a bottom view of said cellular telephone lying flat. Reference number 65 cellular telephone "input" in accordance with another embodiment. FIG. 16. Shows right side of said cellular telephone lying flat. Reference number 76 cellular telephone "monitor screen retracted" in accordance with another embodiment. FIG. 17. Shows a right-side view of said cellular telephone lying flat. Reference number 77 cellular telephone "monitor screen protracting" slowly protracting outward extending from within the inner body of said cellular telephone in accordance with another embodiment. FIG. 18. Shows a right-side view of said cellular telephone lying flat. Reference number 78 cellular telephone monitor screen slowly protracting extending from within the inner body of said cellular telephone at a slanted declined angle in accordance with another embodiment. FIG. 19. Shows a right-side view of said cellular telephone lying flat. Reference number 79 shows said cellular telephone monitor screen slowly protracting extending from within the inner body of said cellular telephone at a slanted inclined angle in accordance with another embodiment. FIG. 20. Shows a right-side view of said cellular telephone lying flat. Reference number 80 shows said cellular telephone monitor screen slowly protracting extending from within the inner body of said cellular telephone at a slanting horizontal angle in accordance with another embodiment. FIG. 21. Shows a right-side view of said cellular telephone lying flat. Reference number 81 shows said cellular telephone monitor screen slowly protracting extending from within the inner body of said cellular telephone in an upward reverse horizontal angle in accordance with another embodiment. FIG. 22. Shows a left side view of said cellular telephone lying flat. Reference number 76 "monitor screen retracted" in accordance with another embodiment. FIG. 23. Shows left side of said cellular telephone lying flat. Reference number 77 shows said cellular telephone monitor screen slowly protracting outward extending from within the inner body of said cellular telephone in accordance with another embodiment. FIG. 24. Shows a left side view of said cellular telephone lying flat. Reference number 78 monitor screen protracting at a slanted declined angle in accordance with another embodiment. FIG. 25. Shows left side view of said cellular telephone lying flat. Reference number 79 shows said cellular telephone monitor screen slowly protracting from within the inner body of said cellular telephone at a inclined angle in accordance with another embodiment. FIG. 26. Shows a left side view of said cellular telephone lying flat. Reference number 80 shows said cellular telephone monitor screen slowly protracting extending from within the inner body of said cellular telephone in an upward slanted horizontal angle in accordance with another embodiment. FIG. 27. Shows a left side view of said cellular telephone lying flat. Reference number 81 shows said cellular telephone monitor screen slowly protracting extending from within the inner body of said cellular telephone in an upward slanted reverse horizontal angle with said monitor screen facing north in accordance with another embodiment. FIG. 28. Shows a left side view of said cellular telephone lying flat. Reference number 76 shows said cellular telephone monitor screen full retracted in accordance with another embodiment. FIG. 29. Shows a left side view of said cellular telephone lying flat. Reference number 77 shows said cellular telephone monitor screen slowly protracting upward extending from within the inner body of said cellular telephone in accordance with another embodiment.

Figure 30:
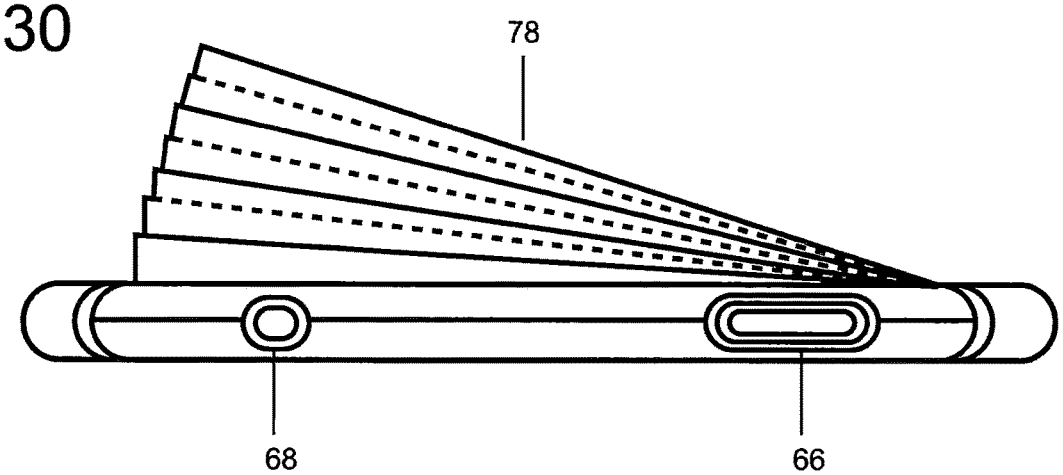
FIG. 30 shows a left-side view of the inventive cellular telephone with a slowly protracting monitor screen in accordance with another embodiment.
Figure 33:
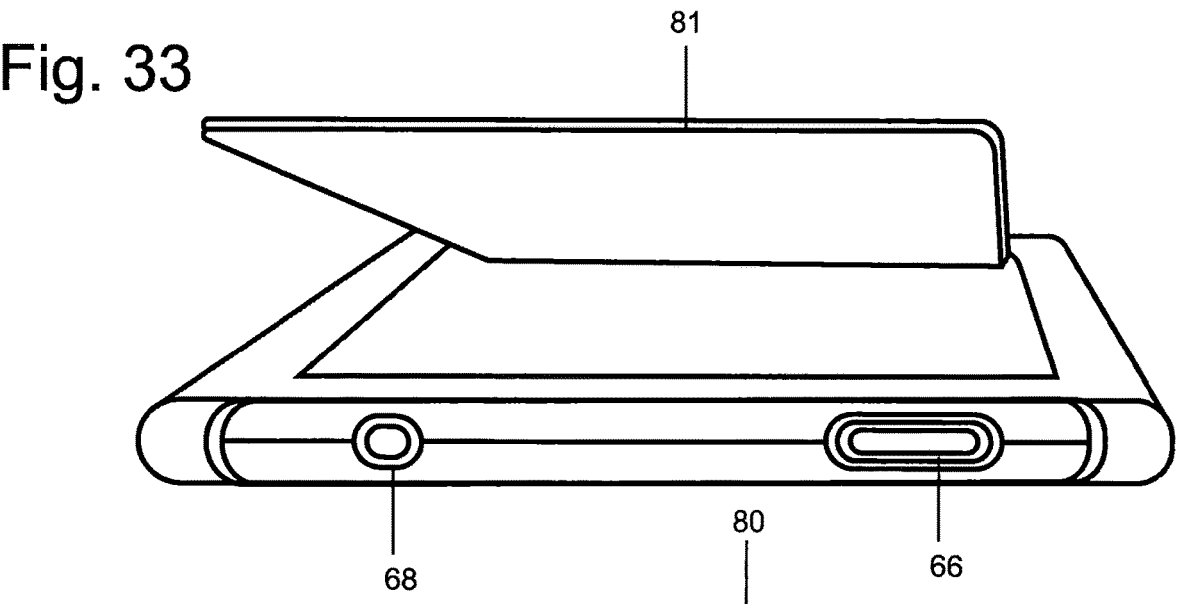
FIG. 33 shows a left-side view of the inventive cellular telephone with a slowly protracting monitor screen in accordance with another embodiment.
Figure 32:
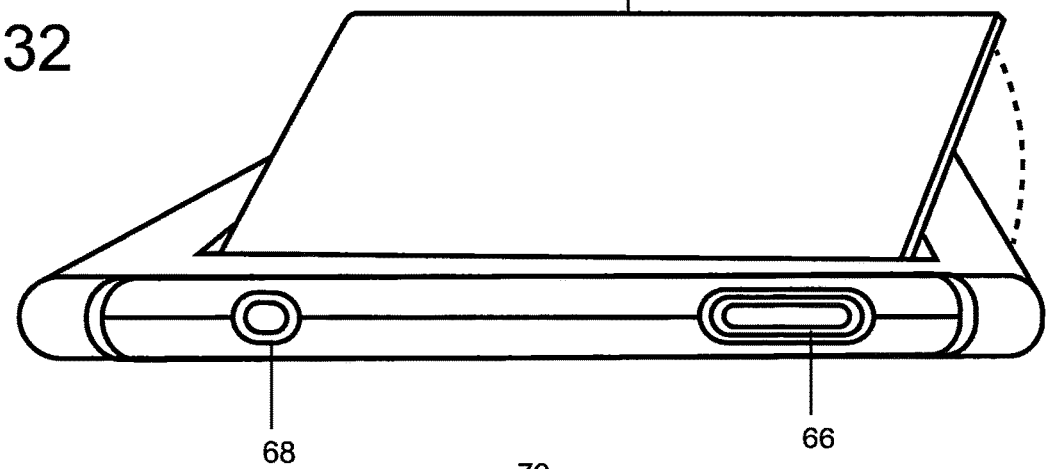
FIG. 32 shows a left-side view of the inventive cellular telephone with a slowly protracting monitor screen in accordance with another embodiment.
Figure 31:
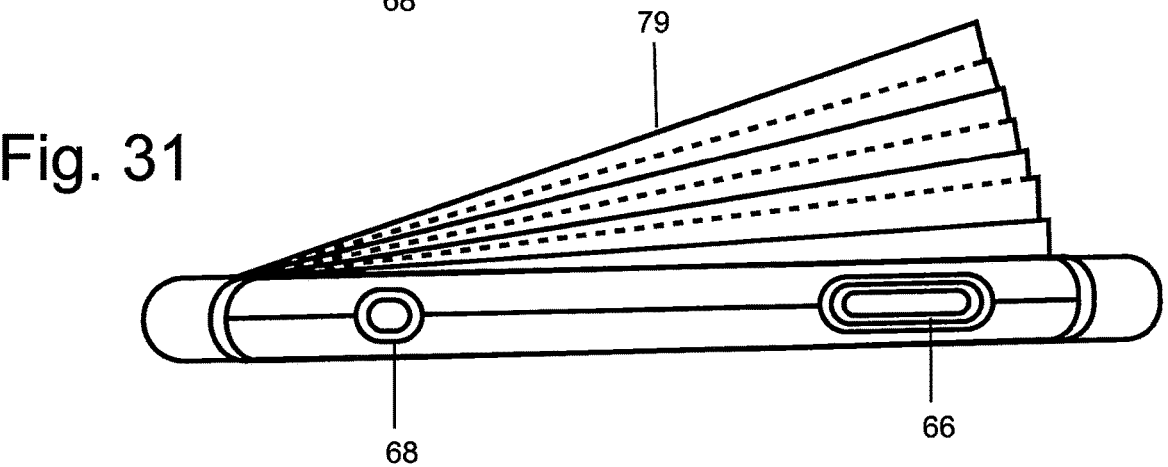
FIG. 31 shows a left-side view of the inventive cellular telephone with a slowly protracting monitor screen in accordance with another embodiment.

FIG. 30. Shows a left side view of said cellular telephone lying flat. Reference number 78 shows said cellular telephone monitor screen slowly protracting extending outward from within the inner body of said cellular telephone at a slanted declined angle in accordance with another embodiment. FIG. 31. Shows a left side view of said cellular telephone lying flat. Reference number 79 shows said cellular telephone monitor screen slowly protracting extending from within the inner body of said cellular telephone at a slanted inclined angle in accordance with another embodiment. FIG. 32. Shows a left side view of said cellular telephone lying flat. Reference number 80 shows said cellular telephone monitor screen slowly protracting extending from within the inner body of said cellular telephone at an upward slanting horizontal angle in accordance with another embodiment. FIG. 33. Shows a left side view of said cellular telephone lying flat.

Figure 34:
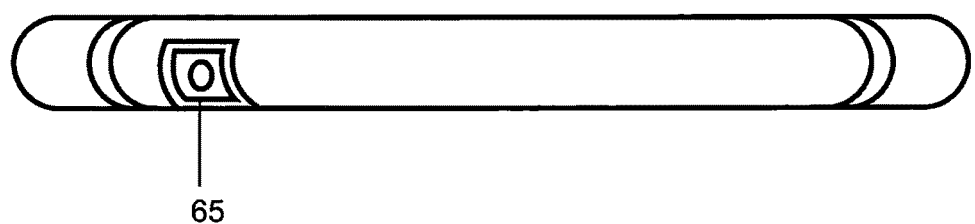
FIG. 34 shows a bottom view of the inventive cellular telephone featuring an input outlet.
Figure 37:
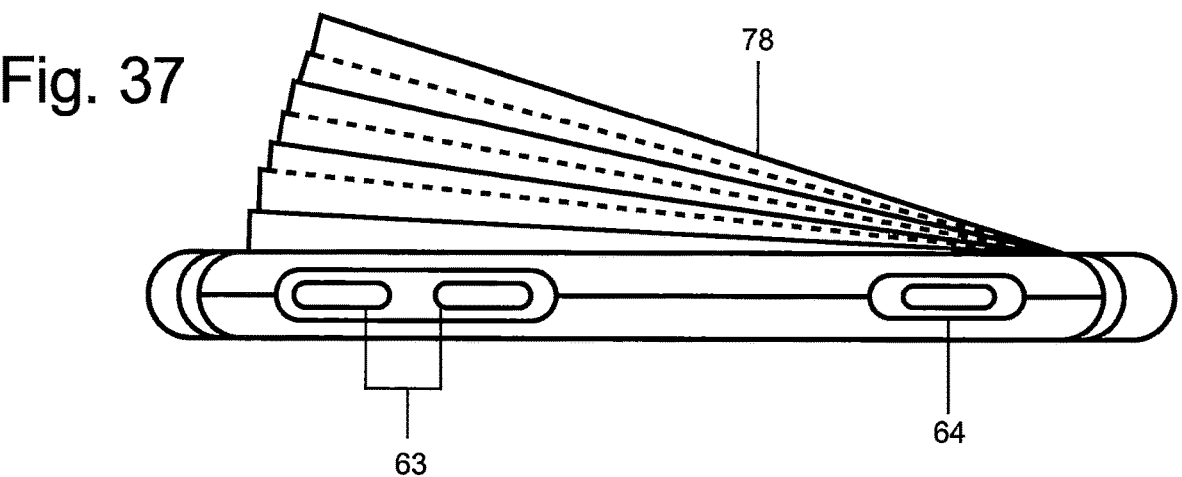
FIG. 37 shows a back view of the inventive cellular telephone with a full-length rear camera slowly protracting in accordance with another embodiment.
Figure 36:
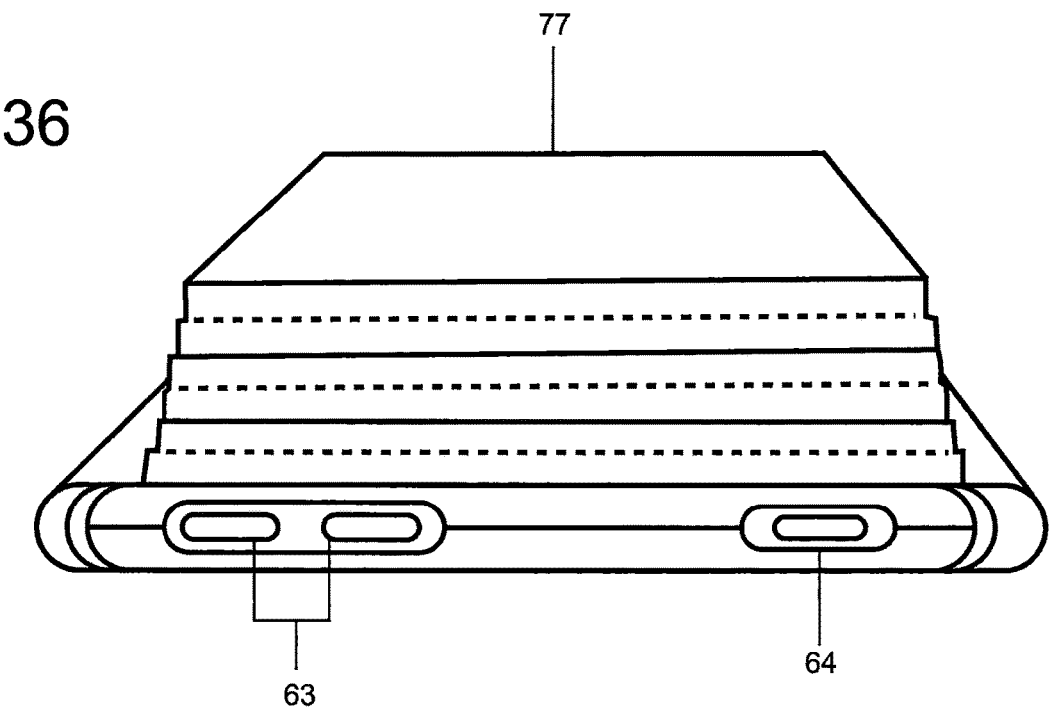
FIG. 36 shows a back view of the inventive cellular telephone with a full-length rear camera slowly protracting in accordance with another embodiment.
Figure 35:
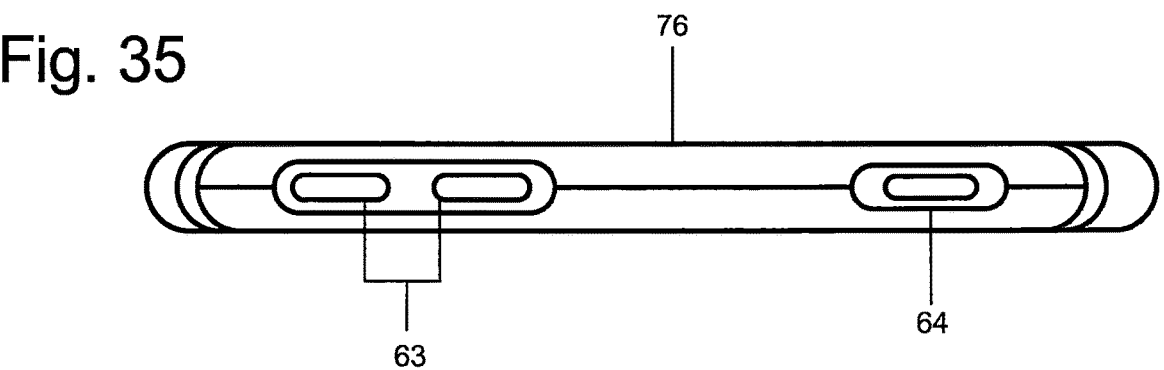
FIG. 35 shows a back view of the inventive cellular telephone with a full-length rear camera in accordance with another embodiment.

Reference number 81 shows said cellular telephone monitor screen slowly protracting extending from within the inner body of said cellular telephone in an upward reverse horizontal angle with said monitor screen facing north in accordance with another embodiment. FIG. 34. Shows a bottom view of said cellular telephone lying flat. Reference number 65 shows said cellular telephone "input" outlet. FIG. 35. shows a back view of said cellular telephone lying flat with said cellular telephone full length rear camera facing upright in accordance with another embodiment. FIG. 36. Shows a back view of said cellular telephone lying flat. Reference number 77 shows said cellular telephone full length rear camera slowly protracting extending from within the inner body of said cellular telephone in accordance with another embodiment. FIG. 37. Shows a back view of said cellular telephone lying flat. Reference number 78 shows said cellular telephone full length rear camera slowly protracting from within the inner body of said cellular telephone at a slanted declined angle in accordance with another embodiment.

Figure 40:
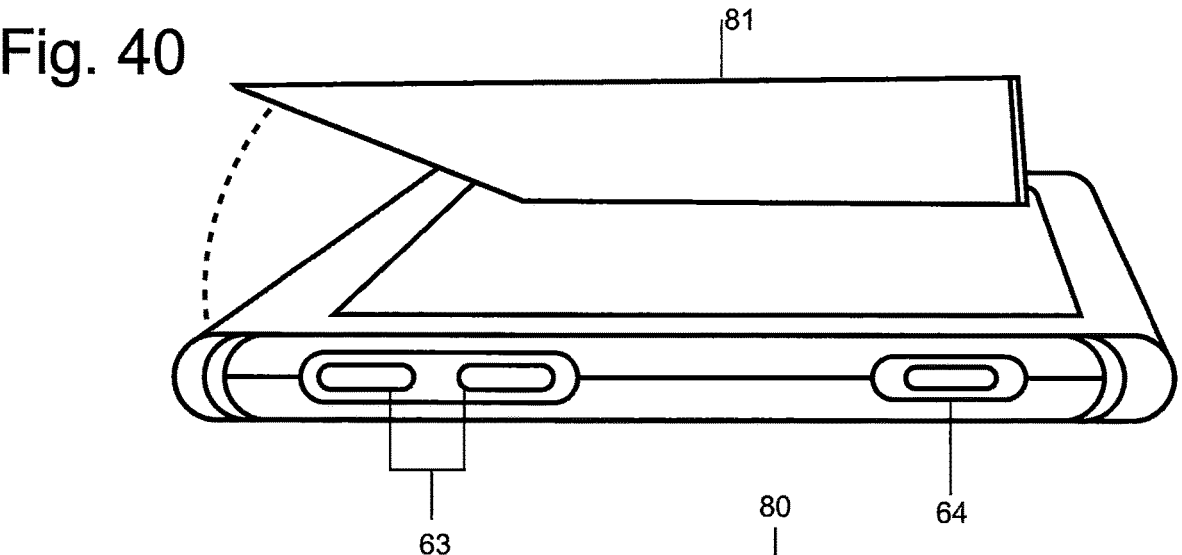
FIG. 40 shows a back view of the inventive cellular telephone with a full-length rear camera slowly protracting in accordance with another embodiment.
Figure 39:
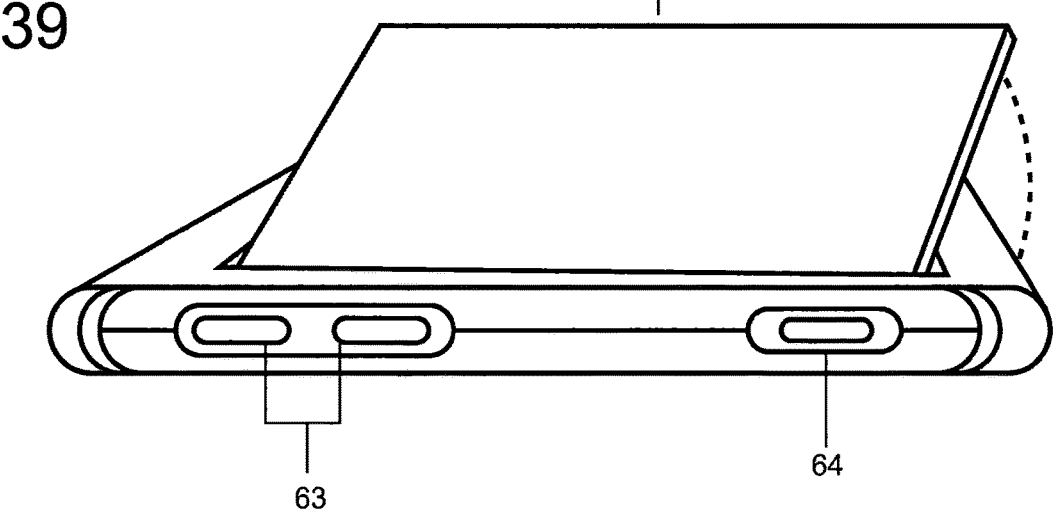
FIG. 39 shows a back view of the inventive cellular telephone with a full-length rear camera slowly protracting in accordance with another embodiment.
Figure 38:
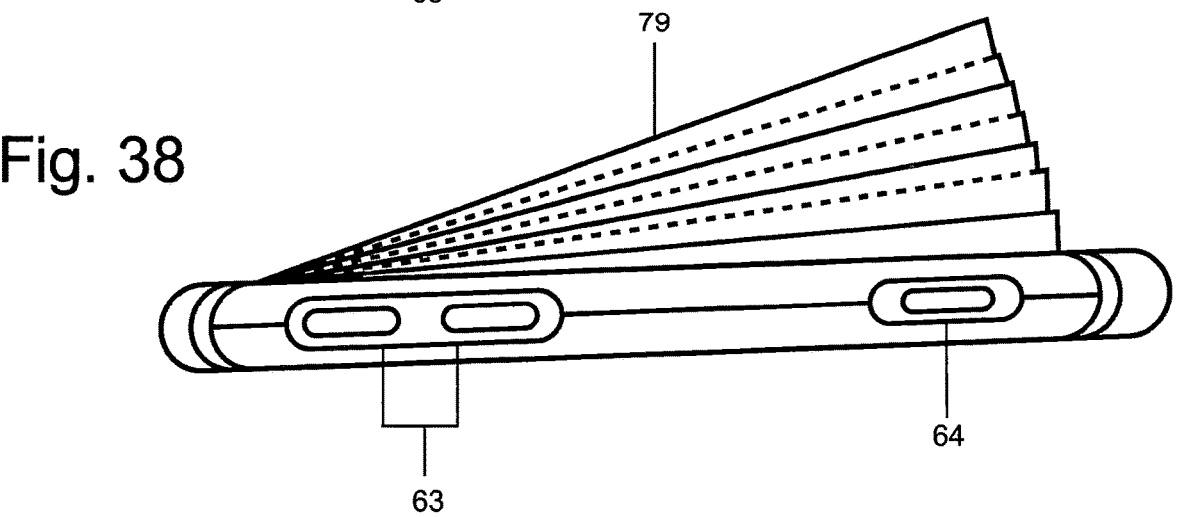
FIG. 38 shows a back view of the inventive cellular telephone with a full-length rear camera slowly protracting in accordance with another embodiment.
Figure 43:
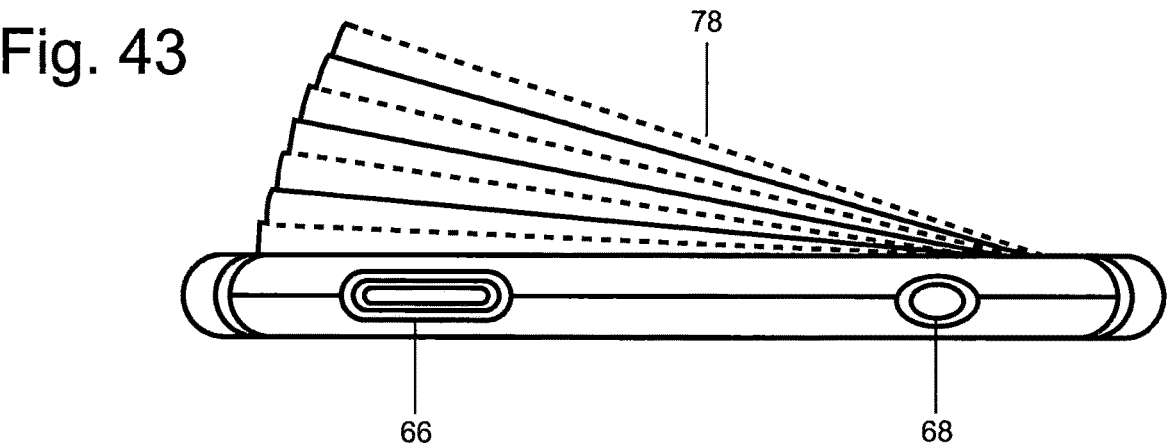
FIG. 43 shows a back view of the inventive cellular telephone with a full-length rear camera slowly protracting in accordance with another embodiment.
Figure 42:
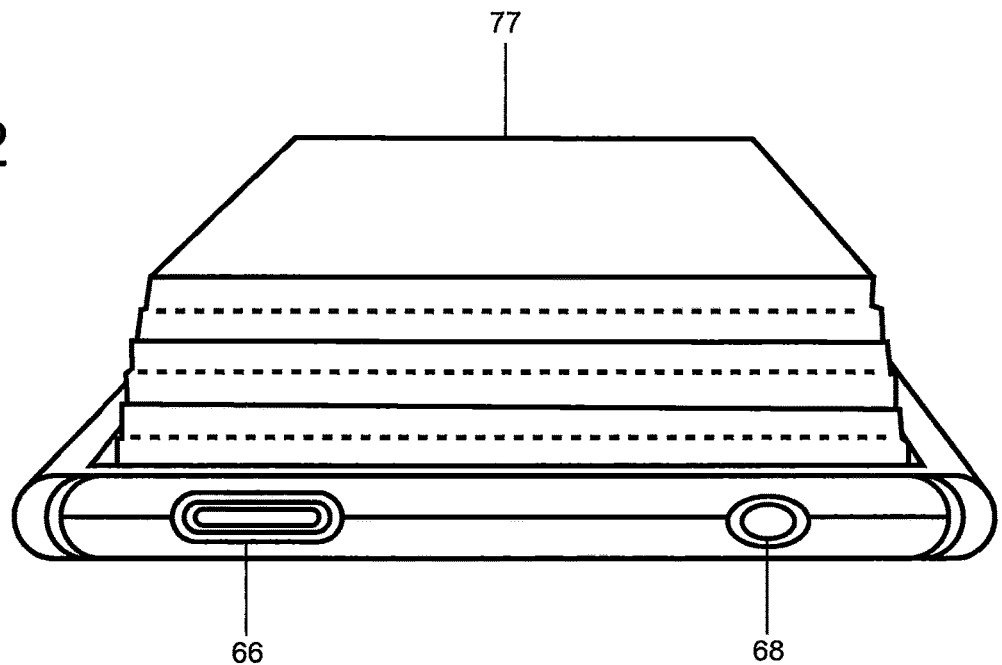
FIG. 42 shows a back view of the inventive cellular telephone with a full-length rear camera slowly protracting in accordance with another embodiment.
Figure 41:
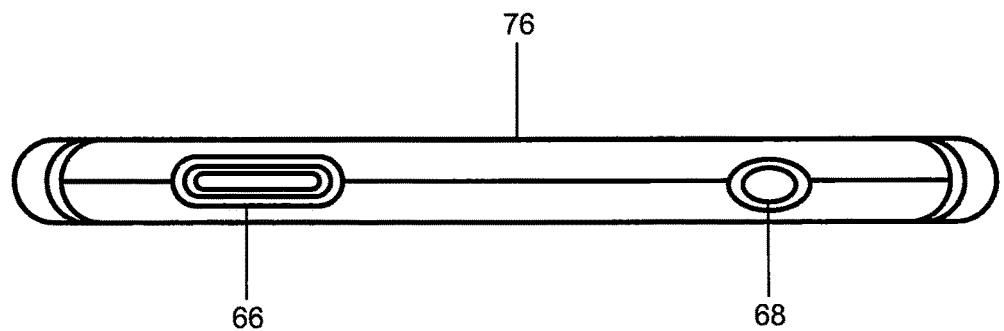
FIG. 41 shows a back view of the inventive cellular telephone with a fully retracted full length rear camera in accordance with another embodiment.

FIG. 38. Shows a back view of said cellular telephone lying flat. Reference number 79 shows said cellular telephone full length rear camera slowly protracting from within the inner body of said cellular telephone at a slanted inclined angle in accordance with another embodiment. FIG. 39. Shows a back view of said cellular telephone lying flat. Reference number 80 shows said cellular telephone full length rear camera slowly protracting from within the inner body of said cellular telephone in an upward horizontal angle in accordance with another embodiment. FIG. 40. Shows a back view of said cellular telephone lying flat. Reference number 81 shows said cellular telephone full length rear camera slowly protracting extending from within the inner body of said cellular telephone at a reverse horizontal angle in accordance with another embodiment. FIG. 41. Shows a back view of said cellular telephone lying flat exposing the right side of said cellular telephone. Reference number 76 shows said full length rear camera facing upright fully retracted in accordance with another embodiment. FIG. 42. Shows a back view of said cellular telephone lying flat also exposing the right side of said cellular telephone. Reference number 77 shows said full length rear camera slowly protracting extending out the body of said cellular telephone in accordance with another embodiment. FIG. 43. Shows a back view of said cellular telephone lying flat exposing the right side of said cellular telephone. Reference number 78 shows said full length rear camera slowly protracting from out of the inner body of said cellular telephone at a declined angle in accordance with another embodiment.

Figure 46:
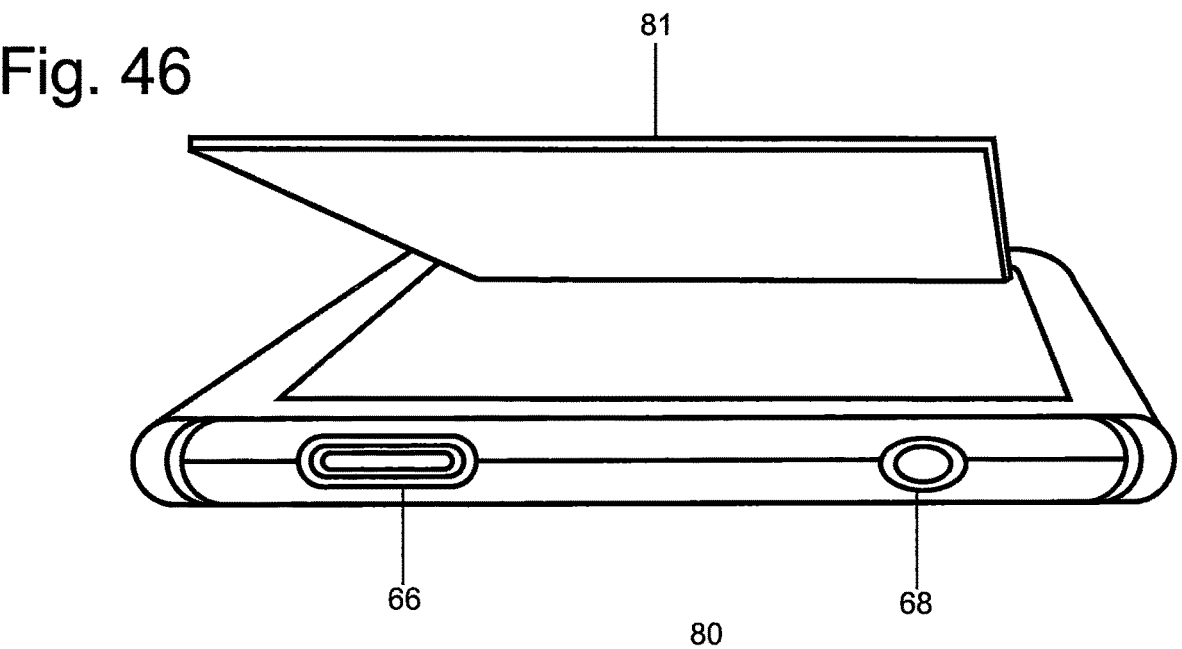
FIG. 46 shows a back view of the inventive cellular telephone with a full-length rear camera slowly protracting in accordance with another embodiment.
Figure 45:
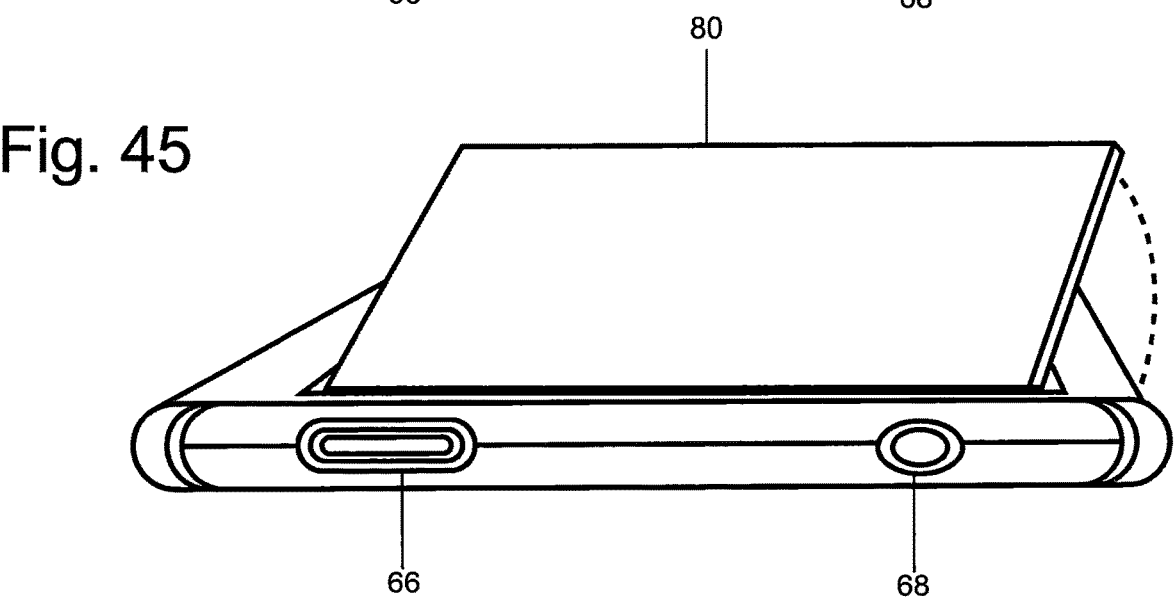
FIG. 45 shows a back view of the inventive cellular telephone with a full-length rear camera slowly protracting in accordance with another embodiment.
Figure 44:
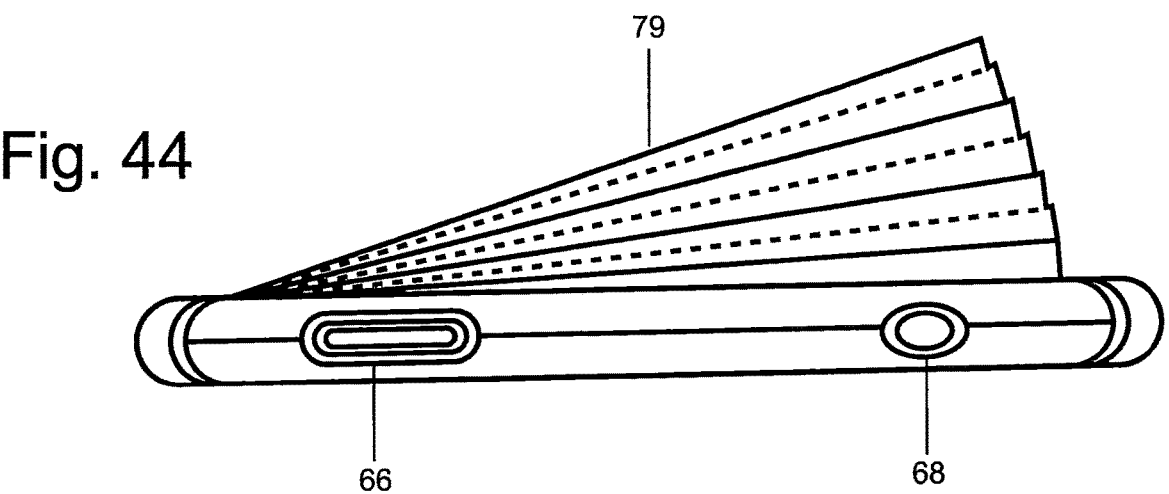
FIG. 44 shows a back view of the inventive cellular telephone with a full-length rear camera slowly protracting in accordance with another embodiment.
Figure 49:
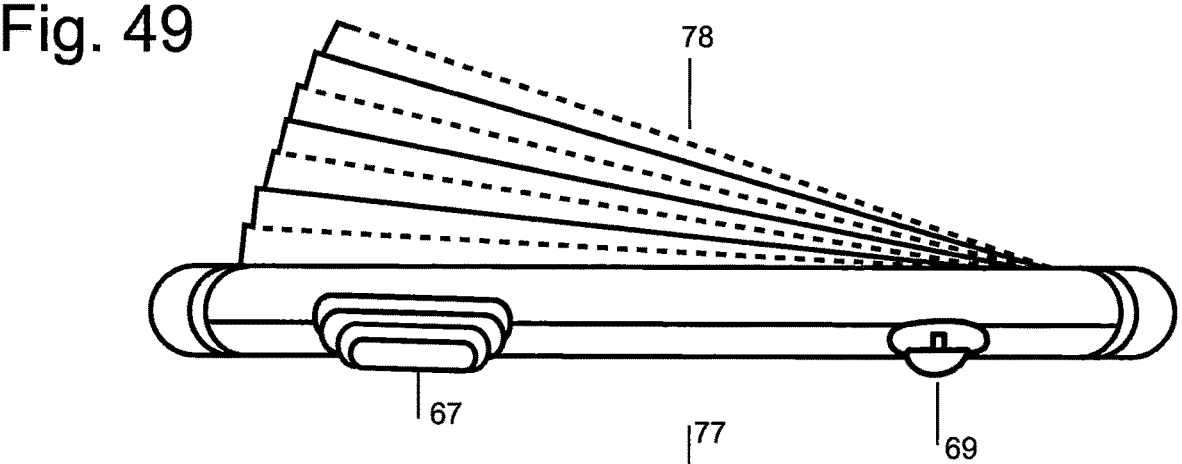
FIG. 49 shows a back view of the inventive cellular telephone with a full-length rear camera slowly protracting in accordance with another embodiment.
Figure 48:
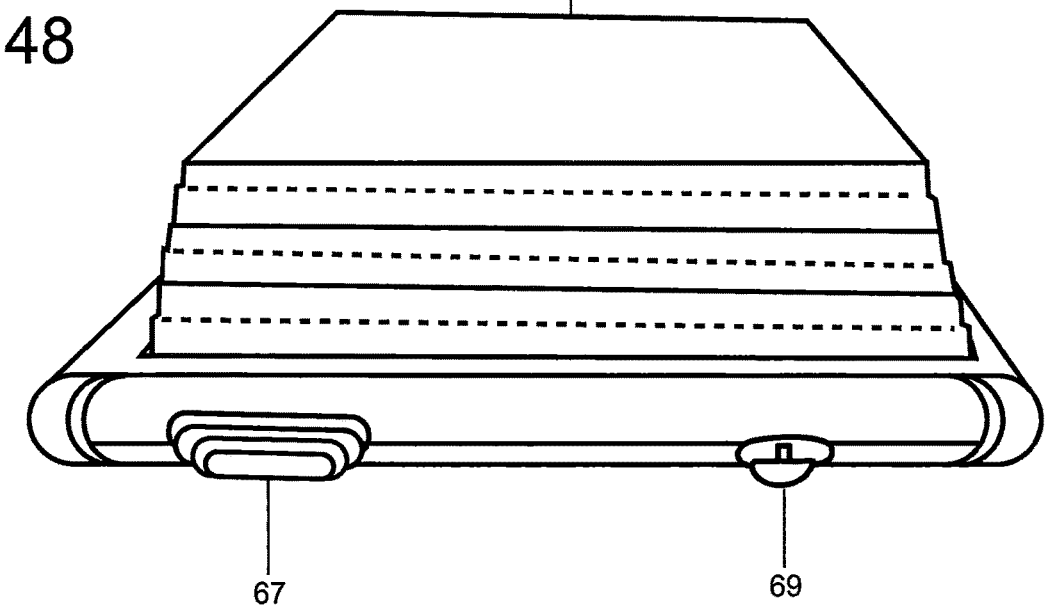
FIG. 48 shows a back view of the inventive cellular telephone with a full-length rear camera slowly protracting in accordance with another embodiment.
Figure 47:
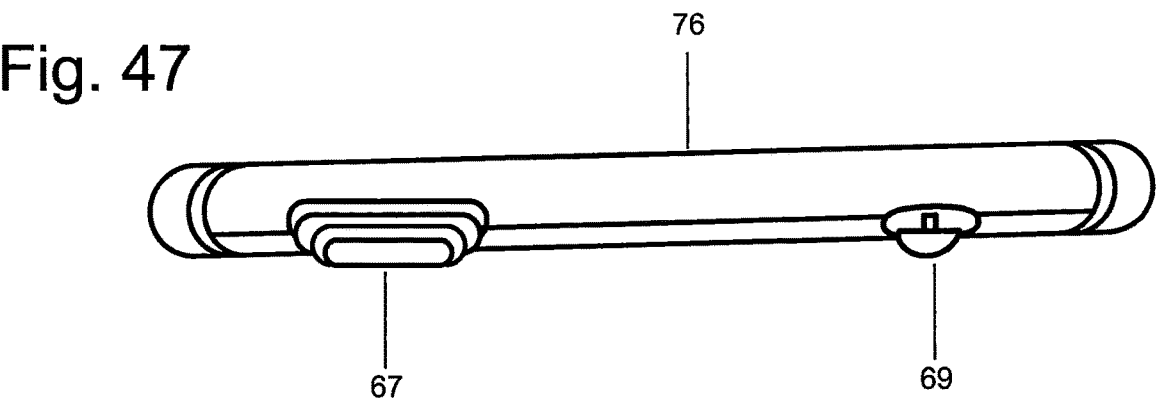
FIG. 47 shows a back view of the inventive cellular telephone with a fully retracted full length rear camera in accordance with another embodiment.
Figure 50:
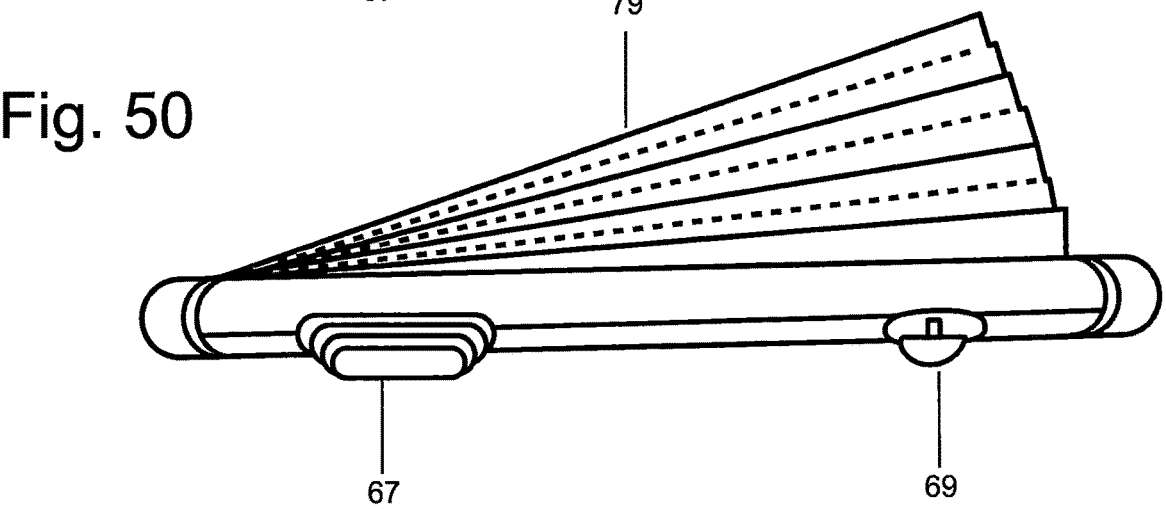
FIG. 50 shows a back view of the inventive cellular telephone with a full-length rear camera slowly protracting in accordance with another embodiment.

FIG. 44. Shows a back view of said cellular telephone lying flat exposing the right side of said cellular telephone. Reference number 79 shows said full length rear camera slowly protracting out of the inner body of said cellular telephone at a slanted inclined angle in accordance with another embodiment. FIG. 45. Shows a back view of said cellular telephone lying flat also exposing the right side of said cellular telephone. Reference number 80 shows said full length rear camera slowly protracting extending from within the inner body of said cellular telephone in an upward slanting horizontal angle in accordance with another embodiment. FIG. 46. Shows a back view of said cellular telephone lying flat exposing the right side of said cellular telephone. Reference number 81 shows said full length rear camera slowly protracting extending from within the inner body of said cellular telephone in an upward reverse horizontal angle with said full length rear camera facing north in accordance with another embodiment. FIG. 47. Shows a back view of said cellular telephone lying flat exposing the right side of said cellular telephone with said full length rear camera facing upright and fully retracted in accordance with another embodiment. FIG. 48. Shows a back view of said cellular telephone lying flat exposing the right side of said cellular telephone. Reference number 77 shows said full length rear camera slowly protracting upward extending from within the inner body of said cellular telephone in accordance with another embodiment. FIG. 49. Shows a back view of said cellular telephone lying flat exposing the right side of said cellular telephone. Reference number 78 shows said full length rear camera slowly protracting from within the inner body of said cellular telephone at a slanted declined angle in accordance with another embodiment. FIG. 50. Shows a back view of said cellular telephone lying flat exposing the right side of said cellular telephone. Reference number 79 shows said full length rear camera slowly protracting from within the inner body of said cellular telephone at a slanted inclined angle in accordance with another embodiment.

Figure 52:
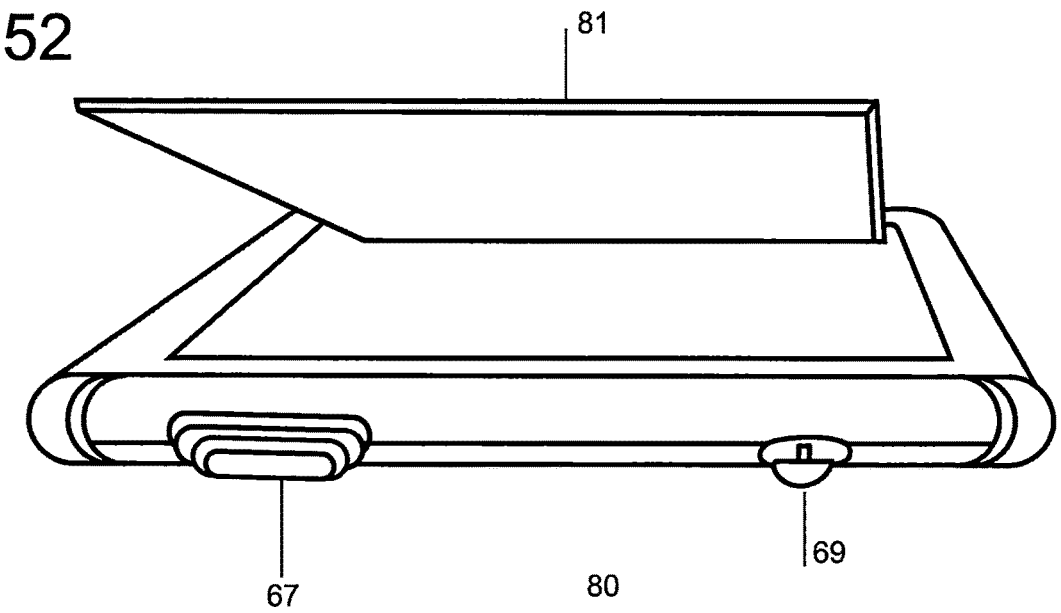
FIG. 52 shows a back view of the inventive cellular telephone with a full-length rear camera slowly protracting in accordance with another embodiment.
Figure 51:
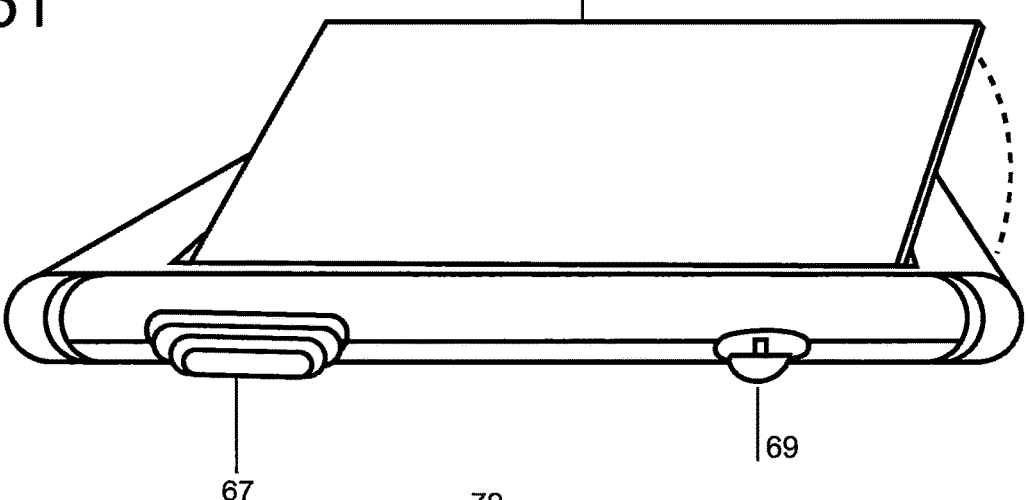
FIG. 51 shows a back view of the inventive cellular telephone with a full-length rear camera slowly protracting in accordance with another embodiment.
Figure 53:
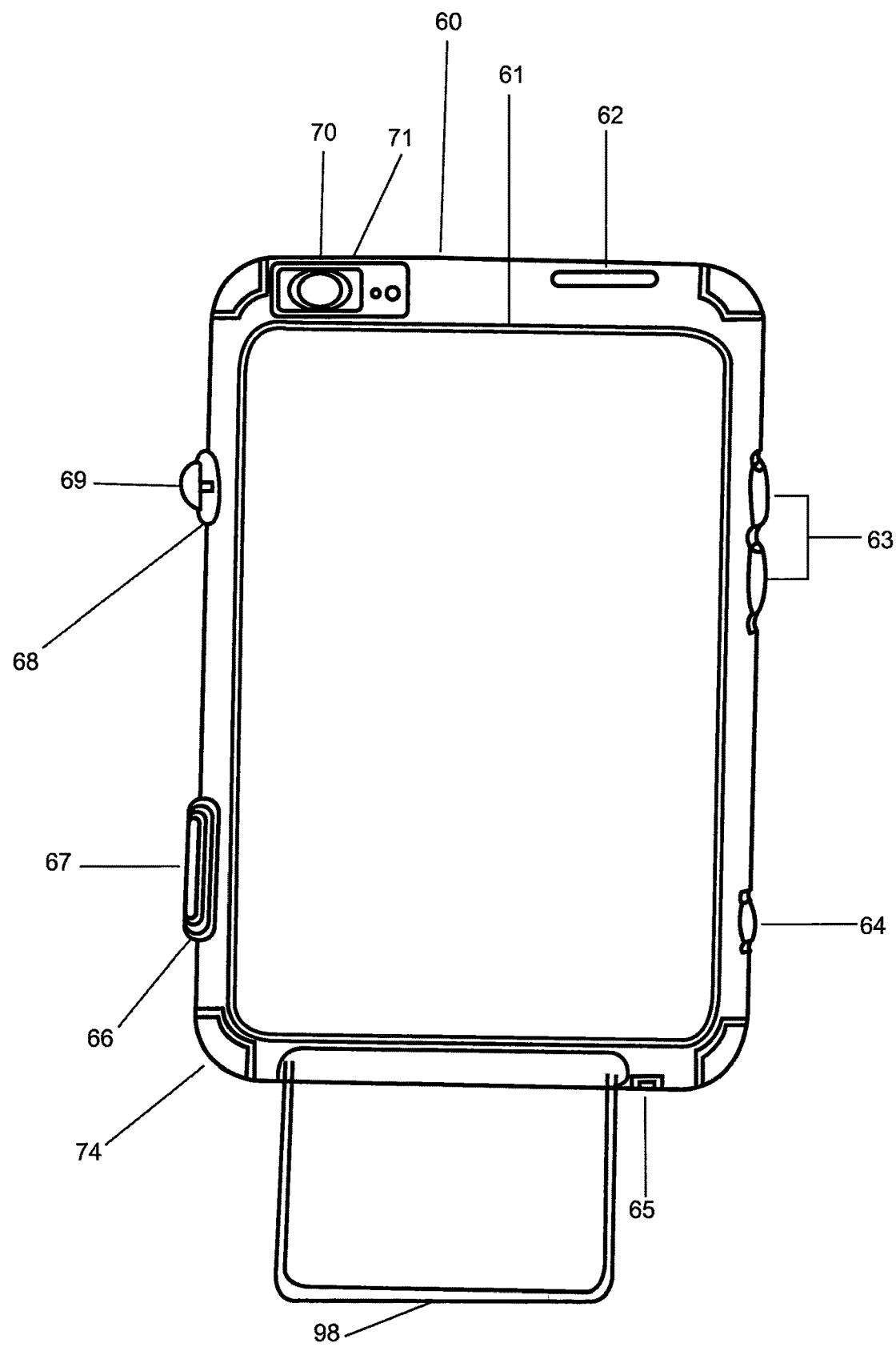
FIG. 53 shows a bottom view of the inventive cellular telephone featuring a touch screen remote control compartment.

FIG. 51. Shows a back view of said cellular telephone lying flat exposing the right side of said cellular telephone. Reference number 80 shows said cellular telephone full length rear—camera slowly protracting extending from within the inner body of said cellular telephone in an upward slanting horizontal angle in accordance with another embodiment. FIG. 52. Shows a back view of said cellular telephone lying flat exposing the right side of said cellular telephone. Reference number 81 shows said cellular telephone full length rear camera slowly protracting outward extending from within the inner body of said cellular telephone in an upward slanting reverse horizontal angle with said full length rear camera facing north in accordance with another embodiment. FIG. 53. Shows a bottom view of said cellular telephone lying flat exposing the bottom side of said cellular telephone. Reference number 98 shows said, "cellular telephone touch screen remote control compartment". Which is a hidden compartment designed to hold and secure the cellular telephone touch screen remote control.

Form 8-1: Drawing Reference Numerals Worksheet

| REFERENCE NUMBERS: | PART NAMES: |
|---|---|
| 60 | Cellular telephone |
| 61 | Monitor screen "retracted"/Monitor screen "protracted" |
| 62 | Speaker/receiver |
| 63 | Volume buttons |
| 64 | Power button |
| 65 | Input |
| 66 | Speaker/transmitter button |
| 67 | Speaker/transmitter pyramid (protracted |
| 68 | Joy stick button |
| 69 | Joy stick (protracted) |
| 70 | Monitor camera |
| 71 | Monitor camera (protracted) |
| 72 | Full length rear camera design |
| 73 | Full length rear camera (functions) |
| 74 | Grips |
| 75 | Full length rear camera component |
| 76 | Monitor screen/Full length rear camera (retracted) |
| 77 | Monitor screen/Full length rear camera protracting (outward) |
| 78 | Monitor screen/Full length rear camera protracting (decline) |
| 79 | Monitor screen/Full length rear camera protracting (incline) |
| 80 | Monitor screen/Full length rear camera protracting (horizontal) |
| 81 | Monitor screen/Full length rear camera protracting reverse (horizontal) |
| 82 | Cellular telephone (touch screen remote control) |
| 83 | Protraction button |
| 84 | Volume buttons |
| 85 | Remote control power button |
| 86 | Remote control input |
| 87 | Retraction button |
| 88 | 360° degree rotation dial |
| 89 | Snap picture button |
| 90 | Speaker pyramid button |
| 91 | Cellular telephone programing/setting button |
| 92 | Touch screen remote control monitor |
| 93 | Reverse side of remote control |
| 94 | Remote control clip |
| 95 | Remote control clip hinge |
| 96 | Secondary tech full length rear camera (design) |
| 97 | Secondary tech full length rear camera (protracting) |
| 98 | Cellular telephone (touch screen remote control compartment) |

DETAILED DESCRIPTION—FIGS. 1 THROUGH 53

One embodiment of the cellular telephone is illustrated in FIG. 1. Front view, 60 shows said cellular telephone which is an instrument or system for conveying speech over distance by converting sound into electronic impulses sent through a computer-controlled communication system. Said cellular telephone is a handheld electronic device manufactured with various electronic components various plasticized materials. Said cellular telephone is oblong in shape measurements are optional. Another embodiment is cellular telephone monitor screen fully "retracted" which is designed to depict images program settings and communications. Said cellular telephone monitor screen can also physically rotate and maneuver in a full and complete 360 degree angle rotation while remaining within the inner body/frame of said cellular telephone in synchronization with said cellular telephone monitor screen camera.

Which will provide the user with an ultra-wide-angle rotation and a variety of innovative options when capturing dimensional images. Said cellular telephone monitor screen and monitor screen camera can be operated and controlled via reference number 69 "Joystick protracted" feature or as an alternative via reference number 82 said "cellular telephone touch screen remote control" feature in which will further allow the user to maintain a visual of all images depicted or said cellular telephone monitor screen. Said cellular telephone monitor screen can be manufactured with various plasticized materials or thermo plasma materials or any other material that is used to manufacturing monitor screens. Said cellular telephone is oblong in shape measurements are optional. Another embodiment 62 shows said cellular telephone speaker/receiver which is designed to allow the user to hear emitted sounds and transmitted communications. Said cellular telephone speaker/receiver can be manufactured with various plasticized materials or various rubber materials shapes and measurements are optional.

Another embodiment 63 shows said cellular telephone up and down volume buttons which are designed to allow the user to control and adjust audio frequencies. Said up and down buttons can be manufactured with various plasticized materials or various rubber materials. Said up and down buttons are oblong in shape measurements are optional. Another embodiment 64 shows said cellular telephone power button which is designed to allow the user to turn said cellular telephone power on when initially pressed down and to cut said cellular telephone power off when pressed down a second time. Said power button can be manufactured with various plasticized materials or various rubber materials. Said power button is circular in shape measurements are optional.

Another embodiment 65 shows the cellular telephone input which is a terminal connector for receiving electronic power or signal in which powers said cellular telephone via cellular telephone battery charger when plugged into an electrical socket or conductor. Said input can be manufactured with various plasticized materials. Said input is circular in shape measurements are optional. Another embodiment 74 shows said cellular telephone grips which are designed to provide the user with stability when positioning said cellular telephone when taking photographs video recording selfies face timing and gaming and serves as a screen protector for said cellular telephone monitor screen and "full length rear camera(s)". Said grips can be manufactured with various rubber materials shapes and measurements are optional. Another embodiment 66 shows said cellular telephone "Speaker/transmitter button" which is designed to protract reference number 67 said cellular telephone "Speaker/transmitter pyramid protracted" when initially pressed down and serves as a speaker which allows the user to listen to music through a much larger and protractible speaker system. And serves as a transmitter that allows the user to convert speech/sound into electronic impulses for transmission. Said "Speaker/transmitter button" can be manufactured with various plasticized materials or various rubber materials. Said "Speaker" can be manufactured with various plasticized materials and various metaled materials encompassing a minute magnet at its base connected to an electronic circuit wiring circuit board with plasticized materials covering said wiring and can also include cardboard materials in which can be used to manufacture the inner circumference of the speakers walls shapes and measurements are optional. Another embodiment 67 shows said cellular telephone "Speaker/transmitter pyramid protracting" from within the inner body of said cellular telephone creating a four level speaker/transmitter pyramid which is designed to provide the user with capturing a clear sharp crisp and louder sound when communicating via said cellular telephone or while communicating via said cellular telephone speaker phone or while listening to music via said cellular telephone. Said cellular telephone "Speaker/transmitter pyramid protracted" slowly retracts returning to the inner body of said cellular telephone when pressed down. Said cellular telephone "Speaker/transmitter pyramid protracted" can also be protracted or retracted via reference number 90 "Speaker pyramid button" in which is found at reference number 82 "Cellular telephone touch screen remote control" feature. Said reference number 90 "Speaker/transmitter pyramid button" protracts said cellular telephone reference number 67 "Speaker/transmitter pyramid" when initially pressed down and retracts said cellular telephone "Speaker/transmitter pyramid" when pressed down a second time. Said "Speaker/transmitter pyramid protracted" can be manufactured with various plasticized materials and various metaled materials that encompass a minute magnet at its base connected to an electronic wiring circuit board with plasticized materials covering said wiring and can also include cardboard materials in which can be used to manufacture the inner circumference of the speaker's walls.

Another embodiment 68 shows said cellular telephone "Joystick button" which is designed to protract reference number 69 said cellular telephone "Joystick" when initially pressed down. Said cellular telephone "Joystick protracted" slowly retracts back inside of the inner body of said cellular telephone when pressed down by the user for 2 seconds reverting to said, "Joystick button". Said "Joystick button" can be manufactured with various plasticized materials or various rubber materials shapes and measurements are optional. Another embodiment 69 shows said cellular telephone joystick slowly protracting from within the inner body of sad cellular telephone. Said cellular telephone joy stick feature is a manual device connected to said cellular telephone terminal serving as a control lever that can be tilted in various directions to operate rotate and maneuver said cellular telephone monitor screen and monitor screen camera in synchronization and can also be programmed to operate rotate and maneuver said full length rear camera(s) as follows: Joy stick twisted to the right slowly protracts reference numbers 61 "monitor screen" and reference number 70 "monitor screen camera" in synchronization creating a zooming effect and can also protract reference number 73 "full length rear camera functions" or reference number 75 "full length rear camera component" and reference number 96 "secondary tech full length rear camera design" in the same manner when programmed via said cellular telephone programming and setting features. Joystick moved forward will slowly tilt reference number 61 said cellular telephone "monitor screen" and reference number 70 "monitor camera" or reference number 71 "monitor camera protracted" in a downward angle in synchronization. And can also tilt said "full length rear camera(s)" in the same manner when programmed via said cellular telephone programming and setting features.

Joystick moved backwards will slowly tilt said reference numbers 61 said cellular telephone "monitor screen" and reference number 70 "monitor camera" or reference number 71 "monitor camera protracted" in an upward angle in synchronization. And can also tilt reference number 72 "full length camera design" and reference number 96 "secondary tech full length rear camera design" and reference number 97 "secondary tech full length rear camera protracting" as well as their component said reference number 75 "full length rear camera component" in the same manner when programmed via said cellular telephone programming and setting feature. Joystick moved to the right will slowly tilt said reference number 61 cellular telephone "monitor screen" and reference number 70 "monitor screen camera" or reference number 71 "monitor camera protracting" to the right in synchronization". And can also tilt reference number 72 "full length rear camera design" and reference number 96 "secondary tech full length rear camera design" and reference number 97 "secondary tech full length rear camera protracting" and reference number 73 "full length rear camera functions" in the same manner when programmed via cellular telephone programming and setting features. Joystick moved to the left will slowly tilt said reference numbers 61 said cellular telephone "monitor screen" and reference number 70 "monitor camera" or reference number 71 "monitor camera protracted" to the left in synchronization. And can also tilt said reference numbers 72 "full length rear camera design" 96 "secondary tech full length rear camera design" and reference number 97 "secondary tech full length rear camera protracting" and reference number 73 "full length rear camera functions" as well as their component said reference number 75 "full length rear camera component" in the same manner when programed to do so via said cellular telephone programming and setting features. Joystick moved in a circular motion will slowly rotate and maneuver said cellular telephone reference number 61 "monitor screen" and reference number 70 "monitor camera" or reference number 71 "monitor camera protracted" in a full and complete 360 degree rotating angle capturing every direction including diagonally in synchronization. Said Joystick can also rotate, and maneuver said reference numbers 72 "full length rear camera design" and reference number 96 "secondary tech full length rear camera design" and reference number 97 "secondary tech full length rear camera protracting" and reference number 73 "full length rear camera functions" in the same manner when programmed via said cellular telephone programming and setting features. Tap Joystick down to snap photographs. The user will also have the option to set, and position said cellular telephone reference number 61 "monitor screen" and reference number 70 "monitor camera" or reference number 71 "monitor camera protracted" in synchronization then log into said cellular telephone programming and setting features and set and position said rear camera(s) to capture additional exotic angles and positions. Joystick twisted to the left will slowly retract said cellular telephone reference number 61 "monitor screen" and reference number 70 "monitor camera" or reference number 71 "monitor camera protracted". Said cellular telephone Joystick can be manufactured with various plasticized materials or various rubber materials. Another embodiment 70 shows said cellular telephone "monitor camera" which is designed to take photographs-video recording and face timing. Consist essentially of a close box containing a sensitized plate or film on which an image is formed when light enters the box through a lens or hole. Said monitor screen can be manufactured with various plasticized materials or thermo plastic plasma materials shapes and measurements are optional.

Another embodiment 71 shows said cellular telephone "monitor camera protracting" from the inner body of said cellular telephone. Which is designed to protract or retract and or rotate and maneuver in a full and complete 360 degree rotating angle including diagonally via said cellular telephone reference number 69 "Joystick protracted" feature or via reference number 82 "cellular telephone touch screen remote control" feature which include features such as reference number 83 "protraction button" and reference number 87 "retraction button" or reference number 88 "360 degree rotation dial" further providing the user with a ultra-wide angle and a variety of options when capturing dimensional images. Said "monitor screen camera" can be manufactured with various plasticized materials or thermo plastic plasma materials shapes and measurements are optional. Two embodiments of said cellular telephone are illustrated in FIG. 2 front view, 68 shows said cellular telephone "Joystick button" which is designed to protract reference number 69 "Joystick protracted" when initially pressed down. Said "Joystick button" can be manufactured with various plasticized materials or various rubber materials. Another embodiment 69 shows said cellular telephone "Joystick protracted" slowly protracting from within the inner body of said cellular telephone. Said cellular telephone Joystick feature is a manual device connected to said cellular telephone terminal serving as a control lever that can be tilted in various directions to operate rotate and maneuver said cellular telephone reference number 61 "monitor screen and reference number 70 "monitor camera" or reference number 71" monitor camera protracted" in synchronization and can also operate and maneuver said reference numbers 72 "full length rear camera design" reference number 96 "secondary tech full length rear camera design" and reference number 97 "secondary tech full length rear camera protracting" and reference number 73 "full length rear camera functions" and there component said reference number 75 "full length rear camera component" as follows:

Joystick twisted to the right will slowly protract reference number 61 "monitor screen" and reference number 70 "monitor camera" or reference number 71 "monitor camera protracted" in synchronization creating a zooming effect. Said Joystick can also protract said reference numbers 72 "full length rear camera design" reference number 96 "secondary tech full length rear camera design" and reference number 97 "secondary tech full length rear camera protracting" and reference number 73 "full length rear camera functions" and their component reference numbers 75 "full length rear camera component" in the same manner when programmed via cellular telephone programming and setting features. Joystick moved forward will slowly tilt said cellular telephone reference number "monitor screen" and reference number 70 "monitor camera" or reference number 71 "monitor camera protracted" in a downward angle in synchronization said Joystick can also tilt said reference numbers 72 "full length rear camera design" and reference number 96 "secondary tech full length rear camera design" and reference number 97 "secondary tech full length rear camera protracting" and reference number 73 "full length rear camera functions" and there component reference number 75 "full length rear camera component" in the same manner when programmed via said cellular telephone programming and setting features. Joystick moved backwards will slowly tilt said reference number 61 "monitor screen" and reference number 70 "monitor camera" or reference number 71 "monitor camera protracted" in an upward angle in synchronization. And can also tilt said reference numbers 72 "full length rear camera design" and said reference number 96 "secondary tech full length rear camera design" and reference number 97 "secondary tech full length rear camera protracting" and reference number 73 "full length rear camera functions" and their component said reference number 75 "full length rear camera component" in the same manner when programmed via said cellular telephone programming and setting features. Joystick moved to the right will slowly tilt said reference number 61 "monitor screen" and reference number 70 "monitor camera" or reference number 71 "monitor camera protracted" to the right in synchronization. And can also tilt said reference number 72 "full length rear camera design" and reference number 96 "secondary tech full length rear camera design" and reference number 97 "secondary tech full length rear camera protracting" and reference number 73 "full length rear camera functions" in the same manner when programmed via said cellular telephone programming and setting features. Joystick moved to the left will slowly tilt said reference number 61 "monitor screen" and reference number 70 "monitor camera" or reference number 71 "monitor camera protracted" to the right in synchronization. And can also tilt said reference numbers 72 "full length rear camera design" and reference number 96 "secondary tech full length rear camera design" and reference number 97 "secondary tech full length rear camera protracting" and reference number 73 "full length rear camera functions and their component said reference number 75 "full length rear camera component" in the same manner when programmed via said cellular telephone programming and setting features.

Joystick moved in a circular motion will slowly rotate and maneuver said cellular telephone reference number 61 "monitor screen" and reference number 70 "monitor camera" or reference number 71 "monitor camera protracted" in a full and complete 360 degree angle rotation capturing every direction including diagonally in synchronization. And can also rotate and maneuver said reference number 72 "full length rear camera design" and reference number 96 "secondary tech full length rear camera design" and reference number 97 "secondary tech full length rear camera protracting" and their component said reference number 75 "full length rear camera component" in the same manner when programmed via said cellular telephone programming and setting features. Tap joystick down to snap photographs. The user will also have the option to set and position said cellular telephone on any sustainable surface then log into said cellular telephone programming and setting features then set and position said reference number 72 "full length rear camera design" or reference number 96 "secondary tech full length rear camera design" or reference number 97 "secondary tech full length rear camera (protracting)" or reference number 73 "full length rear camera functions" and there component said reference number 75 "full length rear camera protracting" to capture additional exotic and dimensional angles when taking photographs—video recording—selfies—face timing and gaming. Joystick twisted to the left will slowly retract said reference number 61 "monitor screen and reference number 70 "monitor camera" or reference number 71 "monitor camera protracted" back inside of the inner body of said cellular telephone in synchronization. And can also retract said reference number 72 "full length rear camera design" or reference number 96 "secondary tech full length rear camera design" or reference number 97 "secondary tech full length rear camera protracting" or reference number 73 "full length rear camera functions and their component said reference number 75 "full length rear camera component" in the same manner when programmed via cellular telephone programming and setting features. Joystick held down for 2 seconds will slowly retract said Joystick back inside of the inner body of said cellular telephone reverting to said reference number 68 "joystick button". Said Joystick can be manufactured with various plasticized materials or various rubber materials shapes and measurements are optional. Another embodiment of said cellular telephone is illustrated in FIG. 3 Front view, 61 shows said cellular telephone "monitor screen" slowly protracting from within the inner body of said cellular telephone creating a zooming effect which is also designed to protract and retract and or rotate and maneuver in a full and complete 360 degree angle rotation via said cellular telephone reference number 69 "joystick protracted" feature or via said reference number 82 "cellular telephone touch screen remote control" feature which embodies reference number 83 "protraction button" which slow: protracts reference number 61 "monitor screen" and reference number 70 "monitor camera in synchronization. And can also protract said cellular telephone reference number 72 "full length rear camera design" and reference number 96 "secondary tech full length rear camera design" and reference number 97 "secondary tech full length rear camera protracting" and reference number 73 full length rear camera functions" and their component said reference number 75 "full length rear camera component" when programmed via cellular telephone programming and setting features. Reference number 87 "retraction button" slowly retracts said cellular telephone reference number 61 "monitor screen" and reference number 71 "monitor camera protracted" in synchronization. And can also retract said cellular telephone reference number 72 "full length rear camera design" and reference number 96 "secondary tech full length rear camera design".

And reference number 97 "secondary tech full length rear camera" and reference number 73 "full length rear camera functions". and their component said reference number 75 "full length rear camera component" when programed via said cellular telephone programming and setting features. Reference number 88 "360 degree rotation dial" allows the user to physically rotate and maneuver said reference number 61 monitor screen" and reference number 70 "monitor camera" and reference number 71 "monitor camera protracted" in synchronization. And can also rotate and maneuver said cellular telephone reference number 72 "full length rear camera design" and reference number 96 "secondary tech full length rear camera design" and reference number 97 "secondary tech full length rear camera protracting" and reference number 73 "full length rear camera functions" and their component said reference number 75 "full length rear camera component" when programmed via said cellular telephone programming and setting features. Helping the user in capturing ultra-wide angles as well as a variety of innovative options when taking photographs—video recording—selfies—face timing or gaming. Said cellular telephone reference number 61 "monitor screen" can be manufactured with various plasticized materials and thermo plastic materials and plasma materials said reference number 61 "monitor screen" is oblong in shape measurements are optional. Another embodiment of said cellular telephone is illustrated in FIG. 4 front view, 71 shows said cellular telephone "monitor camera" slowly protracting from within the inner body of said cellular telephone which is also designed to slowly retract and or rotate and maneuver in a full and complete 360 degree angle rotation in synchronization with said cellular telephone reference number 61 "monitor screen" and can protract retract and or rotate and maneuver in a full and complete 360 degree angle rotation while protracting or retracting via said cellular telephone reference number 69 "joystick protracted" feature or said via said reference number 83 "protraction button" which slowly protracts said cellular telephone reference number 61 "monitor screen" and said reference number 70 "monitor camera" or said reference number 71 "monitor camera protracted in synchronization. And can also protract said cellular telephone reference number 72 "full length rear camera design" and reference number 96 "secondary tech full length rear camera design" and reference number 97 "secondary tech full length rear camera protracting" and reference number 73

"full length rear camera function" and their component said reference number 75 "full length rear camera component" when programmed via said cellular telephone programming and setting features. Reference number 87 "retraction button" slowly retracts said cellular telephone reference number 71 "monitor screen protracted"' in synchronization. And can also retract said cellular telephone reference number 72 "full length rear camera design" and reference number 96 "secondary tech full length rear camera design" and reference number 97 "secondary tech full length rear camera protracting" and their component said reference number 75 "full length rear camera component" when programmed via said cellular telephone programming and setting features. Reference number 88 "360 degree rotation dial" allows the user to physically rotate and maneuver said cellular telephone reference number 61 "monitor screen" and said reference number 70 "monitor camera" or reference number 71 "monitor camera protracted" in synchronization. And can also rotate and maneuver said cellular telephone reference number 72 "full length rear camera design" and reference number 96 "secondary tech full length rear camera design and reference number 97 "secondary tech full rear camera protracting and reference number 73 "full length rear camera functions" and their component said reference number 75 "full length rear camera component" when programed via said cellular telephone programming and setting features. Helping the user in capturing ultra-wide angles as well as a variety of innovative options when taking photographs—video recording—selfies—face timing or gaming. Said "monitor camera" consist essentially of a close box containing a sensitized plate or film on which an image is formed when light enters the box through a lens or hole. Said "monitor camera" can be manufactured with various plasticized materials or thermo plastic materials or thermo plastic plasma materials shapes and measurements are optional. Two embodiments are illustrated in FIG. 5 Front view, 66 shows said cellular telephone "speaker/transmitter button". Which is designed to protract reference number 67 cellular telephone "speaker/transmitter pyramid" when initially pressed down. Said cellular telephone speaker/transmitter button" also serves as a speaker which allows the user to listen to music through a much larger and protractible speaker system and serves as a transmitter which allows the user to convert speech/sound into electronic impulses for transmission. Said "speaker transmitter button" can also be protracted or retracted via cellular telephone reference number 90 "speaker pyramid button" in which is found at reference number 82 "cellular telephone touch screen remote control" feature. Said "speaker/transmitter button" can be manufactured with various plasticized materials or various rubber materials and various metaled materials that encompass a minute magnet at its base connected to an electronic circuit board with plasticized materials covering said wiring and can also include cardboard materials in which can be used to manufacture the inner circumference of the speaker's walls. Reference number 67 shows said cellular telephone "speaker/transmitter pyramid slowly protracting from within the inner body of said cellular telephone creating a four level "speaker/transmitter pyramid" which is designed to provide the user with a sharp crisp clear and louder sound when communicating via cellular telephone or while communicating via cellular telephone speaker phone or while listening to music via cellular telephone. Said "speaker/transmitter pyramid" retracts back inside of the inner body of said cellular telephone when pressed down a second time and can also be protracted or retracted via said cellular telephone reference number 90 "speaker pyramid button". Said speaker transmitter pyramid" can be manufactured with various plasticized materials, various rubber materials or metaled materials that encompass a minute magnet at its base connected to an electronic wiring circuit board with plasticized materials covering said wiring and can also include cardboard materials that can be used to manufacture the inner circumference of the speakers walls shapes and measurements are optional. Another embodiment is illustrated in FIG. 6 back view, 72 shows a circular outline of said "full length rear camera design" that lies directly beneath the transparent full length screen surface in which is fully retracted said "full length rear camera design" can also rotate and maneuver in a full and complete 360 degree rotating angle while remaining fully retracted within the frame/body of said cellular telephone.

This feature can be protracted or retracted and or rotated and maneuver in a full and complete 360 degree angle rotation via said cellular telephone reference number 69 "Joystick protracted" or via said cellular telephone reference number 83 "protraction button" or reference number 87 "retraction button" or reference number 88 "360 degree rotation dial" said reference number 83 87 and 88 are located at reference number 82 "cellular telephone touch screen remote control" feature which will assist the user in capturing ultra-wide angles and dimensional images when taking photographs—video recording—selfies and face timing. Said full length rear camera consist essentially of a close box containing a sensitized plate or film on which an image is formed when light enters the box through a lens or hole as seen in said cellular telephone reference number 75 "full length rear camera component". Said full length rear camera can be manufactured with various plasticized materials or thermo plastic materials or plasma materials. Said full length rear camera is depicted as being oblong in shape. Shapes and measurements are optional. Another embodiment illustrated in FIG. 7 back view, 73 shows said cellular telephone "full length rear camera functions" transparent screen slowly protracting from within the inner body of said cellular telephone creating a zooming effect. And is also designed to retract and or rotate and maneuver in a full and complete 360 degree angle rotation in the course of protracting or retracting via said cellular telephone reference number 69 "Joystick protracted" feature or via said cellular telephone reference number 83 "protraction button" or reference number 87 "retraction button" or reference number 88 "360 degree rotation dial" said reference numbers 83 87 and 88 are located at said reference number 82 "cellular telephone touch screen remote control" feature. Said features will assist the user in capturing ultrawide angles as well as a variety of innovative options when taking photographs—video recording—selfies and face timing. Said full length rear camera consist essentially of a close box containing a sensitized plate or film on which an image is formed when light enters the box through a lens or hole as seen in said reference number 75 "full length rear camera component". Said full length rear camera can be manufactured with various plasticized materials or thermo plastic materials or plasma materials. Said full length rear camera is depicted being oblong in shape. Shapes and measurements are optional. Another embodiment of said cellular telephone is illustrated in FIG. 8 back view, 96 shows a separate feature "secondary tech full length rear camera design" fully retracted. Said "full length rear camera design" can also rotate and maneuver in a full and complete 360 degree angle rotation while remaining fully retracted And can also rotate and maneuver in said 360 degree angle rotation while in the course of protracting or retracting via said cellular telephone reference number 69 "Joystick protracted" or via said cellular telephone reference number 83 "protraction button" or reference number 87 "retraction button" or reference number 88 "360 degree rotation dial" said reference numbers 83 87 and 88 are all located at said reference number 82 "cellular telephone touch screen remote control" feature.

Said features will aid the user in capturing ultra-wide angles and dimensional images when taking photographs—video recording—selfies and face timing. Said full length camera consist essentially of a close box containing a sensitized plate or film on which an image is formed when light enters the box through a lens or hole as seen in said reference number 75 "full length rear camera component". Said reference number 96 "secondary tech full length rear camera design" can be manufactured with various plasticized materials or thermo plastic materials or plasma materials. Said "secondary tech full length rear camera design" is depicted as being oblong in shape. All shapes and measurements are optional. Another embodiment is illustrated in FIG. 9 back view, 97 shows a separate "secondary tech full length rear camera protracting" slowly from the inner body of said cellular telephone creating a zooming effect and can also rotate and maneuver in a full and complete 360 degree angle rotation while protracting or protracted or while retracting or retracted. And can also protract or retract and or rotate and maneuver in a full and complete 360 degree angle rotation via said cellular telephone reference number 69 "Joystick protracted" feature or via said cellular telephone reference number 83 "protraction button" or reference number 87 "retraction button" or reference number 88 "360 degree rotation dial" said reference numbers 83 87 and 88 are all located at said reference number 82 "cellular telephone touch screen remote control" feature. Said feature will aid the user in capturing ultra-wide angles and dimensional images when taking photographs—video recording—selfies and face timing. Said separate "secondary tech full length rear camera protracting" consist essentially of a close box containing a sensitized plate or film on which an image is formed.

when light enters the box through a lens or hole as seen in said reference number 75 "full length rear camera component" "secondary tech full length rear camera protracting" can be manufactured with various plasticized materials or thermo plastic materials or plasma materials. Said "secondary tech full length rear camera protracting" is depicted as being oblong in shape. All shapes and measurements are optional. Another embodiment is illustrated in FIG. 10 front view, 82 shows said "cellular telephone remote control" feature which is a handheld electronic device used to control the operations of said reference number 60 "cellular telephone from a distance as by radio waves. Said feature will further help the user in capturing ultra-wide angles and dimensional images when taking photographs—video recording—selfies—and face timing. Said "cellular telephone touch screen remote control" feature can be manufactured with various plasticized materials and various rubber materials. Said "cellular telephone touch screen remote control monitor" can be manufactured with various plasticized materials or thermo plastic materials or plasma materials. Said "cellular telephone touch screen remote control" is depicted as being oblong in shape. Shapes and measurements are optional. Another embodiment 83 said cellular telephone touch screen remote control "protraction button" which is designed to slowly protract said cellular telephone reference number 61 "monitor screen" and reference number 70 "monitor camera" in synchronization. And can also protract said cellular telephone reference numbers 72 "full length rear camera design" and reference number 96 "secondary tech full length rear camera design" and reference number 97 "secondary tech full length rear camera (protracting)" and reference number 73 "full length rear camera functions" in the same manner when programmed via cellular telephone programming and setting features. Further helping the user in capturing ultra-wide angles and dimensional images when taking photographs—video recording—selfies and face timing. Said cellular telephone touch screen remote control "protraction button" can be manufactured with various rubber materials. Said "protraction button" is oblong in shape measurements are optional. Another embodiment 84 shows said cellular telephone touch screen remote control up and down "volume buttons" which are designed to allow the user to control and adjust said cellular telephone reference number 62 "Speaker/transmitter" and reference number 66 "Speaker/transmitter button" and reference number 67 "Speaker/transmitter pyramid protracted" audio frequencies. Said "volume buttons" can be manufactured with various plasticized materials or various rubber materials. Shapes and measurements are optional. Another embodiment 85 shows said cellular telephone touch screen remote control "power button" which is designed to turn said cellular telephone touch screen remote control power on when initially pressed down and cuts said cellular telephone remote control power off when pressed down a second time. Said "power button" can be manufactured with various plasticized materials or various rubber materials. Said "power button" is circler in shape measurements are optional. Another embodiment 86 shows said cellular telephone touch screen remote control "remote control input" which is a terminal connector for receiving electronic power or signal in which powers said cellular telephone touch screen remote control via cellular telephone battery charger when plugged into an electronic socket or conductor. Said "remote control input" can be manufactured with various plasticized materials or various rubber materials. Said remote control input is circler in shape measurements are optional. Another embodiment 87 shows said cellular telephone touch screen remote control "retraction button" which is designed to slowly retract said reference number 61 said cellular telephone "monitor screen protracted" and reference number 71 "monitor camera protracted" in synchronization. And can also retract said cellular telephone full length rear camera(s) reference number 72 "full length rear camera design" and reference number 96 "secondary tech full length rear camera design" and reference number 97 "secondary tech full length rear camera protracting" and reference number 73 "full length rear camera functions" and there component said reference number 75 "full length rear camera component" in the same manner when programmed via said cellular telephone programming and setting features. Said cellular telephone reference number 61 "monitor screen retracted" and reference number 70 "monitor camera" can rotate and maneuver in a full and complete 360 degree angle rotation while remaining fully retracted. Said reference number(s) 72 "full length rear camera design" and reference number 96 "secondary tech full length rear camera design" and reference number 97 "secondary tech full length rear camera protracting" and reference number 73 "full length rear camera functions" and their component said reference number 75 "full length rear camera component" when programmed via said cellular telephone programming and setting features.

Helping the user in capturing ultra-wide dimensional images when taking photographs—video recording—selfies—face timing or gaming. Said "retraction button" can be manufactured with various plasticized materials or various rubber materials. Said "retraction button is depicted as being oblong in shape. Shapes and measurements are optional. Another embodiment 88 shows said cellular telephone touch screen remote control "360 degree rotation dial" which is designed to allow the user to physically rotate, and maneuver said reference number 61 "monitor screen" and reference number 70 "monitor camera or reference number 71 "monitor camera protracted" in synchronization in a full and complete 360 degree angle rotation while protracting or while fully protracted or while retracting or fully retracted by pressing or tapping said 360 degree rotation dial" arrows in any desirable direction. Said cellular telephone full length rear camera(s) said reference numbers 72 "full length rear camera design" and reference number 96 "secondary tech full length rear camera design" and reference number 97 "secondary tech full length rear camera protracting" and reference number 73 "full length rear camera functions" and there component said reference number 75 "full length rear camera component" can also rotate and maneuver in the same manner when programmed via said cellular telephone programming and setting features.

Said "360 degree rotation dial" is designed to allow the user to position their cellular telephone upright on any sustainable surface then position themselves in front of or on either side of said cellular telephone monitor screen/monitor camera while maintaining a visual of said image(s) depicted on said cellular telephone monitor screen through said cellular telephone touch screen remote control monitor screen. The user will then be able to physically protract or retract or rotate and maneuver said reference numbers to assist them in capturing desirable ultra-wide dimensional angles and images while taking photographs—video recording—selfies—face timing and gaming. Said 360 degree rotation dial" can be manufactured with various plasticized materials or soft rubber padding materials. Said arrows consist of a slender shaft pointed at one end and fathered at the other measurements are optional. Another embodiment 89 shows said touch screen remote control "snap picture button". Which is designed to allow the user to capture desired images/photographs depicted on said reference number 70 "monitor camera" reference number 61 "monitor screen" or said cellular telephone reference number 72 "full length rear camera design" and reference number 96 "secondary tech full length rear camera design" and reference number 97 "secondary tech full length rear camera protracting" and reference number 73 "full length rear camera functions" and there component said reference number 75 "full length rear camera component". Said "snap picture button" can be manufactured with various plasticized materials or various rubber materials. Said "snap" picture button" is depicted as being square in shape. Shapes and measurements are optional.

Another embodiment 90 shows said cellular telephone touch screen remote control "speaker pyramid button". Which is designed to allow the user to protract reference number 66 "speaker/transmitter button" when initially pressed slowly protracting said cellular telephone reference number 67 "speaker/transmitter pyramid protracted" from within the inner body of said cellular telephone. When said "speaker pyramid button" is pressed down a second time it will slowly retract said cellular telephone reference number 67 "speaker/transmitter pyramid protracted" back inside of the inner body of said cellular telephone. Said "speaker pyramid button" can be manufactured with various plasticized materials or various rubber materials. Said "speaker/transmitter pyramid button" is depicted as being circular in shape. Shapes and measurements are optional. Another embodiment 91 shows said touch screen remote control "cellular telephone programming/setting button". Which allows the user to access and log into said reference number 60 "cellular telephone" programming and setting features in their entirety including photographs/pictures—video recordings and face timing. When said "cellular telephone programming/setting button" is pressed down said cellular telephone cellular telephone programming and setting features will appear on said reference number 92 "touch screen remote control monitor screen" the user will then be able to operate and control all functions and features of said cellular telephone via said reference number 92 "touch screen remote control monitor screen" or via said reference number 82 "cellular telephone touch screen remote control" features. Which will provide the user with a variety of innovative options aiding the user with capturing ultra-wide angles and dimensional images when taking photographs recording—selfies—face timing and gaming. Said cellular telephone reference numbers 72 "full length rear camera design" and reference number 96 "secondary tech length rear camera design" and reference number 97 "secondary tech full length rear camera protracting" and reference number 73 "full length rear camera functions" and their component said reference number 75 "full length rear camera component" can also operate and function in the same manner when programmed via said cellular telephone programming and setting features. Said "cellular telephone programming/setting button" can be manufactured with various plasticized material or various rubber materials. Said "cellular telephone programming/setting button" is depicted as being oblong in shape. Shapes and measurements are optional. Another embodiment 92 shows said "touch screen remote control monitor screen" which is designed to retain all depicted images and program setting features of said cellular telephone reference number 61 "monitor screen" reference number 70 "monitor camera" as well as said cellular telephone programming and setting features in their entirety. Allowing the user to control all functions and features of said cellular telephone via said reference number 92 "touch screen remote control monitor screen" or via said reference number 82 "cellular telephone touch screen remote control features. Said "touch screen remote control monitor" can be manufactured with various plasticized materials or thermo plastic materials or plasma materials. Said touch screen remote control monitor is depicted as being oblong in shape. Shapes and measurements are optional. Another embodiment 93 shows a back view of said cellular telephone touch screen remote control "reverse side of remote control" which plasticized cover stabilizes the internal electronic structure and interior of said "cellular telephone touch screen remote control". Said "cellular telephone touch screen remote control" can be manufactured with various plasticized materials. Said "cellular telephone touch screen remote control" is depicted as being oblong in shape. Shapes and measurements are optional.

Another embodiment is illustrated in FIG. 11 back view, 86 shows said cellular telephone touch screen remote control "input" opening which is a terminal connector for receiving electronic power or signal in which charges said cellular telephone touch screen remote control, via cellular telephone battery charger when plugged into an electronical socket or conductor. Said touch screen remote control "input" can be manufactured with various plasticized materials or various rubber materials. Said touch screen remote control "input" is circular in shape measurements are optional. Another embodiment of said cellular telephone touch screen remote control is illustrated.

in FIG. 12 bottom view, 94 shows said touchscreen remote control "clip" which is designed to secure and stabilize said cellular telephone touch screen remote control when attached to pockets or other sustainable structures. Said cellular telephone touch screen "remote control clip" is optional in design and manufacturing. Said cellular telephone touch screen "remote control clip" can be manufacture with various plasticized material. Said cellular telephone touch screen "remote control clip" is depicted as being oblong in shape. Shapes and measurements are optional. Another embodiment of said cellular telephone touch screen remote control is illustrated in FIG. 13 side view, 94 shows a different angle of said cellular telephone touch screen "remote control clip which is optional in design and manufacturing. Another embodiment of said cellular telephone touch screen remote control is illustrated in FIG. 14 side view, 95 shows said cellular telephone touch screen "remote control clip hinge" which is optional in design and manufacturing. Said cellular telephone touch screen "remote control clip hinge" is designed to allow the user to move and adjust said cellular telephone touch screen remote control without difficulty to pockets or any other sustainable structure. Said cellular telephone touch screen "remote control clip hinge" can be manufactured with various plasticized materials with minute metaled springs running through the top of said cellular telephone touch screen remote control clip. Said cellular telephone "remote control clip hinge" is oblong in shape said metal springs are also oblong in shape measurements are optional. Another embodiment is illustrated in FIG. 15 bottom view, 65 shows said cellular telephone "input" opening from a different angle which is a terminal connector for receiving electronic power or signal in which powers said cellular telephone via cellular telephone battery charger when plugged into an electrical socket or conductor. Said "input" opening can be manufactured with various plasticized materials. Said cellular telephone "input" is circular in shape measurements are optional. Another embodiment of said cellular telephone is illustrated in FIG. 16 showing said cellular telephone lying flat right-side view, 63 up and down "volume buttons" which are designed to allow the user to control and adjust audio frequencies. Said "volume buttons" can be manufactured with various plasticized materials or various rubber materials. Said "volume buttons" are oblong in shape measurements are optional. 64 shows said cellular telephone "power button" which is designed to turn said cellular telephone power on when initially pressed down and to turn said cellular telephone power off when pressed down a second time. Said "power button" can be manufactured with various plasticized materials or various rubber materials. Said "power button" is circular in shape measurements are optional. 76 shows said cellular telephone "monitor screen" fully retracted. Said "monitor screen" is designed to depict images program settings and communications. Said cellular telephone "monitor screen" is also designed to rotate and maneuver in a full and complete 360 degree angle rotation while fully retracted in synchronization with said reference number 70 "monitor camera assisting the user in capturing a 360 degree ultra-wide angle and a variety of innovative options and dimensional images when taking photographs—video recording—selfies—face timing and gaming. Further ending the need for mirror images. Said "monitor screen can also rotate and maneuver in said 360 degree angle rotation in synchronization with said reference number 70 "monitor camera" via said cellular telephone reference number 96 "Joystick protracted" feature or reference number 88 "360 degree rotation dial" which is found at said reference number 82 "cellular telephone touch screen remote control". Said cellular telephone reference number 72 "full length rear camera design" and reference number 96 "secondary tech full length rear camera design" and reference number 97 "secondary tech full length rear camera protracting" and reference number 73 "full length rear camera functions" and there component said reference number 75 "full length rear camera component" can also operate and function in the same manner when programmed via said cellular telephone programming and setting features. Said cellular telephone "monitor screen" can be manufactured with various plasticized materials or various thermo plastic materials or various plasma materials. Said "monitor screen" is depicted as being oblong in shape. Shapes and measurements are optional. Another embodiment of said cellular telephone is illustrated in FIG. 17 shows said cellular telephone lying flat right-side view, 63 shows said cellular telephone up and down "volume buttons" which are designed to allow the user to control and adjust audio frequencies. Said "volume buttons" can be manufactured with various plasticized materials or various rubber materials.

Said "volume buttons" are oblong in shape measurements are optional. 64 shows said cellular telephone "power buttons" which are designed to turn said cellular telephone power on hen initially pressed down and to cut said cellular telephone power off when pressed down a second time. Said "power buttons" are circler in shape measurements are optional. 77 shows said cellular telephone "monitor screen" slowly protracting out from out of the inner frame/body of said cellular telephone crating a zooming effect said "monitor screen" is also designed to rotate and maneuver in a full and complete 360 degree angle rotation while in the course of protracting in synchronization with said reference number 70 "monitor camera" assisting the user in capturing a 360 degree ultra-wide angle and a variety of options and dimensional images when taking photographs—video recording—selfies—face timing and gaming. Said "monitor screen" can also be protracted in synchronization with said reference number 70 "monitor camera" via reference number 69 "Joystick protracted" feature by twisting said "Joystick protracted" feature to the right. Said "monitor screen" can also be retracted in synchronization with said reference number 70 "monitor screen" camera" via said cellular telephone "Joystick protracted" feature by twisting said "Joystick protracted" feature to the left. Said "monitor screen" can also be rotated and maneuvered in a full and complete 360 degree angle rotation in synchronization with said reference number 70 "monitor camera" via said "Joystick protracted" feature by moving said "Joystick protracted" feature in a circular motion. Said "monitor screen" can also be protracted in synchronization with said reference number 70 "monitor camera" via said reference number 83 "protraction button". Said "monitor screen" can also be retracted via reference number 87 "retraction button". Said "monitor screen" can also rotate and maneuver in a full and complete 360 degree angle rotation in synchronization with said reference number 70 "monitor camera" via reference number 88 "360 degree rotation dial". Said reference numbers 83 87 and 88 are all found at said reference number 82 "cellular telephone touch screen remote control" feature. Said cellular telephone reference number 72 "full length rear camera design" and reference number 96 "secondary tech full length rear camera design" and reference number 97 "secondary tech full length rear camera protracting" and reference number 73 "full length rear camera functions" and there component said reference number 75 "full length rear camera component" can also be programmed to operate and function in the same manner when programmed via cellular telephone programming and setting features. Said cellular telephone "monitor screen" can be manufactured with various plasticized materials or various thermo plastic materials or various plasma materials. Said cellular telephone "monitor screen" is depicted as being oblong in shape. Shapes and measurements are optional. Another embodiment of said cellular telephone is illustrated in FIG. 18 shows said cellular telephone lying flat right-side view, shows 63 said up and down "volume buttons" which are designed to allow the user to control and adjust audio frequencies. Said "volume buttons" can be manufactured with various plasticized materials or various rubber materials. Said "volume buttons" are oblong in shape measurements are optional. 64 shows said cellular telephone "power button" which is designed to turn said cellular telephone power on when initially pressed down and to cut said cellular telephone power off when pressed down a second time. 78 shows said cellular telephone "monitor screen" slowly protracting at a declined angle creating a slanting effect in which is also designed to rotate and maneuver in a right to left rocking angle while in said declined position in synchronization with reference number 70 "monitor camera" via said cellular telephone reference number 69 "Joystick protracted" by moving said "Joystick protracted" to the right. Said "monitor screen" can also be rotated and maneuvered in a 360 degree angle rotation in synchronization with said reference number 70 "monitor camera" via said reference number 88 "360 degree rotation dial" and can also rotate and maneuver in said 360 degree angle rotation while in the course of protracting or while in the course of retracting in or out of said declined position in synchronization with said reference number 70 "monitor camera" assisting the user in capturing ultra-wide dimensional angles and images when taking photographs—video recording selfies—face timing and gaming. Said cellular telephone reference number 72 "full length rear camera design" and reference number 96 "secondary tech full length rear camera design" and reference number 97 "secondary tech full length rear camera protracting" and reference number 73 "full length rear camera functions" and there component said reference number 75 "full length rear camera component" can also be programmed to operate and function in the same manner when programmed via said cellular telephone programming and setting features. Said cellular telephone "monitor screen" can be manufactured with various plasticized materials or various thermo plastic materials or various plasma materials. Said cellular telephone "monitor screen" is depicted as being oblong in shape. Shapes and measurements are optional.

Another embodiment of said cellular telephone is illustrated in FIG. 19 shows said cellular telephone lying flat right-side view, shows 63 said up and down "volume buttons" which are designed to allow the user to control and adjust audio frequencies. Said "volume buttons" can be manufactured with various plasticized materials or various rubber materials. Said "volume buttons" are oblong in shape measurements are optional. 64 shows said cellular telephone "power button" which is designed to turn said cellular telephone power on when initially pressed down and to cut said cellular telephone power off when pressed down a second time. Said "power button" can be manufactured with various plasticized materials or various rubber materials. Said "power button" is circular in shape measurements are optional. 79 shows said cellular telephone "monitor screen" protracting at a inclined angle creating a slanting effect in which is designed to also rotate and maneuver in a right to left rocking angle in synchronization with said reference number 70 "monitor camera" while in said inclined position and can also slowly protract and retract and maneuver in said 360 degree angle rotation in synchronization with said reference number 70 "monitor camera" while in the course of protracting or retracting further assisting the user in capturing ultra-wide dimensional angles and images when taking photographs—video recording—selfies—face timing and gaming. Said cellular telephone reference number 72 "full length rear camera design" and reference number 96 "secondary tech full length rear camera design" and reference number 97 "secondary tech full length rear acting" and reference number 73 "full length rear camera functions" and their component said cellular telephone reference number 75 "full length rear camera component" can also operate and function in the same manner when programmed via cellular telephone programming and setting features. Said cellular telephone "monitor screen" can be manufactured with various plasticized materials or various thermo plastic materials or various plasma materials. Said cellular telephone "monitor screen" is depicted as being oblong in shape. Shapes and measurements are optional. Another embodiment of said cellular telephone is illustrated in FIG. 20 shows said cellular telephone lying flat right-side view, shows 63 up and down "volume buttons" which are designed to allow the user to control and adjust audio frequencies. Said "volume buttons" can be manufactured with various plasticized materials or various rubber materials. Said "volume buttons" are oblong in shape measurements are optional. 64 shows said cellular telephone "power button" which is designed to turn said cellular telephone power on when initially pressed down and to cut said cellular telephone power off when pressed down a second time. Said "power button" can be manufactured with various plasticized materials or various rubber materials. Said "power button" is circular in shape measurements are optional. 80 shows said cellular telephone "monitor screen" slowly protracting in a upward horizontal angle in which is also designed to rotate and maneuver in a right to left rocking angle while in said horizontal position and can also protract retract and or rotate and maneuver in a full and complete 360 degree angle rotation while in the course of protracting or while in the course of retracting acting as a swivel in synchronization with said reference number 70 "monitor camera" further assisting the user in capturing ultra-wide dimensional angles and images when taking photographs—video recording—selfies—face timing and gaming. Said cellular telephone reference number 72 "full length rear camera design" and reference number 96 "secondary tech full length rear camera design" and reference number 97 "secondary tech full length rear camera protracting" and reference number 73 "full length rear camera functions" and there component said reference number 75 "full length rear camera component" can also be programmed to operate and function in the same manner when programmed via said cellular telephone programming and setting features. Said cellular telephone "monitor screen" can be manufactured with various plasticized materials or various thermo plastic materials or various plasma materials. Said "monitor screen" is depicted as being oblong in shape. Shapes and measurements are optional. Another embodiment of said cellular telephone is illustrated in FIG. 21 shows said cellular telephone lying flat right-side view, shows 63 up and down "volume buttons" which are designed to allow the user to control and adjust audio frequencies. Said "volume buttons" are oblong in shape measurements are optional. 64 shows said cellular telephone "power button" which is designed to turn said cellular telephone power on when initially pressed down and to cut said cellular telephone power off when pressed down a second time. Said "power button" can be manufactured with various plasticized materials or various rubber materials. Said "power button" is circular in shape measurements are optional. 81 shows said cellular telephone "monitor screen" slowly protracting in an upward reverse horizontal slanting angle with said "monitor screen" facing North. The fragmented line(s) in said figure represents the back side of said "monitor screen" in which consist of a solid piece of plasticized materials or thermo plastic materials or plasma materials that is consistent with manufacturing monitor screens. Said "monitor screen" is found on the opposite side of said drawing in said figure.

therefore, the inner base that is shaded in said fig will not be visible but will be covered by said surrounding plasticized materials. Said "monitor screen" is also designed to rotate and maneuver in a right to left rocking angle while in said reverse horizontal position in synchronization with said reference number 70 "monitor camera" and can also slowly protract retract and or rotate and maneuver in said full and complete 360 degree angle rotation while in the course of protracting or while in the course of retracting in synchronization with reference number 70 "monitor camera" acting as a swivel further assisting the user in capturing ultra-wide dimensional angles while taking photographs—video recording—selfies—face timing and gaming. Said cellular telephone reference number 72 "full length rear camera design" and reference number 96 "secondary tech full length rear camera design and reference number 97 "secondary tech full length rear camera protracting and reference number 73 "full length rear camera functions and their component said reference number 75 "full length rear camera component can also operate and function in the same manner when programmed via cellular telephone programming and setting features. Said cellular telephone "monitor screen" can be manufactured with various plasticized materials or various thermo plastic materials or various plasma materials. Said "monitor screen" is depicted as being oblong in shape. Shapes and measurements are optional. Another embodiment of said cellular telephone is illustrated in FIG. 22 shows said cellular telephone lying flat left side view shows 67 "speaker/transmitter pyramid protracted" slowly protracting from within the inner frame/body of said cellular telephone pushing reference number 66 "speaker/transmitter button" upward creating a four level "speaker/transmitter pyramid protracted" in which is designed to provide the user with a sharp crisp and louder sound through a much larger and protractible sound system when communicating via said cellular telephone or while communicating via said cellular telephone speaker phone or while listening to music via said cellular telephone. Said reference number 66 "speaker/transmitter button" slowly protracts when initially pressed down. Said reference number 67 "speaker/transmitter pyramid protracted slowly retracts when pressed down. And can also be protracted or retracted via reference number 90 "speaker transmitter button" in which is found at said reference number 82 "cellular telephone touch screen remote control" feature. Said cellular telephone "speaker/transmitter button" and said cellular telephone "speaker/transmitter pyramid (protracted)" can be manufactured with various plasticized materials and various metaled materials encompassing a minute magnet at its base connected to an electronic wiring circuit board with plasticized materials covering said wiring and can also be include cardboard materials that can be used to manufacture the inner circumference of the speakers walls. Said "speaker/transmitter button" as well as said "speaker/transmitter pyramid protracted" are depicted as being oblong in shape. Shapes and measurements are optional. 68 shows said cellular telephone "joystick button" which is designed to protract reference number 69 "joystick protracted" feature from within the inner body of said cellular telephone when initially pressed down. Said cellular telephone "joystick protract" slowly retracts back inside of the inner body of said cellular telephone when held down for 2 seconds reverting to said reference number 68 "joystick button". Said cellular telephone joystick is a manual device connected to said cellular telephone terminal serving as a control lever that can be tilted in various directions to operate rotate and maneuver said cellular telephone reference number 61 "monitor screen and reference number 70 "monitor camera in synchronization in a full and complete 360 degree rotation. Said cellular telephone reference number 61 "monitor screen and reference number 70 "monitor camera can also rotate and maneuver in said 360 degree angle rotation while in the course of protracting or while fully protracted or while in the course of retracting or while fully retracted also in synchronization. Said cellular telephone reference number 72 "full length rear camera design" and reference number 96 "secondary tech-full length rear camera design" and reference number 97 "secondary tech full length rear camera protracted" and reference number 73 "full length rear camera functions" and their component said reference number 75 "full length rear camera component" can also operate and function in the same manner when programmed via cellular telephone programming and setting features. Said cellular telephone "joystick button" can be manufactured with various plasticized materials or various rubber materials. Shapes and measurements are optional. Said cellular telephone "joystick protracted" can be manufactured with various plasticized materials or various rubber materials. Shapes and measurements are optional.

76 shows said cellular telephone "monitor screen retracted" The retraction of said cellular telephone monitor screen in synchronization with reference number 70 "monitor camera" can be carried out by slowly twisting said cellular telephone reference number 69 "joystick protracted" to the left. As an alternative the retractions of said cellular telephone monitor screen in synchronization with said "monitor camera" can also be carried out by reference number 87 "retraction button" which is found at reference number 82 "cellular telephone touch screen remote control' feature. Said cellular telephone operations and functions will also allow the user to protract retract and or rotate and maneuver said cellular telephone reference number 61 "monitor screen" reference number 70 "monitor camera" in synchronization while in the course of protracting or retracting assisting the user in ultra-wide angles and dimensional images when taking photographs—video recording—selfies—face timing and gaming. Said reference number 72 "full length rear camera design" and reference number 96 "secondary tech full length rear camera design" and reference number 97 "secondary tech full length rear camera protracting" and reference number 73 "full length rear camera functions" and there component said reference number 75 "full length rear camera component" can also operate and function in the same manner when programmed via cellular telephone programming and setting features, Said cellular telephone can be manufactured with various plasticized materials or various thermo plastic materials or various plasma materials. Said cellular telephone "monitor screen" is depicted as being oblong in shape. Shapes and measurements are optional.

Another embodiment of said cellular telephone is illustrated in fic 23 shows said cellular telephone lying flat left side view, 67 shows said "speaker/transmitter pyramid" slowly protracting from within the inner frame/body of said cellular telephone pushing reference number 66 "speaker/transmitter button" upward creating said four-level "speaker/transmitter pyramid". Said "speaker/transmitter pyramid" is designed to provide the user with a sharp crisp clear and louder sound when communicating via cellular telephone or vii cellular telephone speaker phone or while listing to music vii cellular telephone. Said reference number 66 "speaker/transmitter button" slowly protracts when initially pressed down. Said reference number 67 "speaker/transmitter pyramid" slowly retracts back inside of the inner frame/body of said cellular telephone when pressed down and can also be protracted or retracted via reference number 90 "pyramid button" in which is found at said reference number 82 "cellular telephone touch screen remote control" feature. Said "speaker/transmitter button" and said "speaker/transmitter pyramid" can be manufactured with various plasticized materials and various metaled materials encompassing a minute magnet at its base connected to an electronic wiring circuit board with plasticized materials covering said wiring and can also include cardboard materials in which can be used to manufacture the inner circumference of the speaker wall(s). Said "speaker/transmitter button" is depicted as being oblong in shape. Shapes and measurements are optional. Said "speaker/transmitter pyramid" is depicted as being in the shape of a pyramid. Shapes and measurements are optional.

68 shows said cellular telephone "joystick button" which is designed to slowly protract reference number 69 "joystick protracted" feature from within the inner frame/body of said cellular telephone when initially pressed down. Said cellular telephone "joystick protracted" slowly retracts back inside of the inner body of said cellular telephone when held down for 2 seconds reverting to said, "joystick button". said cellular telephone joystick is a manual device connected to said cellular telephone terminal. Serving as a control lever that can be tilted in various directions to operate rotate and maneuver said cellular telephone reference number 61 "monitor screen" and reference number 70 "monitor camera" in synchronization. And can also operate and maneuver said cellular telephone reference number 72 "full length rear camera design" and reference number 96 "secondary tech full length rear camera" and reference number 97 "secondary tech full length rear camera protracting" and reference number 73 "full length rear camera functions" and their component said reference number 75 "full length rear camera component" in the same manner when programed via cellular telephone programming and setting features. Said cellular telephone "joystick protracted" feature is also designed to allow the user to slowly protract or retract and or rotate and maneuver said reference number 61 "monitor screen" and reference number 70 "monitor camera" in synchronization in a full and complete 360 degree rotation. Said cellular telephone "monitor screen" and "monitor screen camera" can also rotate and maneuver in said 360 degree rotation while protracting or while fully protracted or while retracting or while fully retracted in synchronization. Said reference number 72 "full length rear camera design" and reference number 96 "secondary tech full length rear camera design" and number 97 "secondary tech full length rear camera protracting" and reference number 73 "full length rear camera functions" and their component said reference number 75 "full length rear camera component" can also operate and function in the same manner when programmed via cellular telephone programming and setting features. Said "joystick button" can be manufactured with various plasticized materials or various rubber materials. Shapes and measurements are optional. Said cellular telephone "joystick protracted" can be manufactured with various plasticized materials or various rubber materials. Said "joystick protracted" feature is depicted as being circler on top with a slender body. Said shapes and measurements are optional. 77 shows said cellular telephone "monitor screen" slowly protracting in an upward angle creating a zooming effect. The protraction of said reference number 77 in synchronization with said reference number 70 "monitor camera" can be carried out by slowly. Twisting said "joystick protracted" feature to the right. As an alternative the protraction of said "monitor screen" and "monitor camera" in synchronization can also be carried out by reference number 83 "protraction button" which is found at said reference number 82 "cellular telephone touch screen remote control" feature. Said cellular telephone operations and functions will provide the user with a variety of innovative options to protract retract and or rotate and maneuver said reference number 77 "Monitor screen protracting outward" and reference number 70 "monitor camera" in synchronization in a full and complete 360 degree rotation helping the user in capturing ultra-wide dimensional angles while taking photographs—video recording—selfies—face timing or gaming.

Said reference number 72 "full length rear camera design" and reference number 96 "secondary tech full length rear camera design" and reference number 97 "secondary tech full length rear camera protracting" and reference number 73 "full length rear camera functions" and their component said reference number 75 "full length rear camera component". Can also operate and function in the same manner when programmed via said cellular telephone programming and setting features. Said cellular telephone "monitor screen" can be manufactured with various plasticized materials or various thermo plastic materials or various plasma materials. Said "monitor screen" is depicted as being oblong in shape. Shapes and measurements are optional. Another embodiment is illustrated in FIG. 24 showing said cellular telephone lying flat left side view, shows 67 "speaker/transmitter pyramid" slowly protracting from within.

The inner body of said cellular telephone pushing reference number 66 "speaker/transmitter button" upward creating a four-level speaker pyramid. In which is designed to provide the user with a sharp crisp clear and louder sound when communicating via cellular telephone or while communicating via said cellular telephone speaker phone or while listening to music via said cellular telephone. Said reference number 66 "speaker/transmitter button" slowly protracts when initially pressed down. Said reference number 67 "speaker/transmitter pyramid protracted" slowly retracts when pressed down. And can also be protracted or retracted via reference number 90 "speaker pyramid button" which is found at said reference number 82 "cellular telephone touch screen remote control" feature. Said cellular telephone "speaker/transmitter button" and said cellular telephone "speaker/transmitter pyramid' protracted" can be manufactured with various plasticized materials and various metaled materials encompassing a minute magnet at its base connected to an electronic wiring circuit board with plasticized materials covering said wiring.

and can also include cardboard materials in which can be used to manufacture the inner circumference of the speaker's wall(s). Said "speaker/transmitter Button" is depicted as being oblong in shape. Shapes and measurements are optional. Said "speaker/transmitter pyramid protracted" is depicted as being the shape of a pyramid. Shapes and measurements are optional. 68 shows said cellular telephone "joystick button" which is designed to protract reference number 69 "joystick protracted" feature from within the inner body of said cellular telephone when initially pressed down. Said cellular telephone "joystick protracted" slowly retracts back inside the inner body of said cellular telephone when held down for 2 seconds.

Said cellular telephone joystick feature is a manual device connected to said cellular telephone terminal. Serving as a control lever that can be tilted in various directions to operate rotate and maneuver said cellular telephone "monitor screen" and 'monitor camera" in synchronization. Said cellular telephone reference number 72 "full length rear camera design" and reference number 96 "secondary tech full length rear camera design" and reference number 97 "secondary tech full length rear camera protracted" and reference number 73 "full length rear camera functions" and their component said reference number 75 "full length rear camera component" can also operate and function in the same manner via said cellular telephone programming and setting features. Said cellular telephone "monitor screen" and said reference number 70 "monitor camera" can also rotate and maneuver in a full and complete 360 degree angle rotation in synchronization while in the course of protracting or while fully protracted or while in the course of retracting or while fully retracted said reference numbers 72 "full length rear camera design" and reference number 96 "secondary tech full length rear camera design" and reference number 97 "secondary tech full length rear camera protracted" and reference number 73 "full length rear camera functions" and there component said reference number 75 "full length rear camera component" can also operate and function in the same manner when programmed via said cellular telephone programming and setting features. Said "joystick button" can be manufactured with various plasticized materials or various rubber materials. Said "joystick button" is depicted as being oblong or circular in shape. Shapes and measurements are optional. Said "joystick protracted" feature can be manufactured with various plasticized materials or various rubber materials. Said "joystick protracted" feature is depicted as being circular on top with a slender body. Shapes and measurements are optional. 78 shows said cellular telephone "monitor screen" slowly protracting at a declined angle creating a slanting effect. The declined protraction of said cellular telephone "monitor screen" in synchronization with said "monitor camera" can be done by slowly tilting said reference number 69 "joystick protracted" feature to the right. As an alternative said "monitor screen and/or monitor camera" in synchronization can also rotate and maneuver in a full and complete 360 degree angle rotation via reference number 88 "360 degree rotation dial" which is found at reference number 82 "cellular telephone touch screen remote control" feature. Said operations and functions will provide the user with a variety of innovative options to protract or retract and or rotate and maneuver said, "monitor screen" and "monitor camera" in synchronization in a full and complete 360 degree angle rotation while taking photographs—video recording—selfies—face timing and gaming. Providing the user with ultra-wide angles and dimensional images. Said reference number 72 "full length rear camera design" and reference number 96 "secondary tech full length rear camera design" and reference number 97 "secondary tech full length rear camera protracting" and reference number 73 "full length rear camera functions" and their component said reference number 75 "full length rear camera component" can also operate and maneuver in the same manner when programmed via said cellular telephone programming and setting features. Said cellular telephone "monitor screen" can be manufactured with various plasticized materials or thermo plastic materials or various plasma materials.

Said cellular telephone "monitor screen" is depicted as being oblong in shape. Shapes and measurements are optional. Another embodiment of said cellular telephone is illustrated in FIG. 25 showing said cellular telephone lying flat left side view, shows 67 "speaker/transmitter pyramid" slowly protracting from within the inner body of said cellular telephone pushing reference number 66 "speaker/transmitter button" upward creating a four level speaker pyramid. In which is designed to provide the user with a sharp crisp clear and louder sound when communicating via said cellular telephone or while communicating via cellular telephone speaker phone or while listening to music via said cellular telephone. Said reference number 66 "speaker/transmitter button" slowly protracts when initially pressed down. Said reference number 67 "speaker/transmitter pyramid protracted" slowly retracts when pressed down. And can also be protracted or retracted via reference number 90 "speaker pyramid' button" which is located at said reference number 82 "cellular telephone touch screen remote control" feature. Said reference number 68 "joystick button'" and said reference number 69 "joystick protracted" can be manufactured with various plasticized materials and various metaled materials encompassing a minute magnet at its base connected to an electronic wiring circuit board with plasticized materials covering said wiring. And can include cardboard materials which can be used to manufacture the inner circumference of said speaker wall(s). Said speaker/transmitter button" is depicted as being oblong or circular in shape. Said "speaker/transmitter pyramid protracted" is depicted as being the shape of a pyramid. Said shapes and measurements are optional. 68 shows said cellular telephone "joystick button" which is designed to protract said reference number 69 "joystick" feature from within the inner body of said cellular telephone when initially pressed down. Said cellular telephone "joystick" feature is a manual device connected to said cellular telephone terminal. Serving as a control lever that can be tilted in various directions to operate and maneuver said cellular telephone reference number 61 "monitor screen" and reference number 70 "monitor camera" in synchronization. And can also operate rotate and maneuver said reference number 72 "full length rear camera design" and reference number 96 "secondary tech full length rear camera design" and reference number, 97 "secondary tech full length rear camera protracting" in the same manner when programmed via said cellular telephone programming and setting features. Said cellular telephone "joystick" feature is designed to allow the user to slowly protract or retract and or rotate and maneuver said cellular telephone said reference number 61 "monitor screen" and said reference number 70 "monitor camera" in synchronization in a full and complete 360 degree rotation. Said cellular telephone "monitor screen" and "monitor camera" can also rotate and maneuver in said full and complete 360 degree rotation while fully retracted or while retracting or while fully protracted or while protracting also in synchronization. Said cellular telephone reference number 72 "full length rear camera design" and reference number 96

"secondary tech full length rear camera design" and said reference number 97 "secondary tech full length rear camera protracting" and reference number 73 "full length rear camera functions" and there component said reference number 75 "full length rear camera component" can also operate and function in the same manner when programmed via said cellular telephone programming and setting features. Said cellular telephone "joystick button" can be manufactured with various plasticized materials or various rubber materials. Said "joystick button" 70 is depicted as being oblong or circular in shape. Shapes and measurements are optional. 79 shows said cellular telephone "monitor screen" slowly protracting at an inclined angle into a slanting position. The inclined protraction of said cellular telephone reference number 61 "monitor screen" and reference number 70 "monitor camera" in synchronization can also be done by slowly tilting said joystick feature to the left. Also, as an alternative said inclined protraction of said "monitor screen" and "monitor camera in synchronization can be accomplished by said reference number 88 "360 degree rotation dial". Which is found at said reference number 82 "cellular telephone touch screen remote control" feature. Said operations and functions will provide the user with a variety of innovative options to protract or retract and or rotate and maneuver said "monitor screen" and monitor camera" in synchronization in a full and complete 360 degree angle rotation while protracting or while retracting assisting the user in capturing ultra-wide dimensional angles and images when taking photographs—video recording—selfies—face timing and gaming. Said features ends the need for mirror images and second party aid. Said cellular telephone reference number 72 "full length rear camera design" and reference number 96 "secondary tech full length rear camera design" and reference number 97 "secondary tech full length rear camera protracting" and reference number 73 "full length rear camera functions" and their component said reference number 75 "full length rear camera component" can also operate and function in the same manner when programmed via said cellular telephone programming and setting features. Said cellular telephone "monitor screen" can be manufactured with various plasticized materials or various thermo plastic materials or various plasma materials. Said cellular telephone "monitor screen" is depicted as being oblong in shape. Shapes and measurements are optional. Another embodiment is illustrated in FIG. 26 shows said cellular telephone lying flat left side view, shows 67 "speaker/transmitter pyramid" slowly protracting from within the inner body of said cellular telephone pushing reference number 66 "speaker/transmitter button" upward creating a four-level speaker pyramid. this feature is designed to provide the user with a sharp crisp clear and louder sound when communicating via cellular telephone or while communicating via cellular telephone speaker phone or while listening to music via said cellular telephone. Said reference number 66 "speaker/transmitter button" slowly protracts when initially pressed down. Said reference number 67 "speaker/transmitter pyramid protracted" slowly retracts back within the inner body of said cellular telephone when pressed down.

Said reference numbers 66 "speaker/transmitter button" and reference number 67 "speaker/transmitter pyramid" can also protract or retract via reference number 90 "speaker pyramid button" in which is found at said reference number 82 "cellular telephone touch screen remote control" feature. Said cellular telephone "speaker/transmitter button" and "speaker/transmitter pyramid protracted" can be manufactured with various plasticized materials and various metaled materials encompassing a minute magnet at its base connected to an electronic wiring circuit board with plasticized materials covering said wiring. And can also include cardboard materials in which can be used to manufacture the inner circumference of said speaker(s) wall(s).

Said "speaker/transmitter button" is depicted as being oblong or circular in shape. Said "speaker/transmitter pyramid protracted" is depicted as being the shape of a pyramid. Shapes and measurements are optional. 68 shows said cellular telephone "joystick button" which is designed to protract reference number 69 said cellular telephone "joystick protracted" feature from within the inner body of said cellular telephone when initially pressed down. Said cellular telephone joystick feature is a manual device connected to said cellular telephone terminal. Serving as a control lever that can be tilted in various directions to operate and maneuver said cellular telephone "monitor screen" and "monitor camera" in synchronization. Said cellular telephone "joystick protracted" feature is designed to allow the user to slowly protract or retract and or rotate and maneuver said cellular telephone "monitor screen" and "monitor camera in synchronization in a full and complete 360 degree rotation. Said cellular telephone "monitor screen" and "monitor camera" in synchronization can also rotate and maneuver in said 360 degree angle rotation while protracting or while fully protracted while retracting or while fully retracted. Said cellular telephone reference number 72 "full length rear camera design" and reference number 96 "secondary tech full length rear camera design" and reference number 97 "secondary tech full length rear camera protracting" and reference number 73 "full length rear camera function" and their component said reference number 75 "full length rear camera component" can also be programmed via said cellular telephone programming and setting features to operate and function in the same manner. Said cellular telephone "joystick button" can be manufactured with various plasticized materials or various rubber materials. Said "joystick button" is depicted as being oblong or circular in shape. Said "joystick protracted" feature is depicted as being circular on top with a slender body. Shapes and measurement are optional. 80 shows said cellular telephone "monitor screen" slowly protracting in an upward horizontal angle. The horizontal protraction of said cellular telephone "monitor screen" in synchronization with reference number 70 "monitor camera" can be done by slowly tilting said joystick feature backwards. As an alternative said horizontal protraction of said cellular telephone "monitor screen" and reference number 70 "monitor camera" in synchronization can be carried out by said reference number 88 "360 degree rotation dial" which is found at reference number 82 "cellular telephone touch screen remote control".

Said cellular telephone functions and features will provide the user with a variety of innovative options to protract or retract and or rotate and maneuver said cellular telephone "monitor screen" and said reference number 70 "monitor camera" in synchronization in a full and complete 360 degree angle rotation and can also rotate and maneuver in a right to left rocking angle while in said horizontal position or while in the course of protracting or retracting into or out of said horizontal position. Aiding the user in capturing ultra-wide dimensional angles and images while taking photographs—video recording—selfies—face timing—texting and gaming. Said cellular telephone full length rear camera(s) said reference number 72 "full length rear camera design" and reference number 96 "secondary tech full length rear camera design" and reference number 97 "secondary tech full length rear camera protracting" and reference number 72 "full length rear camera functions" and there component said reference number 75 "full length rear camera component" can also operate and function in the same manner when programmed via said cellular telephone programming and setting features. Said cellular telephone "monitor screen" can be manufactured with various plasticized materials or various thermo plastic material or plasma materials. Said cellular telephone "monitor screen" is depicted as being oblong in shape. Shapes and measurements are optional. Another embodiment of said cellular telephone is illustrated in FIG. 27. Shows said cellular telephone lying flat. Left side view shows said reference number 67 "speaker/transmitter pyramid protracting" from within the inner body of said cellular telephone pushing reference number 66 "speaker/transmitter button" upward creating a four-level speaker pyramid. In which is designed to provide the user with a sharp crisp clear and louder sound when communicating via said cellular telephone or while communicating via cellular telephone speaker phone or while listening to music via said cellular telephone.

Reference number 66 "speaker/transmitter button" slowly protracts when initially pressed down by the user. Said reference number 67 "speaker/transmitter pyramid protracted" slowly retracts when pressed down by the user. Said reference number 66 "speaker/transmitter button" and said reference number 67 "speaker/transmitter pyramid protracted" can be protracted or retracted via said cellular telephone reference number 90 "speaker pyramid button" which is found at reference number 82 "cellular telephone touch screen remote control" feature. Said cellular telephone "speaker/transmitter button" and said cellular telephone "speaker/transmitter pyramid protracted" can be manufactured with various plasticized materials or various rubber materials and metaled materials encompassing a minute magnet at its base connected to an electronic wiring circuit board with plasticized materials covering said wiring and can also include cardboard materials in which can be used to manufacture the inner circumference of said speaker wall(s). Said cellular telephone "speaker/transmitter button" is depicted as being oblong or circular in shape. Shapes and measurements are optional. Reference number 68 shows said cellular telephone "joystick button" which is designed to slowly protract reference number 69 said cellular telephone "Joystick protracted" feature from within the inner body of said cellular telephone when initially pressed down by the user. Said cellular telephone joystick feature is a manual device connected to said cellular telephone terminal serving as a control lever that can be tilted in various directions to operate rotate and maneuver said cellular telephone reference number 61 "monitor screen" and reference number 70 "monitor camera" in synchronization or said reference number 72 "full length rear camera design" or reference number 96 "secondary tech full length rear camera design" or reference number 97 "secondary tech full length rear camera protracting" or reference number 73 "full length rear camera functions" and there component said reference number 75 "full length rear camera component" when programmed via said cellular telephone programming and setting features. Said cellular telephone joystick feature is designed to allow the user to slowly protract or retract and or rotate and maneuver said cellular telephone reference number 61 "monitor screen" and reference number 70 "monitor camera" in synchronization in a full and complete 360 degree rotation. Said cellular telephone "monitor screen" and "monitor camera" in synchronization can also rotate and maneuver in a full and complete 360 degree rotation while fully retracted or while retracting or while fully protracted or while protracting. Said cellular telephone full length rear camera(s) reference number 72 "full length rear camera design" or reference number 96 "secondary tech full length rear camera design" or reference number 97 "secondary tech full length rear camera protracting", or reference number 73 "full length rear camera (functions)" and there component said reference number 75 "full length rear camera protracting" can also operate and function in the same manner when programmed via said cellular telephone programming and setting features.

Said cellular telephone "joystick button" can be manufactured with various plasticized materials or various rubber materials. Said "joystick button" is depicted as being oblong or circular in shape. Shapes and measurements are optional. Said cellular telephone "joystick protracted" feature can be manufactured with various plasticized materials or various rubber materials. Said "joystick protracted" feature is depicted as being circular on top with a slender body. Shapes and measurements are optional. Reference number 81 shows said cellular telephone "monitor screen" slowly protracting in an upward reverse horizontal slanting angle with said cellular telephone "monitor screen" facing north. The fragmented line(s) in said fig stands for the back side of said "monitor screen" in which consist of a solid piece of plasticized materials or thermo plastic materials or plasma materials that is consistent with manufacturing monitor screens. Said "monitor screen" is found on the opposite side of said drawing in said FIG. 27 will not but will be covered by said surrounding plasticized materials. The reverse horizontal protraction of said reference number 61 "monitor screen" and reference number 70 "monitor camera" in synchronization can be carried out by slowly tilting said joystick feature forward. As an alternative said reverse horizontal protraction of said cellular telephone reference number 61 "monitor screen" and said reference number 70 "monitor camera" in synchronization can also be carried out by said reference number 88 "360 degree rotation dial" in which is found at said reference number 82 "cellular telephone touch screen remote control" feature.

Said cellular telephone operations and functions will provide the user' with a variety of innovative options to protract or retract and or rotate and maneuver said cellular telephone reference number 61 "monitor—screen" and reference number 70 "monitor camera" in synchronization in a full and complete 360 degree rotation and can also rotate and maneuver in a right to left rocking angle while in said reverse horizontal position or while protracting into or out of said reverse horizontal position while retaining the ability to rotate and maneuver in said 360 degree rotation. Helping the user in capturing ultra-wide angles and dimensional images when taking photographs—video recordings—selfies—face timing—texting or gaming and will end the need for second party help and mirror images. Said cellular telephone reference number 72 "full length rear camera design" or reference number 96 secondary tech full length rear camera design" or reference number 97 "secondary tech full length rear camera protracting" or reference number 73 "full length rear camera functions" and their component said reference number 75 "full length rear camera component" can also be programmed to run and function in the same manner when programmed via said cellular telephone programming and setting features. Said cellular telephone monitor screen can be manufactured with various plasticized materials or various thermo plastic materials or various plasma materials. Said cellular telephone monitor screen is depicted as being oblong in shape. Shapes and measurements are optional. Another embodiment of said cellular telephone is illustrated in FIG. 28. Shows said cellular telephone lying flat left side view shows reference number 66 said cellular telephone "speaker/transmitter button" full retracted which is designed to protract said reference number 67 said cellular telephone "speaker/transmitter pyramid protracted" when initially pressed down by the user. Said cellular telephone "speaker/transmitter button" also serves as a speaker in which allows the user to listen to music through a much larger and protractible speaker and serves as a transmitter in which allows the user to convert speech/sound into electronic impulses for transmission.

Said "speaker/transmitter button" can also be protracted or retracted via said reference number 90 "speaker pyramid button" which is found at said reference number 82 "cellular telephone touch screen remote control" feature. Said cellular telephone "speaker/transmitter button" can be manufactured with various plasticized materials or various metaled materials encompassing a minute magnet at its base connected to an electronic wiring circuit board with plasticized materials covering said wiring. And can also include cardboard materials which can be used to manufacture the inner circumference of said speaker wall(s). Said "speaker/transmitter button" is depicted as being oblong or circular in Shape. Shapes and measurements are optional.

Reference number 68 shows said cellular telephone "joystick button" which is designed to protract reference number 69 "joystick" feature from within the inner body of said cellular telephone when initially pressed down by the user. Said cellular telephone "joystick protracted" slowly retracts back inside of the inner body of said cellular telephone when held down for 2 seconds by the user reverting to said reference number 68 "joystick button". Said cellular telephone "joystick button" can be manufactured with various plasticized materials or various rubber materials. Said "joystick button" is depicted as being oblong or circular in shape. Shapes and measurements are optional. Reference number 76 shows said cellular telephone "monitor screen" fully retracted. The retraction of said cellular telephone "monitor screen" in synchronization with said reference number 70 "monitor camera" can be carried out by slowly twisting said cellular telephone "joystick protracted" feature to the left.

As an alternative the retractions of said cellular telephone "monitor screen" and said cellular telephone "monitor camera" in synchronization can be carried out by reference number 87 "retraction button" which
is found at reference number 82 "cellular telephone touch screen remote control" feature. Said operations and functions will provide the user with a variety of innovative options to protract or retract and or rotate and maneuver said cellular telephone "monitor screen" and "monitor camera" in synchronization in a full and complete 360 degree rotation while taking photographs—video recording—selfies—face timing—texting or gaming. Said cellular telephone reference number 72 "full length rear camera design" or number 96 "secondary tech full length rear camera design" or reference number 97 "secondary tech full length rear camera protracting" or reference number 73 "full length rear camera functions" and their component said reference number 75 "full length rear camera component" can also operate and function in the same manner when programmed via said cellular telephone programming and setting features. Further assisting the user in capturing ultra-wide angles and dimensional images while taking photographs—video recording—selfies—face timing and will eliminate the need for second party assistance and mirror images. Said cellular telephone "monitor screen" can be manufactured with various plasticized materials or various thermo plastic materials or various plasma materials. Said cellular telephone "monitor screen" is depicted as being oblong in shape. Shapes and measurements are optional.

Another embodiment of said cellular telephone is illustrated in FIG. 29. shows said cellular telephone lying flat left side view. Reference number 66 cellular telephone "speaker/transmitter button" full retracted. Which is designed to protract reference number 67 cellular telephone "speaker/transmitter pyramid" when initially pressed down by the user. Said cellular telephone "speaker/transmitter button" also serves as a speaker which allows the user to listen to music through a much larger and protractible speaker system. And serves as a
transmitter in which allows the user to convert speech/sound into electronic impulses for transmission. Said "speaker/transmitter button" can also be protracted or retracted via reference number 90 "speaker pyramid button" which is found at reference number 82 "cellular telephone touch screen remote control" feature. Said cellular telephone "speaker/transmitter button" can be manufactured with various plasticized materials or various encompassing a minute magnet at its base connected to an electronic wiring circuit board with plasticized materials covering said wiring and can also include cardboard materials which can be used to manufacture the inner circumference of said speaker wall(s) Said "speaker/transmitter button" is depicted as being oblong or circular in shape. Shapes and measurements are optional. Reference number 68 shows said cellular telephone "joystick button" which is designed to protract reference number 69 said cellular telephone "joystick protracted" feature from within the inner body of said cellular telephone when initially pressed down by the user. Said cellular telephone "joystick protracted" slowly retracts back inside of the inner body of said cellular telephone when held down for 2 seconds reverting to said, "joystick button". Said cellular telephone "joystick button" can be manufactured with various plasticized materials or various rubber materials. Said "joystick button" is depicted as being oblong or circular in shape. Shapes and measurements are optional. Reference number 77 shows said cellular telephone "monitor screen" slowly protracting upward creating a zooming effect. The protraction of said "monitor screen" in synchronization with said reference number 70 "monitor camera" can be conducted by slowly tilting said cellular telephone "joystick protracted" feature to the right. As an alternative the protraction of said cellular telephone "monitor screen" and monitor camera" in synchronization can also be carried out by reference number 83 "protraction button" which is found at said reference number 82 "cellular telephone touch screen remote control" feature. Said cellular telephone operations and functions will provide the user with a variety of innovative options to protract or retract and or operate and maneuver said cellular telephone "monitor screen" and "monitor camera" in synchronization in a full and complete 360 degree rotation while taking photographs video recording—selfies—face timing—texting or gaming. Said—reference number 72 "full length rear camera design" or reference number 96 "secondary tech full length rear camera design" or reference number 97 "secondary tech full length rear camera protracting" or reference number 73 "full length rear camera functions" and there component said reference number 75 "full length rear camera component" can also operate and function in the same manner when programmed via said cellular telephone programming and setting features. Further helping the user in capturing ultra-wide angles and dimensional images and will end the need for second party aid and mirror images. Said cellular telephone "monitor screen" can be manufactured with various plasticized materials or various thermo plastic materials or various plasma materials. Said cellular telephone "monitor screen" is depicted as being oblong in shape. Shapes and measurements are optional.

Another embodiment of said cellular telephone is illustrated in FIG. 30. Shows said cellular telephone lying flat left side view shows reference number 66 Said cellular telephone "speaker/transmitter button" fully retracted. Which is designed to protract reference number 67 cellular telephone "speaker/transmitter pyramid" when initially pressed down by the user. Said "speaker/transmitter button" also serves as a speaker which allows the user to listen to music through a much large and protractible speaker system. Said "speaker/transmitter button" also serves as a transmitter which allows the user to convert speech/sound into electronic impulses for transmission. Said "speaker/transmitter button" can also be protracted or retracted via reference number 90 "speaker pyramid button" which is found at reference number 82 "cellular telephone touch screen remote control" feature. Said cellular telephone "speaker/transmitter button" can be manufactured with various plasticized materials encompassing a minute magnet at its base connected to an electronic wiring circuit board with plasticized materials covering said wiring. And can also include cardboard materials in which can be used to manufacture the inner circumference of said speaker wall(s). Said "speaker/transmitter button" is depicted as being oblong or circular in shape. Shapes and measurements are optional. Reference number 68 shows said cellular telephone "joystick button" which is designed to protract reference number 69 "joystick" from within the inner body of said cellular telephone when initially pressed down by the user. Said cellular telephone "joystick protracted" feature slowly retracts back inside of the inner body of said cellular telephone when held down for 2 seconds by said user reverting back to said, "joystick button".

Said cellular telephone "joystick button" can be manufactured with various plasticized materials or various rubber materials. Said "joystick button" is depicted as being oblong or circular in shape. Shapes and measurements are optional. Reference number 78 shows said cellular telephone "monitor screen" slowly protracting at a declined angle creating a slanting effect in which is designed to also rotate and maneuver in a right to left rocking angle while in said declined position and can also slowly protract or retract and or rotate and maneuver in a full and complete 360 degree angle rotation while in the course of protracting or while in the course of retracting in or out of said declined position. Said cellular telephone reference number 72 "full length rear camera design" or reference number 96 "secondary tech full length rear camera design" or reference number 97 "secondary tech full length rear camera protracting" or reference number 73 "full length rear camera functions" and their component said reference number 75 "full length rear camera component" can also operate and function in the same manner when programmed via said cellular telephone programming and setting features. Further providing the user with a variety of innovative options helping the user in capturing ultra-wide angles and dimensional images when taking photographs—video recording—selfies—face timing—texting or gaming ending the need for second party aid and mirror images. Said cellular telephone "monitor screen" can be manufactured with various plasticized materials or various thermo plastic materials or various plasma materials. Said cellular telephone "monitor screen" is depicted as being oblong in shape. Shapes and measurements are optional.

Another embodiment of said cellular telephone is illustrated in FIG. 31. Shows said cellular telephone lying flat left side view shows said cellular telephone reference number 66 "speaker/transmitter button" retracted. Said "speaker/transmitter button" is designed to protract reference number 67 speaker/transmitter pyramid protracted" from within the inner body of said cellular telephone when initially pressed down by the user. Said "speaker/transmitter button" also serves as a speaker which allows the user to listen to music through a much larger and protractible speaker system. Said "speaker/transmitter button" also serves as a transmitter which allows the user to convert speech/sound into electronic impulses for transmission. Said speaker/transmitter button" can also be protracted or retracted via reference number 90 "speaker pyramid button" which is found at reference number 82 "cellular telephone touch screen remote control" feature. Said cellular telephone "speaker/transmitter button" can be manufactured with various plasticized materials encompassing a minute magnet at its base connected to an electronic wiring. circuit board with plasticized materials covering said wiring and can also include cardboard materials which can be used to manufacture the inner circumference of the speaker wall(s). Said "speaker/transmitter button" is depicted as being oblong or circular in shape. Shapes and measurements are optional. Reference number 68 shows said cellular telephone "joystick button" which is designed to protract reference number 69 said cellular telephone "joystick" feature from within the inner body of said cellular telephone when initially pressed down by the user. Said cellular telephone "joystick" slowly retracts back inside of the inner body of said cellular telephone when held down 2 seconds by the user reverting to said, "joystick button".

Said "joystick button" can be manufactured with various plasticized materials or various rubber materials. Said "joystick button" is depicted as being oblong or circular in shape. Shapes and measurements are optional. Reference number 79 shows said cellular telephone "monitor screen" slowly protracting at an inclined angle creating a slanting effect. The inclined protraction of said cellular telephone "monitor screen" and reference number 70 "monitor camera" in synchronization can be carried out by slowly tilting said "joystick" feature to the left. As an alternative said inclined protraction of said cellular telephone "monitor screen" and "monitor camera" in synchronization can also be accomplished by reference number 88 "360 degree rotation dial" which located at reference number 82 "cellular telephone touch screen remote control" feature. Said cellular telephone operations and functions will provide the user with a variety of innovative options to protract or retract and or rotate and maneuver said cellular telephone "monitor screen" and "monitor camera" in synchronization in said full and complete 360 degree angle rotation said, "Monitor screen" and "monitor camera" can also rotate and maneuver in a right to left rocking angle while in said inclined position or while protracting or retracting into or out of said inclined position. Helping the user in capturing ultra-wide angles and dimensional images when taking photographs—video recording—selfies—face timing—texting or gaming. Said reference number 72 "full length rear camera design" or reference number 96 "secondary tech full length rear camera design" or reference number 97 "secondary tech full length rear camera protracting" or reference number 73 "full length rear camera functions" and there component said reference number 75 "full length rear camera component" can also operate and function in the same manner when programmed via said cellular telephone programming and setting features. Said cellular telephone "monitor screen" can be manufactured with various plasticized materials or thermo plastic materials or plasma materials. Said cellular telephone "monitor screen" is depicted as being oblong in shape. Shapes and measurements are optional. Another embodiment is illustrated in FIG. 32. Shows said cellular telephone lying flat left side view shows reference number 66 said cellular telephone "speaker/transmitter button" fully retracted which is designed to protract reference number 67 said cellular telephone "speaker/transmitter pyramid" from within the inner body of said cellular telephone when initially pressed down by the user. Said cellular telephone "speaker/transmitter button" also serves as a speaker which allows the user to listen to music through a much larger and protractible speaker system. Said "speaker/transmitter button" also serves as a transmitter in which allows the user to convert speech/sound into electronic impulses for transmission. Said "speaker/transmitter button" can also be protracted via said reference number 90 "speaker pyramid button" which is found at said reference number 82 "cellular telephone touch screen remote control" feature. Said "speaker/transmitter button" can be manufactured with various plasticized materials encompassing a minute magnet at its base connected to an electronic circuit board with plasticized materials covering said wiring. And can also include cardboard materials which can be used to manufacture the inner circumference of said speakers wall(s). Said "speaker/transmitter button" is depicted as being oblong or circular in shape. Shapes and measurements are optional.

Reference number 68 shows said cellular telephone "joystick button" which is designed to protract reference number 69 said cellular telephone "joystick protracted" feature from within the inner body of said cellular telephone when initially pressed down by the user. Said cellular telephone joystick slowly retracts back inside of the inner body of said cellular telephone when held down for 2 seconds by the user reverting back to said, "joystick button". Said cellular telephone "joystick button" can be manufactured with various plasticized materials or various rubber materials. Said "joystick button" is depicted as being oblong or circular in shape. Shapes and measurements are optional. Reference number 80 shows said cellular telephone "monitor screen" slowly protracting in an upward horizontal angle. The horizontal protraction of said cellular telephone "monitor screen" and "monitor camera" in synchronization can be carried out by slowly tilting said joystick feature backwards. As an alternative said horizontal protraction of said cellular telephone "monitor screen" and "monitor camera" in synchronization can also be done via reference number 88 "360 degree rotation dial" in which is located at reference number 82 "cellular telephone touch screen remote control" feature. Said cellular telephone operations and functions will provide the user with a variety of innovative options to protract or retract and or rotate and maneuver said cellular telephone "monitor screen" and "monitor camera" in synchronization in a full and complete 360 degree angle rotation and can also rotate and maneuver in a right to left rocking angle while in said horizontal position or while in the course of protracting or retracting into or out of said horizontal position acting as a swivel. Aiding the user in capturing ultra-wide angles and dimensional images when taking photographs—video recording—selfies—face timing—texting or gaming.

Ending the need for second party aid and or mirror images. Said reference number 72 "full length rear camera design" or reference number 96 "secondary tech full length rear camera design" or reference number 97 "secondary tech full length rear camera protracting" or reference number 73 "full length rear camera functions" can also operate and function in the same manner when programmed via said cellular telephone programming and setting features. Said cellular telephone "monitor screen" can be manufactured with various plasticized materials or thermo plastic materials or plasma materials. Said cellular telephone monitor screen is depicted as being oblong in shape. Shapes and measurements are optional. Another embodiment is illustrated in FIG. 33. Shows said cellular telephone lying flat left side view shows reference number 66 said cellular telephone "speaker/transmitter button" fully retracted. Which is designed to protract reference number 76 cellular telephone "speaker/transmitter pyramid" from within the inner body of said cellular telephone when initially pressed down by the user. Said cellular telephone "speaker transmitter button" also serves as a speaker which allows the user to listen to music through a much larger and protractible speaker system. Said "speaker/transmitter button" also serves as a transmitter in which allows the user to convert speech/sound into electronic impulses for transmission. Said "speaker/transmitter button" can also be protracted or retracted via reference number 90 "speaker pyramid button" which is found at said reference number 82 "cellular telephone touch screen remote control" feature.

Said cellular telephone "speaker/transmitter button" can be manufactured with various plasticized materials encompassing a minute magnet at its base connected to an electronic wiring circuit board with plasticized materials covering said wiring. And can include cardboard materials which can be used to manufacture the inner circumference of the speaker wall(s). Said "speaker/transmitter button" is depicted as being oblong or circular in shape. Shapes and measurements are optional. Reference number 68 shows said cellular telephone "joystick button" which is designed to protract reference number 69 said cellular telephone "joystick" feature from within the inner body of said cellular telephone when initially pressed down by the user. Said cellular telephone "joystick protracted slowly retracts back inside of the inner body of said cellular telephone when held down by the user for 2 seconds reverting to said, "joystick button".

Said cellular telephone "joystick button" can be manufactured with various plasticized materials or various rubber materials. Said "joystick" is depicted as being oblong in shape or circular in shape. Shapes and measurements are optional. Reference number 81 shows said cellular telephone "monitor screen" slowly protracting from within the inner body of said cellular telephone in an upward reverse horizontal slanting angle with said cellular telephone "monitor screen" facing north. The fragmented line(s) in said fig stands for the back side of said "monitor screen" which consist of a solid piece of plasticized materials or thermo plastic materials or plasma materials that is consistent with manufacturing monitor screens. Said "monitor screen" is found on the opposite side of said drawing in said fig therefore the inner base that is shaded in said fig will not be visible but will be covered by said surrounding plasticized materials.

The reverse horizontal protraction of said "monitor screen" in synchronization with said reference number 70 "monitor camera" can be carried out by slowly tilting said joystick feature forward. As an alternative said reverse horizontal protraction of said cellular telephone in synchronization with said reference number 70 "monitor camera" can be carried out by reference number 88 "360 degree rotation dial" which is found at reference number 82 "cellular telephone touch screen remote control" feature. Said operations and functions will provide the user with a variety of innovative options to protract or retract and or rotate and maneuver said "monitor screen" and "monitor camera" in synchronization in a full and complete 360 degree rotation and can also rotate and maneuver in a right to left rocking angle while in said reverse horizontal position or while in the course of protracting or retracting into or—out of said reverse horizontal position. Helping the user in capturing ultra-wide angles and dimensional images when taking photographs—video recording—selfies—face timing—texting or gaming. Said cellular telephone reference number 72 "full length rear camera design" or reference number 96 "secondary tech full length rear camera design" or reference number 97 "secondary tech full length rear camera protracting" or reference number 73 "full length rear camera functions" and their component said reference number 75 "full length rear camera component". can also operate and maneuver in the same way when programmed via said cellular telephone programming and setting features.

Said cellular telephone "monitor screen" can be manufactured with various plasticized materials or various thermo plastic materials or various plasma materials. Said "monitor screen" is depicted as being oblong in shape. Shapes and measurements are optional. Another embodiment of said cellular telephone is illustrated in FIG. 34. Shows said cellular telephone lying flat bottom view. Shows reference number 65 said cellular telephone "input" which is a terminal connect- or for receiving electronic power or signal in which powers said cellular telephone via cellular telephone battery charger when plugged into an electrical socket or conductor. Said "input" can be manufactured with various plasticized materials or various rubber materials. Said "input" is circler in shape measurements are optional. Another embodiment of said cellular telephone is depicted in FIG. 35. Shows opposite side of said cellular telephone lying flat left side view with reference number 76 "full length rear camera retracted" and its component said reference number 75 "full length rear camera component". And reference number 72 "full length rear camera design" and its component said reference number 75 "full length rear camera component". And reference number 96 "secondary tech full length rear camera design" and its component said reference number 75 "full length rear camera component". And reference number 97 "secondary tech full length rear camera protracting" and its component said reference number 75 "full length rear camera component". And reference number 73 "full length rear camera functions" and its component said reference number 75 "full length rear camera component". Are all facing up right in said retracted position as depicted in said FIG. 35.

Reference number 63 shows said cellular telephone up and down "volume buttons" which are designed to allow the user to control and adjust audio frequencies. Said "volume buttons" can be manufactured with various plasticized materials or various rubber materials. Said "volume button" are oblong in shape. Shapes and measurements are optional. Reference number 64 shows said cellular telephone "power button" which is designed to allow the user to turn said cellular telephone power on when initially pressed down by the user and to cut said cellular telephone power off when pressed down a second time by said user. Said "power button" can be manufactured with various plasticized materials or various rubber materials. Said cellular telephone "power button" is circular in shape measurements are optional. Reference number 76 shows said cellular telephone "full length rear camera retracted" and its component said reference number 75 "full length rear camera component" also retracted. Said cellular telephone reference numbers 76 "full length rear camera retracted" and reference number 72 "full length rear camera design" and reference number 96 "secondary tech full length rear camera design" and reference number 97 "secondary tech full length rear camera protracting" and reference number 73 "full length rear camera functions" and there component said reference number 75 "full length rear camera component" consist essentially of a close box containing a sensitized plate or film on which an image is formed when light enters the box through a hole or lens. The retraction of said rear camera(s) and their component said reference number 75 can be carried out by logging into said cellular telephone programming and setting features and selecting rear camera programming features. The cellular telephone user will then be able to retract said full length rear camera by twisting said reference number 69 "joystick protracted" feature to the left. As an alternative the retractions of said full length rear camera(s) can be carried out by reference number 87 "retraction button" in which is located at said reference number 82 "cellular telephone touch screen remote control" feature. Said cellular telephone operations and functions will provide the user with a variety of innovative options to protract or retract and or rotate and maneuver said "full length rear camera(s)" and there component said reference number 75 "full length rear camera component" in a full and complete 360 degree rotation while taking photographs—video recording—selfies—face timing or gaming. Further assisting the user in capturing ultra-wide angles and dimensional images. Said features and functions will allow the user to place their cellular telephone up right on any sustainable flat surface at any desirable angle and participate in group photographs—video recordings—selfies—face timing by using reference number 92 "touch screen remote control monitor" which retains all images and programming and setting features that are captured or depicted on said cellular telephone monitor screen. The user will also have the option to protract said cellular telephone rear camera features via reference number 83 "protraction button" or retract said rear camera via reference number 87 "retraction button" and or rotate and maneuver said rear camera features via reference number 88 "360 degree rotation dial" and also snap pictures via reference number 89 "snap picture button" said reference numbers 92/83/87/88 and 89 are all located at reference number 82 "cellular telephone touch screen remote control" feature. Said cellular telephone features and functions will end the need for second party help when taking photographs—video recording as well as the need for mirror images and will create more options for the user in capturing said ultra wide angles and dimensional images.

Said reference number 82 "cellular telephone touch screen remote control" will allow the user to maintain full and complete access and control of their cellular telephone within its entirety. Said reference number 76 "full length rear camera retracted" can be manufactured with various plasticized materials or various thermo plastic materials or plasma materials. Said "full length rear camera retracted" is depicted as being oblong in shape. Shapes and measurements are optional. Said reference number 72 "full length rear camera design" is depicted as being oblong in shape. Shapes and measurements are optional. Reference number 72 component said reference number 75 "full length rear camera component" is depicted as being oblong in shape. Shapes and measurements are optional. Reference number 96 "secondary tech full length rear camera design" is depicted as being oblong in shape or circular. Shapes and measurements are optional. Reference number 96 component said reference number 75 "full length rear camera component" is depicted as being circular in shape. Shapes and measurements are optional. Said reference number 97 "secondary tech full length rear camera protracting" is depicted as being oblong in shape. Shapes and measurements are optional. Said reference number 97 component said reference number 75 "full length rear camera component" is depicted as being circular in shape measurements are optional. Reference number 73 "full length rear camera functions" is depicted as being oblong in shape. Shapes and measurements are optional. Said reference number 73 component said reference number 75 "full length rear camera component" is depicted as being oblong in shape. Shapes and measurements are optional.

Another embodiment of said cellular telephone is illustrated in FIG. 36. Shoes opposite side of said cellular telephone lying flat left side view. With reference number 77 "full length rear camera protracting outward" and reference number 72 "full length rear camera design" and reference number 96 "secondary tech full length rear camera design" and reference number 97 "secondary tech full length rear camera protracting" and reference number 73 "full length rear camera functions" and there component said reference number 75 "full length rear camera component" are all facing up in said protracting outward position as depicted in said FIG. 36. Reference number 63 shows said cellular telephone up and down "volume buttons" which are designed to allow the user to control and adjust audio frequencies. Said "volume buttons" can be manufactured with various plasticized materials or various rubber materials. Said "volume buttons" are oblong in shape measurements are optional.

Reference number 64 shows said cellular telephone "power button" which is designed to allow the user to turn said cellular telephone power on when initially pressed down by the user and to cut said cellular telephone power off when pressed down a second time by said user. Said "power button" can be manufactured with various plasticized materials or various rubber materials. Said cellular telephone "power button" is circular in shape measurements are optional. Reference number 77 shows said cellular telephone "full length rear camera protracting outward" and reference number 72 "full length rear camera design" and reference number 96 "secondary tech full length rear camera design" and reference number 97 "secondary tech full length rear camera protracting" and reference number 73 "full length rear camera functions" and there component said reference number 75 "full length rear camera component" rear camera(s) consist essentially of a close box a sensitized plate or film on which a image is formed when light enters the box through a lens or hole. Said protraction of said rear camera(s) can be conducted by logging into said cellular telephone programming and setting features and selecting said rear camera features. The user will then be able to protract said rear camera(s) by slowly twisting said cellular telephone reference number 69 "joystick protracted" feature to the right. As an alternative said protractions of said rear camera(s) can be carried out by said reference number 83 "protraction button" in which is found at said reference number 82 "cellular telephone touch screen remote control" feature. Said cellular telephone operations and functions will provide the user with a variety of innovative options to protract or retract and or rotate and maneuver said rear camera(s). Said features will allow the user to capture ultra-wide angle and dimensional images by placing their cellular telephone up right on any sustainable surface at any desirable angle and participate in group photographs—video recordings—dimensional selfies and face timing using reference number 92 "touch screen remote control monitor" which retains all images and programming and setting features captured or depicted by said users cellular telephone monitor screen/monitor camera. The user will also have the option to protract said cellular telephone rear camera(s) via said reference number 83 "protraction button" or retract said rear camera(s) via reference number 87 "retraction button" and or rotate and maneuver said rear camera(s) in a full and complete 360 degree angle rotation via reference number 88 "360 degree rotation dial" and snap pictures via reference number 89 "snap picture button". Said reference numbers 92/83/87/88 and 89 are all found at said reference number 82 "cellular telephone touch screen remote control" feature.

Said reference number 82 "cellular telephone touch screen remote control" feature will allow the user to maintain full and complete access and control of their cellular telephone in its entirety. Said reference number 77 full length rear camera can be manufactured with various plasticized materials or various thermo plastic materials or various plasma materials. Said reference number 77 "full length rear camera protracting outward" is depicted as being oblong or circular in shape measurements are optional. Reference number 72 "full length rear camera design" is depicted as being oblong in shape. Shapes and measurements are optional. Reference number 96 "secondary tech full length rear camera design" is depicted as being circular in shape measurements are optional. Reference number 97 "secondary tech full length rear camera protracting" is depicted as being oblong in shape measurements are optional. Reference number 73 "full length rear camera functions" is depicted as being oblong in shape measurements are optional. Said component reference number 75 "full length rear camera component" is depicted as being oblong in shape measurements are optional. Another embodiment of said cellular telephone is depicted in FIG. 37. Shows opposite side of said cellular telephone lying flat left side view with reference number 78 "full length rear camera slowly protracting at a declined angle and reference number 72 "full length rear camera design" and reference number 96 "secondary tech full length rear camera design" and reference number 97 "secondary tech full length rear camera protracting" as well as reference number 73 "full length rear camera functions" and there component said reference number 75 "full length rear camera component" are all facing up in said declined position.

Reference number 63 shows said cellular telephone up and down "volume buttons" which are designed to allow the user to control and adjust audio frequencies. Said "volume buttons" can be manufactured with various plasticized materials or various rubber materials. Said "volume buttons" are oblong in shape measurements are optional. Reference number 64 shows said cellular telephone "power button" which is designed to allow the user to turn said cellular telephone power on when initially pressed down by the user or to cut said cellular telephone power off when pressed down a second time by the user. Said "power button" can be manufactured with various plasticized materials or various rubber materials. Said cellular telephone "power button" is circular in shape measurements are optional. Reference number 78 shows said cellular telephone "full length rear camera slowly protracting in a declined" position and said reference number 72 "full length rear camera design" and reference number 96 "secondary tech full length rear .camera design" and reference number 97 "secondary tech full length rear camera protracting" as well as reference number 73 "full length rear camera functions" and there component said reference number 75 "full length rear camera component" said rear camera(s) consist essentially of a close box a sensitized plate or film on which a image is formed when light enters the box through a lens or hole.

Said protraction of said rear camera(s) can be done by logging into said cellular telephone programming and setting features and selecting said rear camera features. The user will then be able to slowly protract said rear camera(s) by slowly tilting said cellular telephone reference number 69 "joystick protracted" feature to the right. As an alternative said protraction in said declined position can be accomplished by reference number 88 "360 degree rotation dial" in which is located at said reference number 82 "cellular telephone touch screen remote control" feature. Said cellular telephone operations and functions will provide the user with a variety of innovative options to protract or retract and or operate and maneuver said rear camera(s). Said features will allow the user to capture ultra-wide angles and dimensional images by placing their cellular telephone up right on any sustainable flat surface at any desirable angle and participate in group photographs—video recording—dimensional selfies and face timing by using reference number 92 "touch screen remote control monitor" which retains all images and programming and setting features captured or depicted on said cellular telephone monitor screen/monitor camera. The user will also have the option to protract said cellular telephone rear camera(s) via said reference number 83 "protraction button" or retract said rear camera(s) via reference number 87 "retraction button" and rotate and maneuver said rear camera(s) in a full and complete 360 degree angle rotation via reference number 88 "360 degree rotation dial" and snap pictures via reference number 89 "snap picture button". Said reference numbers 92/83/87/88 and 89 are all found at said reference number 82 "cellular telephone touch screen remote control" feature.

Said reference number 82 "cellular telephone touch screen remote control" feature will allow the user to maintain full and complete access and control over their cellular telephone in its entirety. Said reference number 78 "full length rear camera protracting in a declined" angle can be manufactured with various plasticized materials or various thermo plastic materials or various plasma materials. Said reference number 78 is depicted as being oblong or circular in shape. Shapes and measurements are optional. Reference number 72 "full length rear camera design" is depicted as being oblong in shape. Shapes and measurements are optional. Reference number 96 "secondary tech full length rear camera design" depicted as being circular in shape. Shapes and measurements are optional. Reference number 97 "secondary tech full length rear camera protracting" is depicted as being oblong in shape. Shapes and measurements are optional. Reference number 73 "full length rear camera functions" is depicted as being oblong in shape. Shapes and measurements are optional. Said rear camera component reference number 75 "full length rear camera component" is depicted as being circular in shape. Shapes and measurements are optional. Another embodiment of said cellular telephone is illustrated in FIG. 38. Shows opposite side of said cellular telephone lying flat left side view with reference number 79 "full length rear camera protracting at an inclined angle. And reference number 72 "full length rear camera design" and reference number 96 "secondary tech full length rear camera design" and reference number 97 "secondary tech full length rear camera protracting" and reference number 73 "full length rear camera functions" and their component said reference number 75 "full length rear camera component" are all facing up in said inclined position as depicted in said fig.

Reference number 63 shows said cellular telephone up and down "volume buttons" which are designed to allow the user to control and adjust audio frequencies. Said "volume buttons" can be manufactured with various plasticized materials or various rubber materials. Said "volume buttons" are oblong in shape measurements are optional. Reference number 64 shows said cellular telephone "power button" which is designed to allow the user to turn said cellular telephone power on when initially pressed down by the user or to cut said cellular telephone power off when pressed down by the user a second time. Said "power button" can be manufactured with various plasticized materials or various rubber materials. Said cellular telephone "power button" is circular in shape measurements are optional. Reference number 79 shows said cellular telephone "full length rear camera protracting at an inclined position. And reference number 72 "full length rear camera design" and reference 96 "secondary tech full length rear camera design" and reference number 97 "secondary tech full length rear camera protracting" and reference number 73 "full length rear camera functions" and their component said reference number 75 "full length rear camera component" consist essentially of a close box or a sensitized plate or film on which a image is formed when light enters the box through a lens or hole. The protraction of said rear camera(s) can be accomplished by logging into said cellular telephone programming and setting features and selecting said rear camera feature. The user will then be able to slowly protract said rear camera(s) by slowly tilting said cellular telephone reference number 69 "joystick.

protracted" feature to the left. As an alternative the inclined protraction of said cellular telephone rear camera(s) can be carried out by reference number 88 "360 degree rotation dial" which is found at said reference number 82 "cellular telephone touch screen remote control" feature.

Said cellular telephone operations and functions will provide the user with a variety of innovative options to protract retract and or operate and maneuver said rear camera(s). Said features will allow the user to capture ultra-wide angles and dimensional images by placing their cellular telephone up right on any sustainable flat surface at any desirable angle and participate in group photographs—video recording—dimensional selfies and face timing by using reference number 92 "touch screen remote control monitor" which retains all images and programming and setting features captured or depicted on said cellular telephone monitor screen/monitor camera. The—user will also have the option to protract said cellular telephone rear camera(s) via reference number 83 "protraction button" or retract said rear camera(s) via reference number 87 "retraction button" and or rotate and maneuver said rear camera(s) in a full and complete 360 degree angle rotation via reference number 88 "360 degree rotation dial" and also snap picture via reference number 89 "snap picture button". Said reference numbers 92/83/87/88 and 89 are all found at said reference number 82 "cellular telephone touch screen remote control" feature. Said reference number 82 "cellular telephone touch screen remote control" feature will allow the user to maintain full and complete control over their cellular telephone within its entirety. Said reference number 79 "full length rear camera protracting at a inclined angle can be manufactured with various plasticized materials or various thermo plastic materials or various plasma materials. Said reference number 79 is depicted as being oblong or circular in shape. Shapes and measurements are optional. Reference number 72 "full length rear camera design" is depicted as being oblong in shape. Shapes and measurements are optional. Reference number 96 "secondary tech full length rear camera design" is depicted as being circular in shape Measurements are optional.

Reference number 97 "secondary tech full length rear camera protracting" is depicted as being oblong in shape. Shapes and measurements are optional. Reference number 73 "full length rear camera functions" is depicted as being oblong in shape. Shapes and measurements are optional. Said rear camera component said reference number 75 'full length rear camera component" is depicted as being circular in shape. Shapes and measurements are optional. Another embodiment is illustrated in FIG. 39. Shows said cellular telephone lying flat left side view with reference number 80 "full length rear camera protracting at a horizontal" angle. And reference number 72 "full length rear camera design" and reference number 96 "secondary tech full length rear camera design" and reference number 97 "secondary tech full length rear camera protracting" and reference number 73 "full length rear camera functions" and there component said reference number 75 "full length rear camera component" are all facing up in said horizontal position as depicted in said fig. Reference number shows said cellular telephone up and down "volume buttons" which are designed to allow the user to control and adjust audio frequencies. Said "volume buttons" can be manufactures with various plasticized materials or various rubber materials. Said "volume buttons" are oblong in shape measurements are optional.

Reference number 64 shows said cellular telephone "power button" which is designed to allow the user to turn said cellular telephone power on when initially pressed down by the user or to cut said cellular telephone power off when pressed down a second time by the user. Said "power button" can be manufactured with various plasticized materials or various rubber materials. Said cellular telephone "power button" is oblong in shape measurements are optional. Reference number 80 shows said cellular telephone "full length rear camera protracting at a reverse horizontal position. And reference number 72 "full length rear camera design" and reference number 96 "secondary tech full length rear camera design" and reference number 97 "secondary tech full length rear camera protracting" and reference number 73 "full length rear camera functions" and their component said reference number 75 "full length rear camera component". Consist essentially of a close box or a sensitized plate or film on which a image is formed when light enters the box through a lens or hole. The protracting horizontal angle of said rear camera(s) and their component reference number 75 can be done by logging into said cellular telephone programming and setting features and selecting said rear camera features. The user will then be able to slowly protract said rear camera(s) by slowly tilting said cellular telephone reference number 69 "joystick (protracted) feature backwards. As an alternative the horizontal protraction of said rear camera(s) can be carried out by reference number 88, 360 degree rotation dial" which is found at reference number 82 "cellular telephone touch screen remote control" feature. Said cellular telephone operations and functions will provide the user with a variety of innovative options to protract or retract and or rotate and maneuver said rear camera(s). Said feature will allow the user to capture ultra-wide angles and dimensional images by placing their cellular telephone up right on any sustainable flat surface at any desirable angle and participate in group photographs—video recording—dimensional selfies and face timing by using reference number 92 "touch screen remote control monitor" which retains all images and programming and setting features captured or depicted on said cellular telephone monitor screen/monitor camera. The user will also have the option to protract said cellular telephone rear camera(s) via reference number 83 "protraction button" or retract said rear camera(s) via reference number 87 "retraction button" and or operate and maneuver said rear camera(s) in a full and complete 360 degree angle rotation via reference number 88 "360 degree rotation dial" and also snap pictures via reference number 89 "snap picture button". Said reference numbers 92/83/87/88/and 89 are located at said reference number 82 "cellular telephone touch screen remote control". Said reference number 80 "full length rear camera protracting at a horizontal" angle can be manufactured with various plasticized materials or various thermo plastic materials or various plasma materials. Said reference number 80 is depicted as being oblong in shape. Shapes and measurements are optional. Reference number 72 "full length rear camera is depicted as being oblong in shape. Shapes and measurements are optional. Reference number 96 "secondary tech full length rear camera is depicted as being oblong in shape. Shapes and measurements are optional. Reference number 97 "secondary tech full length rear camera is depicted as being oblong in shape. Shapes and measurements are optional. Reference number 73 "full length rear camera functions" is depicted as being oblong in shape. Shapes and measurements are optional. Said reference number 75 "full length rear camera component" is depicted as being circular in shape. Shapes and measurements are optional.

Another embodiment of said cellular telephone is illustrated in FIG. 40. Shows opposite side of said cellular telephone lying flat left side view with reference number 81 "full length rear camera" slowly protracting in a reverse horizontal angle. And reference number 75 "full length rear camera design" and reference number 96 "secondary tech full length rear camera design" and reference number 97 "secondary tech full length rear camera protracting" and reference number 73 "full length rear camera functions" and there component said reference number 75 "full length rear camera component" are all facing up in said reverse horizontal position as depicted in said fig. Reference number 63 shows said cellular telephone up and down "volume buttons" which are designed to allow the user to control and adjust audio frequencies. Said "volume buttons" can be manufactured with various plasticized materials or various rubber materials. Said "volume buttons" are oblong in shape measurements are optional. Reference number 64 shows said cellular telephone "power button" which is designed to turn said cellular telephone power on when initially pressed down by the user or to cut said power off when pressed down a second time by the user. Said cellular telephone "power button" can be manufactured with various plasticized materials or various rubber materials. Said cellular telephone "power buttons" is circler in shape measurements are optional. Reference number 81 shows said cellular telephone "full length rear camera(s) slowly protracting in a reverse horizontal angle. Said rear camera(s) and their component said reference number 75 "full length rear camera component" consist essentially of a close box containing a sensitized plate or film on which an image is formed when light enters the box through a lens or hole.

Said protractions of said rear camera(s) can be carried out by logging into said cellular telephone programming and setting features and selecting said rear camera feature. The user will then be able to slowly protract said rear camera(s)

by slowly twisting said cellular telephone reference number 69 "joystick (protracted)" feature to the right. As an alternative said reverse horizontal position of said rear camera(s) can be carried out by reference number 88 "360 degree rotation dial" in which is found at reference number 82 "cellular telephone touch screen remote control" feature. Said cellular telephone operations and functions will provide the user with a variety of innovative options to protract or retract and or rotate and maneuver said rear camera(s) assisting the user in capturing ultra-wide angles and dimensional images by placing their cellular telephone right on any sustainable flat surface at any desirable angle and participate in group photographs—video recording—dimensional selfies and face timing by using reference number 92 "touch screen remote control monitor" which retains all images and programming and setting features captured or depicted on said cellular telephone monitor screen/monitor camera. The user will also have the option to protract said cellular telephone rear camera(s) via said reference number 83 "protraction button" or retract said rear camera(s) via reference number 87 "retraction button" and rotate and maneuver said rear camera(s) in a full and complete 360 degree rotation via reference number 88 "360 degree rotation dial" and also snap pictures via reference number 89 "snap picture button". Said reference numbers 92/83/87/88 and 89 are all found at said reference number 82 "cellular telephone touch screen remote control" feature.

Said reference number 82 "cellular telephone touch screen remote control" feature will allow the user to maintain full and complete access and control over their cellular telephone in its entirety. Said cellular telephone reference number 81 "full length rear camera protracting in a reverse horizontal" angle can be manufactured with various plasticized materials or various thermo plastic materials or various plasma materials. Said reference number 81 is depicted as being oblong in shape. Shapes and measurements are optional. Reference number 72 "full length rear camera design" is depicted as being oblong in shape. Shapes and measurements are optional. Reference number 96 "secondary tech full length rear camera design" is depicted as being circler in shape. Shapes and measurements are optional. Reference number 97 "secondary tech full length rear camera protracting" is depicted as being oblong in shape. Shapes and measurements are optional. Reference number 73 "full length rear camera functions" are depicted as being oblong in shape. Shapes and measurements are optional. Said rear camera component said reference number 75 "full length rear camera component" is depicted as being circular in shape. Shapes and measurements are optional. Another embodiment of said cellular telephone is illustrated in FIG. 41. shows opposite side of said cellular telephone lying flat right-side view with reference number 76 "full length rear camera retracted". And reference number 72 "full length rear camera design" and reference number 96 "secondary tech full length rear camera design" and reference number 97 "secondary tech full length rear camera protracting" and reference number 73 "full length rear camera functions" and their component said reference number 75 "full length rear camera component" are all facing up as depicted in said fig.

Reference number 68 shows said cellular telephone "joystick button" which is designed to protract reference number 69 said cellular telephone "joystick protracted" feature from within the inner body of said cellular telephone when initially pressed down by the user. Said cellular telephone joystick feature is a manual device connected to said cellular telephone terminal serving as a control lever that can be tilted and maneuvered in various directions to operate rotate and maneuver said rear camera(s) in a full and complete 360 degree rotation. Said reference number 69 "joystick protracted" feature slowly retracts back inside of the inner body of said cellular telephone when held down for 2 seconds by the user reverting back to said reference number 68 "joystick button". Said cellular telephone reference number 68 "joystick button" can be manufactured with various plasticized materials or various rubber materials. Said "joystick button" is depicted as being oblong or circular in shape. Shapes and measurements are optional. Reference number 66 "speaker/transmitter button" slowly protracts upward slowly appearing from within the inner body of said cellular telephone creating reference number 67 "speaker/transmitter pyramid". Which is a four-level speaker pyramid which is designed to provide the user with a sharp crisp and much louder sound when communicating via said cellular telephone speaker phone or while listening to music via said cellular telephone. Said reference number 67 "speaker/transmitter pyramid slowly retracts back inside of the inner body of said cellular telephone when pressed down by the user. As an alternative said reference number 66 can be protracted via said reference number 90 "speaker pyramid button" and said reference number 67 "speaker/transmitter pyramid can be retracted via said reference number 90 "speaker pyramid button" which is found at said reference number 82 "cellular telephone touch screen remote control" feature. Said "speaker/transmitter button" as well as said "speaker/transmitter pyramid" can be manufactured with various plasticized materials and various metaled materials encompassing a minute magnet at its base connected to an electronic wiring circuit board with plasticized materials covering said wiring and can include cardboard materials in which can be used to manufacture the circumference of the speaker walls. Said "speaker transmitter button" is depicted as being oblong or circular. Shapes and measurements are optional. Said "speaker/transmitter pyramid" is depicted as being the shape of a pyramid". Shapes and measurements are optional. Reference number 76 shows said, "full length rear camera retracted" and its component said reference number 75 "full length rear camera component". Said rear camera(s) consist essentially of a close box containing a sensitized plate or film on which an image is formed when light enters the box through a lens or hole. The retraction of said reference numbers 76 "full length rear camera retracted" and reference number 72 "full length rear camera design" and reference number 96 "secondary tech full length rear camera design" and reference number 97 "secondary tech full length rear camera protracting" and reference number 73 "full length rear camera functions" and their component said reference number 75 "full length rear camera component" can be carried out by logging into said cellular telephone programming and setting features and selecting said rear camera features.

The user will then be able to retract said rear camera by slowly twisting said cellular telephone reference number 69 "joystick protracted" feature to the left. As an alternative the retraction of said rear camera(s) can be carried out by reference number 87 "retraction button" which is found at said reference number 82 "cellular telephone touch screen remote control" feature. Said cellular telephone operations and functions will provide the user with a variety of innovative options to protract or retract and or rotate and maneuver said rear camera(s) in a full and complete 360 degree rotation while taking group photographs—video recording—selfies and face timing. Further aiding the user in capturing ultra-wide angles and dimensional images. Said features will allow the cellular telephone user to place their cellular telephone up right on any flat surface at any desirable angle and participate in group photographs—video recording—selfies or face timing by using reference number 92 "touch screen remote control monitor" which retains all images and programming and setting features or depicted on said cellular telephone monitor screen/monitor camera. The user will also have the option to protract said cellular telephone rear camera features via reference number 83 "protraction button" or retract said rear camera(s) via reference number 87 "retraction button" and or rotate and maneuver said cellular telephone rear camera(s) via reference number 88 "360 degree rotation dial" or snap pictures via reference number 89 "snap picture button". Said reference numbers 92/83/87/88 and 89 are all found at reference number 82 "cellular telephone touch screen remote control" feature. Said reference number 82 "cellular telephone touch screen remote control" feature will allow the user to maintain complete access and control over their cellular telephone within its entirety.

Said reference number 76 "full length rear camera retracted can be manufactured with various plasticized materials or various thermo plastic materials or various plasma materials. Said reference number 76 "full length rear camera retracted" is depicted as being oblong or circler in shape. Shapes and measurements are optional. Reference number 72 "full length rear camera design" is depicted as being oblong in shape Shapes and measurements are optional. Reference number 96 "secondary tech full length rear camera design" is depicted as being circular in shape. Shapes and measurements are optional. Reference number 97 "full length rear camera protracting" is depicted as being oblong in shape. Shapes and measurements are optional. Reference number 73 "full length rear camera functions" is depicted as being oblong in shape. Shapes and measurements are optional. Said rear camera component said reference number 75 "full length rear camera component" is depicted as being circular in shape. Shapes and measurements are optional.

Another embodiment of said cellular telephone is illustrated in FIG. 42. Shows opposite side of said cellular telephone lying flat right-side view with reference number 77 "full length rear camera protracting outward" And reference number 72 "full length rear camera design" and reference number 96 "secondary tech full length rear camera design" and reference number 97 "secondary tech full length rear camera protracting" and reference number 73 "full length rear camera functions" and there component said reference number 75 "full length rear camera component" are all facing up as depicted in said figure. Reference number 68 shows said cellular telephone "joystick button" which is designed to protract reference number 69 said cellular telephone "joystick protracted" from within the inner body of said cellular telephone when initially pressed down by the user.

Said cellular telephone "joystick protracted" feature is a manual device connected to said cellular telephone terminal serving as a control lever that can be tilted in various directions to operate rotate and maneuver said rear camera(s) in a full and complete 360 degree rotation. Said reference number 69 "joystick (protracted)" feature slowly retracts back inside of the inner body of said cellular telephone when held down for 2 seconds by the user reverting back to said reference number 68 "joystick button". Said cellular telephone reference number 68 "joystick button" can be manufactured with various plasticized materials or various rubber materials. Said "joystick button" is depicted as being oblong or circular in shape. Shapes and measurements are optional. Reference number 66 "speaker/transmitter button" slowly protracts emerging from within the inner body of said cellular telephone creating reference number 67 "speaker/transmitter pyramid" Which is a four level speaker pyramid which is designed to provide the user with a sharp—crisp and louder sound when communicating via said cellular telephone speaker phone or while listening to music via said cellular telephone. Said reference number 67 "speaker/transmitter pyramid" slowly retracts back inside of the inner body of said cellular telephone when pressed down by the user. Said reference number 66 "speaker/transmitter button" can be protracted via said reference number 90 "speaker pyramid button" when initially pressed down by the user. Reference number 67 "speaker/transmitter pyramid" can also be retracted via said reference number 90 "speaker pyramid button" when pressed down by the user a second time. Said reference number 90 "speaker pyramid button" is found at reference number 82 "cellular telephone touch screen remote control" feature.

Said "speaker/transmitter button" and said "speaker/transmitter pyramid" can be manufactured with various plasticized materials and various metaled materials encompassing a minute magnet at its base connected to an electronic wiring board with plasticized materials covering said wiring and can also include cardboard materials in which can be used to manufacture the circumference of the inner speaker walls. Said "speaker/transmitter button" is depicted as being oblong or circular in shape. Shapes and measurements are optional. Said "speaker/transmitter pyramid" is depicted as being the shape of a pyramid. Shapes and measurements are optional.

Reference number 77 shows said cellular telephone "full length rear camera protracting. Said rear camera(s) and their component said reference number 75 "full length rear camera component" consist essentially of a close box containing a sensitized plate or film on which an image is formed when light enters the box through a lens or hole. The protraction of said rear camera(s) can be carried out by logging into said cellular telephone programming and setting features and selecting said rear camera programming feature. The cellular telephone user will then be able to protract said rear camera(s) by slowly twisting said cellular telephone reference number 69 "joystick protracted" feature to the right. As an alternative said rear camera(s) and their component said reference number 75 "full length rear camera component" can also be protracted via reference number 83 "protraction button" which is located at reference number 82 "cellular telephone touch screen remote control" feature. Said operations and functions will provide the user with a variety of innovative options to protract or retract and or rotate and maneuver said cellular telephone rear camera(s) in a full and complete 360 degree rotation while taking photographs—video recording—selfies or face timing further assisting the user in capturing ultra-wide angles and dimensional images. Said features will further allow the user to place their cellular telephone up right on any flat surface at any desirable angle and participate in group photographs—video recordings—selfies or face timing by using reference number 92 "touch screen remote control monitor" which retains all images and programming and setting features captured or depicted on the users cellular telephone monitor screen/monitor camera.

The user will also be able to protract said rear camera features via reference number 83 "protraction button" or retract said cellular telephone rear camera(s) via reference number 87 "retraction button" and or rotate and maneuver said cellular telephone rear camera(s) via reference number 88 "360 degree rotation dial" or snap pictures via reference number 89 "snap picture button". Said reference number 92/83/87/88 and 89 are all found at reference number 82 "cellular telephone touch screen remote control" feature.

Said reference number 82 "cellular telephone touch screen remote control" feature will allow the user to maintain complete access and control over their cellular telephone within its entirety. Said reference number 77 "full length rear camera protracting outward" can be manufactured with various plasticized materials or various thermo plastic materials or various plasma materials. Said reference number 77 "full length rear camera protracting outward" is depicted as being oblong or circler in shape. Shapes and measurements are optional. Reference number 72 "full length rear camera is depicted as being oblong in shape. Shapes and measurements are optional. Reference number 96 "secondary tech full length rear camera design" is depicted as being circular in shape. Shapes and measurements are optional. Reference number 97 "full length rear camera protracting" is depicted as being oblong in shape. Shapes and measurements are optional. Reference number 73 "full length rear camera functions" is depicted as being oblong in shape. Shapes and measurements are optional. Said reference number 75 "full length rear camera component" is depicted as being circular in shape. Shapes and measurements are optional.

Another embodiment of said cellular telephone is illustrated in FIG. 43. shows opposite side of said cellular telephone lying flat right site view with said reference number 78 "full length rear camera protracting at a declined angle. And reference number 72 "full length rear camera design" and reference number 96 "secondary tech full length rear camera protracting" and their component said reference number 75 "full length rear camera component" are all facing up as depicted in said figure. Reference number 68 shows cellular telephone "joystick button" which is designed to protract reference number 69 said cellular telephone "joystick protracted" from within the inner body of said cellular telephone when initially pressed down by the user. Said "joystick protracted" feature is a manual device connected to said cellular telephone terminal serving as a control lever that can be tilted in various directions to operate rotate and maneuver said rear camera(s) in full and complete 360 degree rotation. Said reference number 69 "joystick protracted" feature slowly retracts back inside of the inner body of said cellular telephone when held down for 2 seconds by the user reverting back to said reference number 68 "joystick button". Said cellular telephone reference number 68 "joystick button" can be manufactured with various plasticized materials or various rubber materials. Said "joystick button" is depicted as being oblong or circler in shape. Shapes and measurements are optional. Reference number 66 "speaker/transmitter button" slowly protracts emerging from within the inner body of said cellular telephone creating reference number 67 "speaker/transmitter pyramid" which is a four level speaker pyramid which is designed to provide the user with a sharp—crisp and louder sound when communicating via said cellular telephone speaker phone or while listening to music via said cellular telephone.

Said reference number 67 "speaker/transmitter pyramid" slowly retracts back inside of the inner body of said cellular telephone when pressed down by the user. Said reference number 66 "speaker/transmitter button" can be protracted via said reference number 90 "speaker pyramid button" when initially pressed down by the user. Reference number 67 "speaker/transmitter pyramid" can also be retracted via said reference number 90 "speaker pyramid button" when pressed down by the user a second time. Said reference number 90 "speaker pyramid button" is located at reference number 82 "cellular telephone touch screen remote control" feature. Said "speaker/transmitter button" and said "speaker/transmitter pyramid" can be manufactured with various plasticized materials and various metalized materials encompassing a minute magnet at its base connected to an electronic wiring board with plasticized materials covering said wiring and can also include cardboard materials in which can be used to manufacture the inner circumference of the inner speaker walls. Said "speaker/transmitter button" is depicted as being oblong or circular in shape. Shapes and measurements are optional. Said "speaker/transmitter pyramid" is depicted as being the shape of a pyramid. Said shapes and measurements are optional. Reference number 78 "full length rear camera protracting at a declined" angle. Said rear camera(s) and their component said reference number 75 "full length rear camera component" consist essentially of a close box containing a sensitized plate or film on which an image is formed when light enters the box through a lens or hole.

The protraction of said rear camera(s) can be carried out by logging into said cellular telephone programming and setting features and selecting said rear camera programming features. The cellular telephone user will then have the option to protract said rear camera(s) by slowly twisting said cellular telephone reference number 69 "joystick protracted" to the right. As an alternative said rear camera(s) and their component said reference number 75 "full length rear camera component" can also be protracted via reference number 83 "protraction button" which is located at reference number 82 "cellular telephone touch screen remote control" feature. Said operations and functions will provide the user with a variety of innovative options to protract or retract and or rotate and maneuver said rear camera(s) in a full and complete 360 degree angle rotation while taking photographs—video recording—selfies or face timing further aiding the user in capturing ultra-wide angles and dimensional images. Said features will further allow the user to place their cellular telephone up right on any flat surface at any desirable angle and participate in group photographs—video recording—selfies or face timing by using reference number 92 "touch screen remote control monitor' which retains all images and programming and setting features captured or depicted on the users cellular telephone monitor screen/monitor camera. The user will also have the option to protract said rear camera(s) via reference number 83 "protraction button" or retract said rear camera(s) via reference number 87 "retraction button" and or rotate and maneuver said cellular telephone rear camera(s) via reference number 88 "360 degree rotation dial" or snap pictures via said reference number 89 "snap picture button". Said reference numbers 92/83/87/88 and 89 are all found at said reference number 82 "cellular telephone touch screen remote control" feature.

Said cellular telephone reference number 82 "cellular telephone touch. screen remote control" feature will. allow the user to maintain complete access and control over their cellular telephone from a distance. Said reference number 78 "full length rear camera protracting declined" can be manufactured with various plasticized materials or various thermo plastic materials or various plasma materials. Said reference number 78 "full length rear camera declined" is depicted as being oblong or circler in shape. Shapes and measurements are optional. Reference number 72 "full length rear camera design" is depicted as being oblong in shape. Shapes and measurements are optional. Reference number 96 "full length rear camera design" is depicted as being circular in shape. Shapes and measurements are optional. Reference number 97 "secondary tech full length rear camera protracting" is depicted as being oblong or circular in shape. Shapes and measurements are optional. Reference number 73 "full length rear camera functions" is depicted as being oblong in shape. Shapes and measurements are optional. Said reference number 75 "full length rear camera component" is depicted as being circular in shape. Shapes and measurements are optional.

Another embodiment of said cellular telephone is illustrated in FIG. 44. Shows opposite side of said cellular telephone lying flat right-side view with said reference number 79 "full length rear camera protracting at an inclined" angle. And reference number 72 "full length rear camera design" and reference number 96 "secondary tech full length rear camera "design" and reference number 97 "secondary tech full length rear camera protracting" and reference number 73 "full length rear camera functions" and their component said reference number 75 "full length rear camera are all facing up as depicted in said figure. Reference number 68 shows said cellular telephone "joystick button" which is designed to protract reference number 69 "joystick protracted" from within the inner body of said cellular telephone when initially pressed down by the user. Said "joystick protracted" feature is a manual device connected to said cellular telephone terminal serving as a control lever that can be tilted in various directions to operate rotate and maneuver said rear camera(s) in a full and complete 360-degree rotation. Said reference number 69 "joystick protracted" feature slowly retracts back inside of the inner body of said cellular telephone when held down by the user for 2 seconds reverting to said reference number 68 "joystick button". Said reference number 68 "joystick button" can be manufactured with various plasticized materials or various rubber materials. Said "joystick button" is depicted as being oblong or circular in shape. Shapes and measurements are optional.

Reference number 66 "speaker/transmitter button" slowly protracts emerging from within the inner body of said cellular telephone creating reference number 67 "speaker/transmitter pyramid" which is a four level speaker pyramid which is designed to provide the user with a sharp—crisp and louder sound when communicating via said cellular telephone speaker phone or while listening to music via said cellular telephone. Said reference number 67 "speaker/transmitter pyramid" slowly retracts back inside of the inner body of said cellular telephone when pressed down by the user. Said reference number 66 "speaker/transmitter button" can also be protracted via said reference number 90 "speaker pyramid button" when initially pressed down by the user. Reference number 67 "speaker/transmitter pyramid" can also be retracted via said reference number 90 "speaker pyramid button" when pressed down by the user a second time. Said reference number 90 "speaker pyramid button" is found at reference number 82 "cellular telephone touch screen remote control' feature.

Said reference number 66 "speaker/transmitter button" and reference number 67 "speaker/transmitter pyramid" can be manufactured with various plasticized materials and various metaled materials encompassing a minute magnet at its base connected to an electronic wiring board with plasticized materials covering said wiring and can also include cardboard materials in which can be used to manufacture the circumference of the inner speaker walls. Said speaker/transmitter button" is depicted as being oblong or circular in shape. Shapes and measurements are optional. Said "speaker/transmitter pyramid is depicted as being then shape of a pyramid. Said shapes and measurements are optional. Reference number 79 shows said cellular telephone "full length rear camera protracting at a inclined" angle. Said rear camera(s) and their component said reference number 75 "full length rear camera component" consist essentially of a close box containing a sensitized plate or film on which an image is formed when light enters the box through a lens or hole. The protracting inclined angle of said rear camera(s) can be carried out by logging into said cellular telephone programming and setting features and selecting said rear camera features. The cellular telephone user will then have the option to protract said rear camera(s) by slowly tilting said cellular telephone reference number 69 "joystick protracted" feature to the left. As an alternative said rear camera(s) and their component said reference number 75 "full length rear camera component" can also be protracted via reference number 83 "protraction button" which is found at reference number 82 "cellular telephone touch screen remote control" feature.

Said operations and functions will provide the user with a variety of innovative options to protract or retract and or rotate and maneuver said rear camera(s) in a full and complete 360 degree angle rotation while taking photographs—video recording—selfies or face timing. Further aiding the user in capturing ultra-wide angles and dimensional images. Said features will further allow the user to place their cellular telephone up right on any flat surface at any desirable angle and participate in group photographs—video recordings—selfies or face timing by using reference number 92 "touch screen remote control monitor" which retains all images and programming and setting features captured or depicted on the users cellular telephone monitor screen/monitor camera. The user will have the option to also retract said rear camera(s) via reference number 87 "retraction button" and or rotate and maneuver said rear camera(s) in a full and complete 360 degree rotation via reference number 88 "360 degree rotation dial" or snap pictures via reference number 89 "snap picture button". Said reference number 92/87/88 and 89 are all found at said reference number 82 "cellular telephone touch screen remote control" feature. Said cellular telephone reference number 82 "cellular telephone touch screen remote control" feature will allow the user to maintain complete access and control over their cellular telephone from a distance. Said reference number 79 "full length rear camera protracting at a inclined angle. Said reference number 79 "full length rear camera inclined angle. Can be manufactured with various plasticized materials or various thermo plastic materials or plasma materials. Said reference number 79 "full length rear camera inclined" is depicted as being oblong or circular in shape. Shapes and measurements are optional.

Another embodiment of said cellular telephone is illustrated in FIG. 45. Shows opposite side of said cellular telephone lying flat Right side view, with Reference number 80 "full length rear camera protracting in a horizontal angle" along with its component said reference number 75 "full length rear camera component" said cellular telephone reference numbers 72/75—reference numbers 73/75 reference numbers 96/75 reference numbers 97/75 are all facing up right protracting in a horizontal angle as depicted within said FIG. 45 reference numbers 80/75.

Reference number 68 shows said cellular telephone "Joystick button" feature which is designed to protract reference number 69 said cellular telephone "joystick" feature from within the inner body of said cellular telephone when initially pressed down. Said cellular telephone "joystick"

feature is a manual device connected to said cellular telephone terminal serving as a control lever that can be tilted and maneuvered in various directions to operate rotate and maneuver said cellular telephone "full length rear camera(s) in a full and complete 360 degree rotating angle. Said reference number 69, "Joystick" feature slowly retracts back inside of the inner body of said telephone when pressed down for 2 seconds reverting to said reference number 68 "joystick button". Said cellular telephone reference number 68 "joystick button" can be manufactured with various plasticized materials or various rubber materials. Shapes and measurements are optional.

Reference number 66 "speaker/transmitter button" slowly protracts upward slowly emerging from within the inner body of said cellular telephone creating reference number 67 "speaker/transmitter pyramid" which is a four-level speaker pyramid in which is designed to provide the user with a shaper and crisp clear and louder sound when communicating via said cellular telephone or while communicating via speaker telephone or while listening to music via cellular telephone. Said reference number 67 "speaker/transmitter pyramid" slowly retracts when pressed down and can also be protracted or retracted via reference number 90 "speaker pyramid button" in which is found at reference number 82 "cellular telephone touch screen remote control" feature. Said "speaker/transmitter button" as well as said "speaker/transmitter pyramid" can be manufactured with various plasticized materials and various metalized materials encompassing a minute magnet at its base connected to an electronic circuit board with plasticized materials covering said wiring and can include cardboard materials in which can be used to manufacture the inner circumference of the speaker walls or any other materials that is consistent with said covering or manufactured of said speaker shapes and measurements are optional.

Reference number 80 shows said cellular telephone "full length rear camera slowly protracting at a horizontal" angle and its component said reference number 75 "full length rear camera component" also slowly protracting in said horizontal angle. Said rear camera(s) consist of a close box containing a sensitized plate or film on which an image is formed when light enters the box through a lens or hole as seen in said reference number 75 "full length rear camera component". The protracting horizontal angle of said rear camera(s) can be carried out by logging into said cellular telephone programming and setting features and selecting said rear camera programming features. The cellular telephone user will then be able to slowly protract said reference numbers in said horizontal angle by slowly tilting said cellular telephone reference number 69 "joystick protracted" feature backwards. As an alternative said protracting horizontal position of said rear camera(s) can be carried out by reference number 88 "360 degree rotation dial" in which is found at reference number 82 "cellular telephone touch screen remote control" feature. Said cellular telephone operations and functions will provide the user with a vast selection of innovative options to protract or retract and or rotate and maneuver said cellular telephone rear camera(s) in a full and complete 360 degree rotation while taking selfies—group photographs—video recordings- or while face timing further assisting the user in capturing a ultra-wide angle and dimensional images.

Said technology will also allow said cellular telephone user to place said cellular telephone in an upright position on any flat surface at any desirable angle and take part in group photographs—video recordings—face timing and dimensional selfies by using reference number 92 "touch screen remote control monitor" which retains all images and positions captured by said cellular telephone. The user will also be able to protract said cellular telephone rear camera via reference number 83 "protraction button" or retract said cellular telephone rear camera features via reference number 87 "retraction button" and or rotate and maneuver said cellular telephone rear camera features via reference number 88 "360 degree rotation dial" and also snap pictures via reference number 89 "snap picture button" said reference numbers 92/83/87/88 and 89 are all located at reference number 82 "cellular telephone touch screen remote control".

Said cellular telephone features and functions will eliminate the need for second party assistance when taking photographs—video recordings and mirror images and will allow the user to physically see all images via said reference number 92 "touch screen remote control monitor" before snapping desirable image or video recording footage and will create additional face timing options and dimensional angles. Said reference number 82 "cellular telephone touch screen remote control" will also allow the user to maintain full and complete access and control of their cellular telephone within its entirety. Said reference number 80 "full length rear camera protracting horizontal" can be manufactured with various plasticized materials or various thermo plastic or plasma materials or any other material(s) that is consistent with manufacturing said rear camera. Said reference number 80 is optional in shape oblong or circular. Said reference number 72 "full length rear camera design" is oblong in shape measurements are optional.

Reference number 72 component said reference number 75 "full length rear camera component" is circler in shape measurements are optional. Reference number 96 "secondary tech full length rear camera design" is circular in shape measurements are optional. Said reference number 96 and reference number 75 "full length rear camera component" are circular in shape measurements are optional. Another embodiment of said cellular telephone is illustrated in FIG. 46). Shows opposite side of said cellular telephone lying flat right side view with reference number 81 "full length rear camera protracting at reverse horizontal angle. And reference number 72 "full length rear camera design" and reference number 96 "secondary tech full length rear camera design" and reference number 97 "secondary tech full length rear camera protracting" and reference number 73 "full length rear camera functions" and there component said reference number 75 "full length rear camera component)" are all facing up protracting in a reverse horizontal angle as depicted in said FIG. 46.

Reference number 68 shows said cellular telephone "joystick button" which is designed to protract reference number 69 "joystick protracted" feature from within the inner body of said cellular telephone when initially pressed down by the user. Said "joystick protracted feature is a manual device connected to said cellular telephone terminal serving as a control lever that can be tilted in various directions to operate rotate and maneuver said rear camera(s) in a full and complete 360 degree rotation. Said reference number 69 "joystick protracted" feature slowly retracts back inside of the inner body of said cellular telephone when held down by the user for 2 seconds reverting to said reference number 68 "joystick button". Said reference number 68 "joystick button" can be manufactured with various plasticized materials or various rubber materials. Said "joystick button" is depicted as being oblong or circler in shape. Shapes and measurements are optional. Reference number 69 joystick protracted" feature is depicted as being oval on the top with a slender body. Shapes and measurements are optional.

Reference number 66 "speaker/transmitter button" slowly protracts emerging from within the. inner body of said cellular telephone creating reference number 67 "speaker/transmitter pyramid" which is a four level speaker pyramid designed to provide the user with a sharp—crisp and louder sound when communicating via cellular telephone speaker phone or while listening to music via said cellular telephone. Reference number 67 "speaker/transmitter pyramid" slowly retracts back inside of the inner body of said cellular telephone when pressed down by the user a second time. Said reference number 66 "speaker/transmitter button can also be protracted via. reference number 90 "speaker pyramid button" when initially pressed down by the user. Reference number 67 "speaker/transmitter pyramid" can also be retracted via said reference number 90 "speaker pyramid button" when pressed down by the user a second time.

Reference number 66 "speaker/transmitter button" and reference number 67 "speaker/transmitter pyramid" can be manufactured with various plasticized materials and various metalized materials encompassing a minute magnet its base connected to an electronic wiring board with plasticized materials covering said wiring and can include cardboard materials which can be used to manufacture the circumference of the speaker walls. Said 'speaker/transmitter button is depicted as being oblong or circular in shape. Shapes and measurements are optional. Said "speaker/transmitter pyramid" is depicted as being the shape of a pyramid. Shapes and measurements are optional. Reference number 81 shows said cellular telephone "full length rear camera protracting at a reverse horizontal" angle. Said rear camera(s) and their component said reference number 75 "full length rear camera component" consist essentially of a close box containing a sensitized plate or film on which an image is formed when light enters the box through a lens or hole. The protracting reverse horizontal" angle of said rear camera(s) can be carried out by logging into said cellular telephone programming and setting features and selecting said rear camera features. The cellular telephone user will then have the optional to protract said rear camera(s) by slowly tilting said cellular telephone reference number 69 "joystick protracted" features forward. As an alternative said rear camera(s) and their component said reference number 75 "full length rear camera component" can also be protracted via reference number 83 "protraction button" which is found at reference number 82 "cellular telephone touch screen remote control" feature.

Said reference number 81 "full length rear camera protracting at a reverse horizontal" angle can be manufactured with various plasticized materials or various thermo plastic materials or various plasma materials. Said reference number 81 is depicted as being oblong or circular in shape. Shapes and measurements are optional. Another embodiment of said cellular telephone is illustrated in FIG. 47. Shows opposite side of said cellular telephone lying flat right-side view with reference number 76 "full length rear camera retracted". And reference number 72 "full length rear camera design" and reference number 96 "secondary tech full length rear camera design" and reference number 97 "secondary tech full length rear camera protracting" and reference number 73 "full length rear camera functions" and their component said reference number 75 "full length rear camera component" are all facing up in said retracted position as depicted in said FIG. 47. Reference number 68 shows said cellular telephone "joystick button" which is designed to protract reference number 69 "joystick protracted" feature from within the inner body of said cellular telephone when initially pressed down by the user. Said "joystick (protracted)" feature is a manual device connected to said cellular telephone terminal serving as a control lever that can be tilted in various directions to operate rotate and maneuver said rear camera(s) in a full and complete 360 degree rotation. Said reference number 69 "joystick protracted" feature slowly retracts back inside of the inner body of said cellular telephone when held down by the user for 2 seconds reverting to said reference number 68 "joystick button". Said reference number 68 "joystick button" can be manufactured with various plasticized materials or various rubber materials. Said "joystick button" is depicted as being oblong or circular in shape. Shapes and measurements are optional. Said reference number 69 "joystick protracted" feature can be manufactured with various plasticized materials or various rubber materials. Said "joystick protracted" feature is depicted as being the shape of a pyramid. Shapes and measurements are optional. Reference number 66 "speaker/transmitter button" slowly protracts emerging from within the inner body of said cellular telephone creating reference number 67 "speaker/transmitter pyramid" which is a four level speaker pyramid which is designed to provide the user with a sharp—crisp—clear and louder sound when communicating via said cellular telephone speaker phone or while listening to music via said cellular telephone. Said reference number 67 "speaker/transmitter pyramid" slowly retracts inside of the inner body of said cellular telephone when pressed down by the user. Said reference number 66 "speaker/transmitter button" can also be protracted via reference number 90 "speaker pyramid button" when initially pressed down by the user. Reference number 67 "speaker/transmitter pyramid" can also be retracted via said reference number 90 "speaker pyramid button" when pressed down by the user a second time. Said reference number 90 "speaker pyramid button" is found at reference number 82 "cellular telephone touch screen remote control" feature. Reference number 66 "speaker/transmitter button" and reference number 67 "speaker/transmitter pyramid" can be manufactured with various plasticized materials and various metalized materials encompassing a minute magnet at its base connected to an electronic wiring board with plasticized materials covering said wiring and can include cardboard materials that can be used to manufacture the inner circumference of the speakers inner walls. Said "speaker/transmitter button" is depicted as being oblong or circular in shape. Shapes and measurements are optional. Said "speaker/transmitter pyramid" is depicted as being the shape of a pyramid. Shapes and measurements are optional.

Reference number 76 shows said cellular telephone "full length rear camera retracted" Said rear camera(s) and their component said reference number 75 "full length rear camera component" consist essentially of a close box containing a sensitized plate or film on which an image is formed when light enters the box through a lens or hole. The retracted position of said rear camera(s) and their component said reference number 75 "full length rear camera component" can be carried out by logging into said cellular telephone programming and setting features and selecting said rear camera feature's. The user will then have the option to retract said rear camera(s) by slowly twisting said reference number 69 "joystick protracted" feature to the left. As an alternative said retractions of Said rear camera(s) can be carried out by reference number 87 "retraction button" which is found at reference number 82 "cellular telephone touch screen remote control" feature. Said cellular telephone rear camera(s) can also rotate and maneuver in a full and complete 360 degree rotation via reference number 69 "joystick protracted" feature and as an alternative via reference number 88 "360 degree rotation dial" providing the user with a vast variety of innovative options assisting the user with capturing ultra-wide angles and dimensional images were taking photographs—video recording—selfies and face timing. Said reference number 76 "full length rear camera retracted" can be manufacture with various plasticized materials and various thermo plastic material: or plasma materials. Said reference number 76 "full length rear camera retracted" is depicted as being oblong or circular in shape. Shapes measurements are optional.

Another embodiment of said cellular telephone is illustrated in FIG. 48. Shows opposite side of said cellular telephone lying flat right-side view with reference number 77 "full length rear camera protracting". And reference number 72 "full length rear camera design" and reference number 96 "secondary tech full length rear camera design" and reference number 97 secondary tech full length rear camera protracting" reference number 73 "full length rear camera functions" and their component said reference number 75 "full length rear camera component" are all facing up in said protracting position as depicted in said FIG. 48. Reference number 68 shows said cellular telephone "joystick button" which is designed to protract reference number 69 "joystick protracted" from within the inner body of said cellular telephone when initially pressed down by the user. Said "joystick protracted" feature is a manual device connected to said cellular telephone terminal serving as a control lever that can be tilted in various directions to operate maneuver said rear camera(s) in a full and complete 360 degree rotation. Said reference number 69 "joystick protracted" feature slowly retracts back inside of the inner body of said cellular telephone when held down by the user for 2 seconds reverting to said reference number 68 "joystick button". Said reference number 68 "joystick button" can be manufactured with various plasticized materials or various rubber materials. Said "joystick button" is depicted as being oblong or circular in shape. Shapes and measurements are optional. Said reference number 69 "joystick protracted" is depicted as being circular on the top with a slender body. Shapes and measurements are optional. Reference number 66 "speaker/transmitter button" slowly protracts emerging from within the inner body of said cellular telephone creating reference number 67 "speaker/transmitter pyramid" which is a four level speaker pyramid which is designed to provide the user with a sharp—crisp—clear and louder sound when communicating via said cellular telephone speaker phone or while listening to music via said cellular telephone. Said reference number 67 "speaker/transmitter pyramid" slowly retracts back inside of the inner body of said cellular telephone when pressed down by the user. Said reference number 66 "speaker/transmitter button" can also be protracted via reference number 90 "speaker pyramid button" when initially pressed down by the user. Reference number 67 "speaker/transmitter pyramid" can also be retracted via said reference number 90 "speaker pyramid button" when pressed down a second time by the user. Said reference number 90 "speaker pyramid button" is located at reference number 82 "cellular telephone touch screen remote control" feature.

Reference number 66 "speaker/transmitter button" and reference number 67 "speaker/transmitter pyramid" can be manufactured with various plasticized materials and various metaled materials encompassing a minute magnet at its base connected to an electronic circuit board with plasticized materials covering said wiring and can include cardboard materials that can be used to manufacture the circumference of the inner speaker walls. Said "speaker/transmitter button" is depicted as being oblong or circular in shape. Shapes and measurements are optional. Said "speaker/transmitter pyramid" is depicted as being the shape of a pyramid. Shapes and measurements are optional. Reference number 77 shows said cellular telephone "full length rear camera protracting". Said rear camera(s) and their component said reference number 75 "full length rear camera component" consist essentially of a close box containing a sensitize plate or film on which an image is formed when light enters the box through a lens or hole. The protraction of said rear camera(s) and their component said reference number 75 "full length rear camera component" can be carried out by logging into said cellular telephone programming and setting features and selecting said rear camera feature. The user will then have the option to protract said rear camera(s) by slowly twisting said reference number 69 "joystick protracted" feature to the right. As an alternative said rear camera(s) can be protracted via reference number 83 "protraction button" which is found at reference number 82 on "cellular telephone touch screen remote control" feature. Said cellular telephone rear camera(s) can also rotate and maneuver in a full and complete 360 degree rotation via moving said reference number 69 "joystick protracted" feature in a circular motion or as an alternative vie said reference number 88 "360 degree rotation dial" which is located at said reference number 82 "cellular telephone touch screen remote control'feature. Said operations and functions will aid the user in capturing ultra-wide angles and dimensional images when taking photographs—video recording—selfies or face timing. Said reference number 77 "full length rear camera protracting" can be manufactured with various plasticized materials or various thermo plastic materials or various plasma materials. Said "full length rear camera protracted" is depicted as being oblong or circular in shape. Shapes and measurements are optional. Another embodiment of said cellular telephone is illustrated in FIG. 49. Shows opposite side of said cellular telephone lying flat right-side view with reference number 78 "full length rear camera protracting at a declined" angle. And reference number 72 "full length rear camera design" reference number 96 "secondary tech full length rear camera design" and reference number 97 "secondary tech full length rear camera protracting" and reference number 73 "full length rear camera functions" and there component said reference number 75 "full length rear camera component" are all facing up in said declined position as depicted in said FIG. 49. Reference number 68 shows said cellular telephone "joystick button" which is designed to protract reference number 69 "joystick protracted" feature from within the inner body of said cellular telephone when initially pressed down by the user. Said "joystick protracted" feature is a manual device connected to said cellular telephone terminal serving as a control lever that can be tilted in various directions to operate and maneuver said rear camera(s) in a full and complete 360 degree rotation.

Said reference number 69 "joystick protracted" feature slowly retracts back inside of the inner body of said cellular telephone when held down by the user for 2 seconds reverting to said reference number 68 "joystick button". Said reference number 68 "joystick button" can be manufactured with various plasticized materials or various rubber materials. Said "joystick button" is depicted as being oblong or circular in shape. Shapes and measurements are optional. Said "joystick protracted" feature is depicted as being oval on top with a slender body. Shapes and measurements are optional. Reference number 66 "speaker/transmitter button" slowly emerges from within the inner body of said cellular telephone creating reference number 66 "speaker/transmitter pyramid" which is a four level speaker pyramid which is designed to provide the user with a sharp—crisp—clear and louder sound when communicating via said cellular telephone speaker phone or while listening to music via said cellular telephone. Said reference number 67 "speaker/transmitter pyramid" slowly retracts back inside of the inner body of said cellular telephone when pressed down by the user. Reference number 66 speaker/transmitter button" can be protracted vii reference number 90 "speaker pyramid button" when initially pressed down by the user. Said reference number 67 "speaker/transmitter pyramid" car also be retracted via said reference number 90 "speaker pyramid button" when pressed down a second time by the user. Said reference number 90 "speaker pyramid button" is found at said reference number 82 "cellular telephone touch screen remote control" feature. Reference number 66 "speaker/transmitter button" and reference number 67 "speaker/transmitter pyramid" can be manufactured with various plasticized materials and various metaled materials encompassing a minute magnet at its base connected to an electronic circuit board with plasticized material covering said wiring and can include cardboard materials that can be used to manufacture the circumference of the inner speaker walls.

Said "speaker/transmitter button" is depicted as being oblong or circular in shape. Shapes and measurements are optional. Said "speaker/transmitter pyramid" is depicted as being the shape of a pyramid. Shapes and measurements are optional. Reference number 78 "full length rear camera protracting at a declined" angle. Said rear camera(s) and there, component said reference number 75 "full length rear camera component' consist essentially of a closed box containing a sensitized plate or film on which an image is formed when light enters the box through a lens or hole. said protracting declined position of said rear camera(s) and their component said reference number 75 "full length rear camera component" can be accomplished by logging into said cellular telephone programming and setting features. The user will then have the option to protract said rear camera(s) by slowly twisting said reference number 69 "joystick protracted" feature to the right. As an alternative said protracting declined" position can be carried out via reference number 83 "protraction button" which is found at reference number 82 "cellular telephone touch screen remote control" feature. Said cellular telephone rear camera(s) can also rotate and maneuver in said 360 degree rotation via moving said reference number 69 "joystick" in a circular motion or via reference number 88 "360 degree rotation dial" which is also found at said reference number 82 "cellular telephone touch screen remote control" feature. Said operations and functions will aid the user in capturing ultra-wide angles and dimensional images when taking photographs—video recording—selfies or face timing. Said reference number 79 "full length rear camera protracting at a declined" angle can be manufactured with various plasticized materials or various thermo plastic materials or various plasma materials. Said "full length rear camera protracting at a declined" angle is depicted as being oblong or circular in shape. Shapes and measurements are optional.

Another embodiment of said cellular telephone is illustrated in FIG. 50. Shows opposite side of said cellular telephone lying flat right side view with reference number 79 "full length rear camera protracting at an inclined" angle. And reference number 72 "full length rear camera design" and reference number 96 "secondary tech full length rear camera design" and reference number 97 "secondary tech full length rear camera protracting" and reference number 73 "full length rear camera functions" and their component said reference number 75 "full length rear camera component" are all facing up in said inclined position as depicted in said FIG. 50. Reference number 68 shows said cellular telephone "joystick button" which is designed to protract reference number 69 "joystick protracted" feature from within the inner body of said cellular telephone when initially pressed down by the user. Said "joystick protracted" feature is a manual device connected to said cellular telephone terminal serving as a control lever that can be tilted in various directions to operate and maneuver said rear camera(s) in a full and complete 360 degree rotation.

Said reference number 69 "joystick protracted" feature slowly retracts back inside of the inner body of said cellular telephone when held down by the user for 2 seconds reverting to said reference number 68 "joystick button". Said reference number 68 "joystick button" can be manufactured with various plasticized materials or various rubber materials. Said "joystick button" is depicted as being oblong or circular in shape. Shapes and measurements are optional. Said reference number 69 "joystick protracted" is depicted as being oval on top with a slender body. Shapes and measurements are optional. Reference number 66 "speaker/transmitter button" slowly emerges from within the inner body of said cellular telephone creating reference number 67 "speaker/transmitter pyramid protracted" which is a four level speaker pyramid which is designed to provide the user with a sharp—crisp—clear and louder sound when communicating via said cellular telephone speaker phone or while listening to music via said cellular telephone. Said reference number 67 "speaker/transmitter pyramid protracted" slowly retracts back inside of the inner body of said cellular telephone when pressed down by the user. Reference number 66 "speaker/transmitter button" can be protracted via reference number 90 "speaker pyramid button" when initially pressed down by the user. Said reference number 67 "speaker/transmitter pyramid protracted" can also be retracted via said reference number 90 "speaker pyramid button" when pressed down a second time by the user. Said reference number 90 "speaker pyramid button" is found at said reference number 82 "cellular telephone touch screen remote control" feature. Reference number 66 "speaker/transmitter button" and reference number 67 "speaker/transmitter pyramid protracted" can be manufactured with various plasticized materials and various metaled materials encompassing a minute magnet at its base connected to an electronic circuit board with plasticized materials covering said wiring and can also include cardboard materials that can be used to manufacture the circumference of the inner speaker walls.

Said "speaker/transmitter button" is depicted as being oblong or circular in shape. Shapes and measurements are optional. Said "speaker/transmitter pyramid protracted" is depicted as being the shape of a pyramid. Said shapes and measurements are optional. Reference number 79 "full length rear camera protracting at an inclined" angle. Said rear camera(s) and their component said reference number 75 "full length rear camera component" consist essentially of a closed box containing a sensitized plate or film on which an image is formed when light enters the box through a lens or hole. Said protracting inclined angle of said cellular telephone rear camera(s) and there component said reference number 75 "full length rear camera component" can be accomplished by logging into said cellular telephone programming and setting features the user will then have the option to protract said rear camera(s) by slowly twisting said reference number 69 "joy stick protracted" to the right. As an alternative said protracting inclined position can be accomplished via reference number 83 "protraction button" which is located at reference number 82 "cellular telephone touch screen remote control" feature. Said rear camera(s) can also rotate and maneuver in a full and complete 360 degree rotation via moving said "joystick protracted" feature in a circular motion or via reference number 88 "360 degree rotation dial" which is also found at reference number 82 "cellular telephone touch screen remote control" feature. Said operations and functions will help the user in capturing ultra-wide angles and dimensional images when taking photographs—video recording—selfies or face timing. Said Reference number 79 "full length rear camera protracting at an inclined" angle can be manufactured with various plasticized materials or various thermo plastic materials or various plasma materials. Said "full length rear camera protracting at an inclined" angle is depicted as being oblong or circular in shape. Shapes and measurements are optional.

Another embodiment of said cellular telephone is illustrated in FIG. 51. Shows opposite side of said cellular telephone lying flat right side view with reference number 80 "full length rear camera protracting at a horizontal" angle. And reference number 72 "full length rear camera design" and reference number 96 "secondary tech full length rear camera design" and reference number 97 "secondary tech full length rear camera protracting" and reference number 73 "full length rear camera functions" and their component said reference number 75 "full length rear camera component" are all facing up in said horizontal position as depicted in said FIG. 51. Reference number 68 shows said cellular telephone "joystick button" which is designed to protract reference number 69 "joystick protracted" feature from within the inner body of said cellular telephone when initially pressed down by the user. Said "joystick protracted" feature is manual device connected to said cellular telephone terminal serving as a control lever that can be tilted in various directions to operate and maneuver said rear camera(s) in a full and complete 360 degree rotation. Said reference number 69 "joystick protracted" feature slowly retracts back inside of the inner body of said cellular telephone when held down by the user for 2 seconds reverting to said reference number 68 "joystick button". Said reference number 68 "joystick button" can be manufactured with various plasticized materials or various rubber materials. Said "joystick button" is depicted as being oblong or circler in shape. Shapes and measurements are optional. Said reference number 69 "joystick protracted" feature is depicted as being oval on top with a slender body. Shapes and measurements are optional. Reference number 66 "speaker/transmitter button" slowly protracts from within the inner body of said cellular telephone creating reference number 67 "speaker/transmitter pyramid" which is a four level speaker pyramid designed to the user with a sharp—crisp—clear and louder sound when communicating via said cellular telephone speaker phone or when listening to music via said cellular telephone.

Said reference number 67 "speaker/transmitter pyramid" slowly retracts back inside of the inner body of said cellular telephone when pressed down by the user. Said reference number 66 "speaker/transmitter button" can also be protracted via reference number 90 "speaker pyramid button" when initially pressed down by the user. Reference number 67 "speaker/transmitter pyramid" can also be retracted via said reference number 90 "speaker pyramid button" when pressed down a second time by the user. Reference number 66 "speaker/transmitter button" and reference number 67 "speaker/transmitter pyramid" can be manufactured with various plasticized materials and various metaled materials encompassing a minute magnet at its base connected to an electronic circuit board with plasticized materials covering said wiring and can include cardboard materials that can be used to manufacture the inner circumference of the speaker walls. Said speaker/transmitter button" is depicted as being oblong or circular in shape. Shapes and measurements are optional. Said "speaker/transmitter pyramid" is depicted as being the shape of a pyramid. Shapes and measurements are optional. Reference number 80 "full length rear camera protracting at a horizontal angle. Said rear camera(s) and their component said reference number 75 "full length rear camera component" consist essentially of a close box containing a sensitized plate or film on which an image is formed when light enters the box through a lens or hole.

The horizontal protraction of said rear camera(s) can be carried out by logging into said cellular telephone programming and setting features and selecting said rear camera feature. The user will then have the option to protract said rear camera(s) by slowly twisting said reference number 69 "joystick protracted" feature to the right. As an alternative said rear camera(s) can be protracted via reference number 83 "protraction button" which is found at reference number 82 "cellular telephone touch screen remote control" feature. Said cellular telephone rear camera(s) can also rotate and maneuver in a full and complete 360 degree rotation by moving said reference number 69 "joystick protracted" feature in a circular motion or as an alternative via said reference number 88 "360 degree rotation dial" which is also located at said reference number 82 "cellular telephone touch screen remote control" feature. Said operations and functions will help the user in capturing ultra-wide angles and dimensional images when taking photographs—video recording—selfies and face timing. Said reference number 80 "full length rear camera protracting at a horizontal angle can be manufactured with various plasticized materials or various thermo plastic materials or various plasma materials. Said "full length rear camera protracting at a horizontal" angle is depicted as being oblong or circular in shape. Shapes and measurements are optional.

Another embodiment of said cellular telephone is illustrated in FIG. 52. Shows opposite side of said cellular telephone lying flat right-side view with reference number 81 "full length rear camera protracting in a reverse horizontal" angle. And reference number 72 "full length rear camera design" and reference number 96 "secondary tech full length rear camera design" and reference number 97 "secondary tech full length rear camera protracting" and reference number 73 "full length rear camera functions" and their component said reference number 75 "full length rear camera component"are all facing up in said reverse horizontal" position as depicted in said FIG. 52. Reference number 68 shows said cellular telephone "joystick button" which is designed to protract reference number 69 "joystick protracted" feature from within the inner body of said cellular telephone when initially pressed down by the user. Said "joystick protracted" feature is a manual device connected to said cellular telephone terminal serving as a control lever that can be tilted in various directions to operate and maneuver said rear camera(s) in a full and complete 360 degree rotation. Said reference number 69 "joystick protracted" feature slowly retracts inside of the inner body of said cellular telephone when held down by the user for 2 seconds reverting to said reference number 68 "joystick button". Said reference number 68 "joystick button" is depicted as being oblong or circular in shape. Shapes and measurements are optional. Said reference number 68 "joystick button" can be manufactured with various plasticized materials or various rubber materials. Said "joystick protracted" feature is depicted as being oval on the top with a slender body. Shapes and measurements are optional. Reference number 66 "speaker/transmitter button" slowly emerges from within the inner body of said cellular telephone creating reference number 67 "speaker transmitter pyramid" which is a four level speaker pyramid designed to provide the user with a sharp—crisp—clear and louder sound when communicating via said cellular telephone speaker phone or while listening to music via said cellular telephone. Said reference number 67 "speaker/transmitter pyramid" slowly retracts inside of the inner body of said cellular telephone when pressed down by the user. Reference number 66 "speaker/transmitter button" can be protracted via reference number 90 "speaker pyramid button" when initially pressed down by the user. Said reference number 67 "speaker/transmitter pyramid" can also be retracted via said reference number 90 "speaker pyramid button" when pressed down a second time by the user. Said reference number 90 "speaker pyramid button" is found at reference number 82 "cellular telephone touch screen remote control" feature. Reference number 66 "speaker/transmitter button" and reference number 67 "speaker/transmitter pyramid" can be manufactured with various plasticized materials and various metalized materials encompassing a minute magnet at its base connected to an electronic circuit board with plasticized materials covering said wiring and can include cardboard materials that can be used to manufacture the circumference of the inner speaker walls. Said "speaker/transmitter button" is depicted as being oblong or circular in shape. Shapes and measurements are optional. Said "speaker/transmitter pyramid" is depicted as being the shape of a pyramid. Shapes and measurements are optional. Reference number 81 "full length rear camera protracting at a reverse horizontal" angle. Said rear camera(s) and their component said reference number 75 "full length rear camera component" consist essentially of a close box containing a sensitized plate or film on which an image is formed when light enters the box through a lens or hole. Said protracting reverse horizontal" position of said cellular telephone rear camera(s) and their component said reference number 75 "full length rear camera component" can be carried out by logging into said cellular telephone programming and setting features. The user will then have the option to protract said rear camera(s) by slowly twisting said reference number 69 "joystick protracted" feature to the right. As an alternative said protracting reverse horizontal" position can be carried out by reference number 83 "protraction button" which is found at reference number 82 "cellular telephone touch screen remote control" feature.

Said cellular telephone rear camera(s) can also rotate and maneuver in a full and complete 360 degree rotation via moving said reference number 69 "joystick protracted" in a circular motion or via said reference number 88 "360 degree rotation dial" which is also found at said reference number 82 "cellular telephone touch screen remote control" feature. Said operations and functions will help the user in capturing ultra-wide angles and dimensional images when taking photographs—video recording—selfies and face timing. Said reference number 81 "full length rear camera protracting at a reverse horizontal" angle can be manufactured with various plasticized or various thermo plastic materials or various plasma materials. Said reference number 81 "full length rear camera protracting at a reverse horizontal" angle is depicted as being oblong or circler in shape. Shapes and measurements are optional. Another embodiment of said cellular telephone is illustrated in FIG. 53. showing said cellular telephone lying flat bottom view shows reference number 98 "cellular telephone touch screen remote control compartment" which is a hidden compartment found at the bottom of said cellular telephone that slowly slides out from with the inner body of said cellular telephone when initially pressed down by the user. Said reference number 98 "cellular telephone touch screen remote control compartment" is designed to safely hold and secure said reference number 82 "cellular telephone touch screen remote control" feature. Said reference number 98 "cellular telephone touch screen remote control compartment can be manufactured with various plasticized materials or various rubber materials. Said reference number 98 "cellular telephone touch screen remote control compartment" is depicted as being oblong in shape. Shapes and measurements are optional.

Operations FIGS. 1-53 Continued

The manner in communicating via cellular telephone is identical to that of present use. FIGS. 1 through 53 will briefly explain the operations and functions of each figure set forth.

Another embodiment of said cellular telephone is illustrated in FIG. 1. Shows front view of said cellular telephone. Reference number 60 shows said "cellular telephone" which is an instrument or system used for conveying speech over distance by converting sound into electronic impulses sent through a computer-controlled communication system. Said cellular telephone is a handheld device in which also contains many applications and physical features. Reference number 61 shows said cellular telephone "monitor screen retracted" which is designed to depict images and program settings and communications. Said cellular telephone monitor screen can also rotate and maneuver in a full and complete 360 degree angle rotation while remaining within the inner body/frame of said cellular telephone in synchronization with reference number 70 cellular telephone "monitor camera". Reference number 62 shows said cellular telephone "speaker/receiver" which is designed to allow the user to hear emitted sounds and transmitted communications. Reference number 63 shows said cellular telephone up and down "volume buttons" which are designed to allow the user to control and adjust audio frequencies. Reference number 64 shows said cellular telephone "power button" which is designed to allow the user to turn said cellular telephone power on when initially pressed down by the user and to cut said cellular telephone power off when pressed down a second time by the user. Reference number 65 shows said cellular telephone "input" which is a terminal connector for receiving electronic power or signal in which powers said cellular telephone via cellular telephone battery charger when plugged into an electronic socket or conductor. Reference number 74 shows said cellular telephone "grips" which are designed to provide protection to the cellular telephone monitor screen and full-length rear camera(s).

Reference number 66 shows said cellular telephone "speaker/transmitter button" which is designed to protract reference number 67 "speaker/transmitter pyramid" when initially pressed down by the user. Said reference number 66 "speaker/transmitter button" serves as a "speaker" which allows the user to communicate and listen 'to music through a much larger and protractible speaker system. Reference number 67 shows said cellular telephone "speaker/transmitter pyramid" slowly protracting from within the inner body of said cellular telephone creating a four level speaker/ transmitter pyramid which is designed to provide the user with capturing a much sharper crisp and louder and clearer sound when communicating via cellular telephone speaker phone or while listening to music via said cellular telephone. Reference number 68 shows said cellular telephone "joystick button" which is designed to protract reference number 69 said cellular telephone "joystick" feature when initially pressed down by the user.

Said cellular telephone "joystick" feature slowly retracts back inside of the inner body of said cellular telephone when pressed down by the user for 2 seconds reverting to said reference number 68 "joystick button". Reference number 69 shows said cellular telephone "joystick" feature slowly protracting from within the inner body of said cellular telephone. Another embodiment of said cellular telephone is illustrated in FIG. 2. Front view shows said cellular telephone "joystick (protracted)" feature which is designed to slowly protract from with the inner body of said cellular telephone when said reference number 68 "joystick button" is initially pressed down by the user. Said cellular telephone "joystick" feature is a manual device connected to said cellular telephone terminal serving as a control lever that can be tilted in various directions to operate rotate and maneuver said reference number 61 "monitor screen" and reference number 70 "monitor screen camera" in synchronization and can also operate and maneuver said rear camera(s) in the same manner when programmed via said cellular telephone programming and setting features. "Joystick" twisted to the right slowly protracts said cellular telephone reference number 61 "monitor screen" and reference number 70 "monitor camera" in synchronization creating a zooming effect. Said rear camera(s) can also be programmed to operate and maneuver in the same manner when programmed via said cellular telephone programming and setting features. "Joystick" moved forward will slowly tilt said reference number 61 "monitor screen" and reference number 70 "monitor camera" in a downward angle in synchronization. "Joystick" moved backwards will slowly tilt said reference number 61 "monitor screen" and reference number 70 "monitor camera" in an upward angle in synchronization. "Joystick" moved to the right will slowly tilt said reference number 61 "monitor screen" and reference number 70 "monitor camera" to the right in synchronization. "Joystick" moved to the left will slowly tilt said reference number 61 "monitor screen" and reference number 70 "monitor camera" to the left in synchronization. "Joystick" moved in a circle motion will slowly tilt said. reference number 61 "monitor screen" and reference number 70 "monitor camera" in a full and complete 360 degree angle rotation including diagonally in synchronization. The user will also have the option to snap pictures by simply "tapping" said "joystick" feature down. The cellular telephone user will also have the option to set and position said reference number 61 "monitor screen" and reference number 70 "monitor camera" then log into said cellular telephone programming and setting features and set and position said rear camera(s) to capture additional exotic dimensional images when taking photographs—video recording—selfies and face timing.

"Joystick" twisted to the left will slowly "retract" said reference number 61 "monitor screen" and reference number 70 "monitor camera" in synchronization. Reference number 70 "monitor camera" consist essentially of a close box containing a sensitized plate or film on which a image is formed when light enters the box through a lens or hole. Reference number 71 "monitor camera" protracted" shows said cellular telephone "monitor camera" slowly protracting from within the inner body of said cellular telephone. Which is designed to protract retract and or rotate and maneuver in a full and complete 360 degree angle rotation including diagonally. Said operations and functions can also be carried out while protracting or while retracting via reference number 69 "joystick protracted" feature or as an alternative via said reference number 88 "360 degree rotation dial" which is located at said reference number 82 "cellular telephone touch screen remote control" feature. Another embodiment of said cellular telephone is illustrated in FIG. 3. Front view shows said cellular telephone reference number 61 "monitor screen" slowly protracting from within the inner body of said cellular telephone creating a zooming effect. Said "monitor screen" is also designed to retract or protract and or rotate and maneuver in a full and complete 360 degree angle rotation by maneuvering said reference number 69 "joystick protracted"

feature. As an alternative said reference number 83 "protraction button" or via reference number 87 "retraction button" or via reference number 88 "360 degree rotation dial". Said reference numbers 83/87 and 88 are all found at said reference number 82 "cellular telephone touch screen remote control" feature.

Another embodiment of said cellular telephone is illustrated in FIG. 4. Front view shows reference number 71 "monitor camera slowly protracting from within the inner body of said cellular telephone. Said reference number 71 "monitor camera protracted" feature is also designed to retract and or rotate and maneuver in a full and complete 360 degree angle rotation including diagonally in synchronization with said reference number 61 "monitor screen" via said reference number 69 "joystick protracted" feature or as an alternative via reference number 83 "protraction button" or via reference number 87 "retraction button" or via reference number 88 "360 degree rotation dial". Said cellular telephone reference numbers 83/87/and 89 are all located at said reference number 82 "cellular telephone touch screen remote control" feature. Another embodiment of said cellular telephone is illustrated in FIG. 5. Front view shows reference number 77 said cellular telephone "speaker/transmitter button" which. is designed to protract reference number 67 "speaker/transmitter pyramid" from within the inner body of said cellular telephone when initially pressed down by the user. Said reference number 66 "speaker/transmitter button" also serves as a "speaker" which allows the user to listen to music through a much larger and protractible sound system. Said "speaker/transmitter button" also serves as a transmitter which allows the user to convert speech/sound into electronic impulses for transmission. Said "speaker/transmitter button" can also be protracted or retracted via said reference number 90 "speaker pyramid button" which is found at said reference number 82 "cellular telephone touch screen remote control" feature. Said "speaker/transmitter pyramid" slowly retracts back inside of the inner body of said cellular telephone when pressed down by the user reverting to said reference number 66 "speaker/transmitter button".

Another embodiment of said cellular telephone is illustrated in FIG. 6. Back view reference number 72 shows a circler outline of said "full length rear camera design" which lies directly beneath the transparent full length rear camera lens in which is fully retracted. Said full length rear camera can also protract or retract and or rotate and maneuver in a full and complete 360 degree angle rotation via reference number 69 "joystick protracted" feature. As an alternative said reference number 72 "full length rear camera design" can be protracted via reference number 83 "protraction button" or retracted via reference number 87 "retraction button" and or rotate and maneuver in a full and complete 360 degree angle rotation via reference number 88 "360 degree rotation dial". Said reference numbers 83/87 and 88 found at said reference number 82 "cellular telephone touch screen remote control" feature.

Another embodiment of said cellular telephone is illustrated in FIG. 7. Back view shows reference number 73 "full length rear camera functions" with said reference number 72 "full length rear camera design" transparent screen/lens slowly protracting from within the inner body of said cellular telephone creating a zooming effect. Said rear camera can also rotate and maneuver in a full and complete 360 degree angle rotation while in the course of protracting or while in the course of retracting or while full protracted or while fully retracted via said reference number 69 "joystick protracted" feature or as an alternative via said reference number 83 "protraction button" or reference number 87 "retraction button" or reference number 88 "360 degree rotation dial". Said reference numbers 83/87 and 88 are all found at said reference number 82 "cellular telephone touch screen remote control" feature.

Another embodiment of said cellular telephone is illustrated in FIG. 8. Back view reference number 96 shows a separate "secondary tech full length rear camera design" fully retracted. Said reference number 96 "secondary tech full length rear camera design" can also protract or retract and or rotate and maneuver in a full and complete 360 degree rotation including diagonally via reference number 69 "joystick protracted" feature and can also rotate and maneuver in said 360 degree angle rotation while remaining within the frame/body of said cellular telephone. As an alternative said reference number 96 "secondary tech full length rear camera design" can be protracted via said reference number 83 "protraction button" or retracted via reference number 87 "retraction button" and or rotated and maneuvered in a full and complete 360 degree angle rotation via reference number 88 "360 degree rotation dial". Said reference numbers 83/87 and 88 are all found at said reference number 82 "cellular telephone touch screen remote control" feature. Another embodiment of said cellular telephone is illustrated in FIG. 9. Back view shows reference number 97 "secondary tech full length rear camera protracting" slowly protracting from within the inner body of said cellular telephone creating a zooming effect. Said reference number 97 "secondary tech full length rear camera protracting" can also protract or retract and or rotate and maneuver in a full and complete 360 degree angle rotation while protracting or protracted or while retracting or while fully retracted and or rotate and maneuver in said full and complete 360 degree angle rotation via reference number 69 "joystick protracted" feature. As an alternative said reference number 97 "secondary tech full length rear camera protracting" can be protracted via said reference number 83 "protraction button" or retracted via reference number 87 "retraction button" or rotated and maneuvered in said 360 degree angle rotation via said reference number 88 "360 degree rotation dial". Said reference numbers 83/87 and 88 are all located at said reference number 82 "cellular telephone touch screen remote control" feature. Another embodiment of said cellular telephone is illustrated in FIG. 10. Front view shows reference number 82 "cellular telephone touch screen remote control" feature which is a handheld electronic device used to control the operations and functions of said reference number 60 "cellular telephone" from a distance as by radio waves. Reference number 83 shows said touch screen remote control "protraction button" which is designed to slowly protract reference number 61 "monitor screen" and reference number 70 "monitor camera" in synchronization. And can also protract said rear camera(s) Reference number 72 "full length rear camera design" and reference number 96 "secondary tech full length rear camera design" and reference number 97 "secondary tech full length rear camera protracting" and reference number 73 "full length rear camera functions" and their component said reference number 75 "full length rear camera component" in the same manner when programmed via said cellular telephone programming and setting features. Reference number 84 shows said cellular telephone touch screen remote control "volume buttons" which are designed to allow the user to control and adjust said reference number 62 "speaker/receiver" as well as reference number 66 "speaker/transmitter button" and reference number 6 "speaker/transmitter pyramid protracted" audio frequencies. Reference number 85 shows said cellular telephone touch screen remote control "power button" which is designed to allow the user to turn said touch-screen remote control power on when initially pressed down and will cut said power off when pressed down a second time by the user.

Reference number 86 shows said touch screen remote control "input" which is a terminal connector for receiving power or signal in which powers said cellular telephone touch screen remote control via said cellular telephone battery charger when plugged into an electronic socket or conductor. Reference number 87 shows said touch screen remote control "retraction button" which is designed to slowly retract reference number 61 said cellular telephone "monitor screen protracted" and reference number 71 "monitor camera protracted" in synchronization.

And can also "retract" said rear camera(s) and their component said reference number 75 "full length rear camera component" in the same manner when programmed via said cellular telephone programming and setting features. Reference number 88 shows said touch screen remote control "360 degree rotation dial" which is designed to allow the user to rotate and maneuver said reference number 61 "monitor screen" and reference number 70 "monitor camera" in synchronization in a full and complete 360 degree angle rotation by pressing or tapping said "360 degree rotation dial" arrow in any desirable direction. Said rear camera(s) can also operate and function in the same manner when programmed via said cellular telephone programming and setting features. Reference number 89 shows said touch screen remote control "snap picture button" which is designed to allow the user to capture desirable images/photographs depicted through the user's cellular telephone monitor screen camera or full-length rear camera(s) by pressing said reference number 89 "snap picture button" in a downward motion.

Reference number 90 shows said touch screen remote control "speaker pyramid button" which is designed to allow the user to protract reference number 66 "speaker/transmitter button" and retract reference number 67 "speaker/transmitter pyramid protracted". When said touch screen remote control "speaker/transmitter button" is initially pressed down by the user said speaker/transmitter pyramid will slowly protract from within the inner body of said cellular telephone. When said reference number 67 "speaker/transmitter pyramid" is pressed down by the user it will slowly retract said "speaker/transmitter pyramid" back inside of the inner body of said cellular telephone. Reference number 91 shows said touch screen remote control "cellular telephone programming and setting button" which allows the user to access said cellular telephone programming and setting features including pictures/photographs—video recordings and face timing. When said reference number 91 "cellular telephone programming and setting button" is by pressed by the user said reference number 60 "cellular telephone" programming and setting features will appear on said reference number 92 "touch screen remote control monitor" the user will then be able to use said remote control touch screen to control said cellular telephone programming and setting features. The user will also have the option to log out of said cellular telephone programming and setting features by simply pressing said reference number 91 "cellular telephone programming and setting button" a second time.

Reference number 92 shows said touch screen remote control "touch screen remote control monitor" which is designed to retain all depicted images and programming and setting features said cellular telephone monitor screen. Said cellular telephone can also be programmed to retain all depicted images of said rear camera(s) and its component said reference number 75 "full length rear camera component". Reference number 93 shows back view of said cellular telephone touch screen remote control" in which stabilizes said cellular telephone touch screen remote control internal electronic components and physical structure. Another embodiment of said "cellular telephone touch screen remote control is illustrated in FIG. 11. Bottom view reference number 86 shows said touch screen remote control "input" opening. Which is designed to allow the user to charge said cellular telephone touch screen remote control via said cellular telephone battery charger. Reference number 94 shows said touch screen remote control "remote control clip" which is designed to allow the user to secure and stabilize said touch' screen remote control when attached to pockets or other sustainable structures. Another embodiment of said cellular telephone is illustrated in FIG. 12. Back view shows reference number 86 touch screen "remote control input" opening in which is designed to allow said user to charge said cellular telephone touch screen remote control via said cellular telephone battery charger. reference 93 shows the reverse side of said cellular telephone touch screen remote control. Reference number 94 shows said "remote control clip" in which is designed to allow the user to secure and stabilize said cellular telephone touch screen remote control when attached to pockets or other sustainable structures by the user.

Another embodiment of said cellular telephone touch screen remote control is illustrated in FIG. 13. Side view shows said, "remote control clip". Another embodiment of said cellular telephone is illustrated in FIG. 14. shows reference number 95 "remote control clip hinge" which is designed to supply a firm and secure grip when said cellular telephone touch screen remote control is attached to the user's pocket or any other sustainable structure. Another embodiment is illustrated in FIG. 15. Bottom view shows reference number 65 said cellular telephone "input" opening. Which is designed to allow the user to charge said cellular telephone via cellular telephone battery charger. Another embodiment is illustrated in FIG. 16. Right side view shows reference number 63 said cellular telephone up and down "volume buttons" which will allow the user to adjust and control said cellular telephone audio frequencies. Reference number 64 shows said cellular telephone "power button" which is designed to allow the user to turn said cellular telephone on when initially pressed down by the user and to cut said cellular telephone power off when pressed down by the user a second time. Reference number 76 shows said cellular telephone "monitor screen" slowly retracting. Another embodiment of said cellular telephone is illustrated in FIG. 17. Right side view shows said reference number 63 said cellular telephone up and down buttons". Reference number 64 shows said cellular telephone "power button". Reference number 77 shows said cellular telephone "monitor screen slowly protracting.

Another embodiment of said cellular telephone is illustrated in FIG. 18. Right side view shows said cellular telephone reference number 63 up and down "volume buttons". Reference number 64 shows said cellular telephone on and off "power button". Reference number 78 shows said cellular telephone "monitor screen" fully protracted at a declined angle. Another embodiment of said cellular telephone is illustrated in FIG. 19. Side view shows reference number 63 up and down "volume buttons". Reference number 64 shows said cellular telephone "power button". Reference number 79 shows said cellular telephone "monitor screen" slowly protracting at an inclined angle. Another embodiment of said cellular telephone is illustrated in FIG. 20. Right side view shows said cellular telephone reference number 63 up and down "volume buttons". Reference number 64 shows said cellular telephone "power button". Reference number 80 shows said cellular telephone "monitor screen" slowly protracting in an upward horizontal slanting angle. Another embodiment of said cellular telephone is illustrated in FIG. 21. shows said reference number 63 cellular telephone up and down "volume buttons". Reference number 64 shows said cellular telephone "power button". Reference number 81 shows said cellular telephone "monitor screen slowly protracting in an upward reverse horizontal angle with said monitor screen facing north. Another embodiment of said cellular telephone is illustrated in FIG. 22. Right side view shows reference number 67 "speaker/transmitter pyramid protracted" which designed to provide the user with a clear crisp and much louder sound when communicating via cellular telephone speaker phone or while listening to music via said cellular telephone. Reference number 69 shows said cellular telephone "joystick protracted" which is designed to allow the user to protract or retract and or rotate and maneuver said cellular telephone monitor screen and monitor camera in synchronization and can also be programmed to protract or retract and or rotate and maneuver said full length rear camera(s) in the same manner when programmed via said cellular telephone programming and setting features. Another embodiment of said cellular telephone is illustrated in FIG. 23. Right side view shows reference number 67 "speaker/transmitter pyramid protracted".

Reference number 69 shows said cellular telephone "joystick protracted". Reference number 77 shows said cellular telephone "monitor screen" slowly protracting in an upward angle. Another embodiment of said cellular telephone id illustrated in FIG. 24. Right side view shows said reference number 67 "speaker/transmitter pyramid protracted". Reference number 69 shows said cellular telephone "joystick protracted". Reference number 78 shows said cellular telephone "monitor screen" slowly protracting at an angle.

Another embodiment of said cellular telephone is illustrated in FIG. 25. Left side view shows said reference number 67 "speak/transmitter pyramid protracted". Reference number 69 shows said cellular telephone "joystick protracted". Reference number 79 shows said cellular telephone "monitor screen" slowly protracting at an inclined angle. Another embodiment of said cellular telephone is illustrated in FIG. 26. Left side view shows reference number 67 "speaker/transmitter pyramid protracted". Reference number 69 shows said cellular telephone "joystick protracted" Reference number 80 shows said cellular telephone "monitor screen" slowly protracting in an upward horizontal angle. Another embodiment of said cellular telephone is illustrated in FIG. 27 left side view shows reference number 67 "speaker/transmitter protracted". Reference number 69 shows said cellular telephone "joystick protracted" Reference number 81 shows said "monitor screen" slowly protracting in a reverse horizontal angle with said "monitor screen" facing north.

Another embodiment of said cellular telephone is illustrated in FIG. 28. Left side view shows said reference number 66 "speaker/transmitter button" which is designed to protract said reference number 67 "speaker/transmitter pyramid" from within the inner body of said cellular telephone. Reference number 68 shows said cellular telephone "joystick button" which is designed to protract said reference number 69 "joystick protracted" feature from within the inner body of said cellular telephone. Reference number 76 shows said cellular telephone "monitor screen" retracted. In accordance with another embodiment. Another embodiment of said cellular telephone is illustrated in FIG. 29. Left side view shows said Reference number 66 said cellular telephone "speaker/transmitter button" which is design to protract said reference number 67 "speaker/transmitter pyramid" from within the inner body of said cellular telephone. Reference number 68 shows said cellular telephone "joystick button" which is designed to protract said reference number 69 "joystick protracted from within the inner body of said cellular telephone. Reference number 77 shows said cellular telephone "monitor screen" slowly protracting. Another embodiment of said cellular telephone is illustrated in FIG. 30. Left side view shows said reference number 66 "speaker/transmitter button". Reference number 68 shows said cellular telephone "joystick" retracted reverting to said reference number 68 "joystick button". Reference number 78 shows said cellular telephone "monitor screen" slowly protracting at a declined angle.

Another embodiment of said cellular telephone is illustrated in FIG. 31. Left side view shows said reference number 66 "speaker/transmitter button". Reference number 68 shows said cellular telephone "joystick button". Reference number 79 shows said cellular telephone "monitor screen" slowly protracting at an inclined angle. Another embodiment of said cellular telephone is illustrated in FIG. 32. Left side view shows said reference number 66 "speaker/transmitter button". Reference number 68 shows said cellular telephone "joystick button". Reference number 80 shows said cellular telephone "monitor screen" slowly protracting in a horizontal angle. Another embodiment of said cellular telephone is illustrated in FIG. 33. Left side view shows said reference number 66 "speaker/transmitter button". Reference number 68 shows said cellular telephone "joystick button". Reference number 81 shows said cellular telephone slowly protracting in a reverse horizontal angle with said monitor screen facing north. Another embodiment of said cellular telephone is illustrated in FIG. 34. Bottom view shows reference number 65 said cellular telephone "input" opening in which is designed to allow the user to charge said cellular telephone via cellular telephone battery charger. Another embodiment of said cellular telephone is illustrated in FIG. 35. Left side view with "full length rear camera design" facing face up. Reference number 64 shows said cellular telephone "power button". Reference number 63 shows said cellular telephone up and down "volume buttons". Reference number 76 shows said cellular telephone "full length rear camera design" retracted. Another embodiment of said cellular telephone is illustrated in FIG. 36. Left side view shows said full length rear camera design" face up. Reference number 64 shows said cellular telephone "power button". Reference number 63 shows said cellular telephone up and down "volume buttons". Reference number 77 shows said cellular telephone "full length rear camera design" slowly protracting from within the inner body of said cellular telephone.

Another embodiment of said cellular telephone is illustrated in FIG. 37. Left side view shows said "full length rear camera design" in a face up position. Reference number 64 shows said cellular telephone "power button". Reference number 63 shows said cellular telephone up and down "volume buttons". Reference number 78 shows said cellular telephone "full length rear camera design" slowly protracting at a declined angle. Another embodiment of said cellular telephone is illustrated in FIG. 38. Left side view shows said cellular telephone "full length rear camera design" facing face up. Reference number 64 shows said cellular telephone "power button". Reference number 64 shows said cellular telephone "power button". Reference number 63 shows said cellular telephone up and down "volume buttons". Reference number 79 shows said cellular telephone "full length rear camera design" slowly protracting at an inclined angle. Another embodiment of said cellular telephone is illustrated in FIG. 39. Left side view shows said cellular telephone "full length rear camera design" in a face up position.

Reference number 64 shows said cellular telephone "power button". Reference number 63 shows said cellular telephone up and down "power buttons". Reference number 80 shows said cellular telephone "full length rear camera design" slowly protracting in a horizontal angle.

Another embodiment of said cellular telephone is illustrated in FIG. 40. Left side view shows said cellular telephone "full length rear camera design in a face up position. Reference number 64 shows said cellular telephone "power button". Reference number 63 shows said cellular telephone up and down "volume buttons". Reference number 81 shows said cellular telephone "full length rear camera design" slowly protracting in a reverse horizontal angle with said "full length rear camera design" facing north. Another embodiment of said cellular telephone is illustrated in FIG. 41. Right side view shows said cellular telephone "full length rear camera design" face up. Reference number 68 shows said cellular telephone "joystick button". Reference number 66 shows said cellular telephone "speaker/transmitter button". Reference number 76 shows said cellular telephone "full length rear camera retracted. Another embodiment of said cellular telephone is illustrated in FIG. 42 right side view shows said cellular telephone "full length rear camera design" face up. Reference number 68 shows said cellular telephone "joystick button". Reference number 66 shows said cellular telephone "speaker/transmitter button". Reference number 77 shows said cellular telephone "full length rear camera design" slowly protracting. Another embodiment of said cellular telephone is illustrated in FIG. 43. Right side view shows said cellular telephone "full length rear camera design" face up. Reference number 68 shows said, "joystick button". Reference number 66 shows said cellular telephone "speaker/transmitter button". Reference number 78 shows said cellular telephone "full length rear camera design" slowly protracting at a declined angle. Another embodiment of said cellular telephone is illustrated in FIG. 44. Right side view shows said cellular telephone "full length rear camera design" in a face up position.

Reference number 68 shows said cellular telephone "joystick button". Reference number 66 shows said cellular telephone "speaker/transmitter button". Reference number 79 shows said cellular telephone "full length rear camera slowly protracting at an inclined angle. Another embodiment of said cellular telephone is illustrated in FIG. 45. Right side view shows said cellular telephone "full length rear camera design" in a face up position. Reference number 68 shows said cellular telephone "joystick button". Reference number 66 shows said cellular telephone "speaker/transmitter button". Reference number 80 shows said cellular telephone slowly protracting in a horizontal angle. Another embodiment of said cellular telephone is illustrated in FIG. 46. Right side view shows said cellular telephone "full length rear camera design" laying face up. Reference number 68 shows said cellular telephone "joystick button".

Reference number 66 shows said cellular telephone "speaker/transmitter button. Reference number 81 shows said cellular telephone "full length rear camera design" slowly protracting in a reverse horizontal angle with said "full length rear camera design" facing north. Another embodiment of said cellular telephone is illustrated in FIG. 47. Side view shows aid cellular telephone reference number 69 "joystick protracted". Reference number 67 shows said cellular telephone "speaker/transmitter pyramid protracted". Reference number 76 shows said cellular telephone "full length rear camera design" retracted.

Another embodiment of said cellular telephone is illustrated in FIG. 48. Right side view shows said cellular telephone "full length rear camera design" in a face up position. Reference number 69 shows said cellular telephone "joystick protracted" which is designed to allow the user to protract or retract and or operate and maneuver said cellular telephone "monitor screen and "monitor camera" in synchronization and can also protract or retract and or operate and maneuver said "rear camera(s) in the same manner when programmed via said cellular telephone programming and setting features. Reference number 67 shows said cellular telephone "speaker/transmitter pyramid protracted" which is designed to allow the user to receive a clear crisp and louder sound when communicating via said cellular telephone speaker phone or while listening to music via said cellular telephone. Reference number 77 shows said cellular telephone "full length rear camera design" slowly protracting. Another embodiment of said cellular telephone is illustrated in FIG. 49. Right side view shows aid cellular telephone "full length rear camera in a face up position. Reference number 69 shows said "joystick protracted". Reference number 67 shows said cellular telephone "speak/transmitter pyramid protracted". Reference number 78 shows said cellular telephone "full length rear camera design slowly protracting in a declined angle. Another embodiment of said cellular telephone is illustrated in FIG. 50. right side view shows said cellular telephone "full length rear camera design" in said face up position. Reference number 69 shows said cellular telephone "joystick protracted" which is designed to allow the user to protract or retract and or rotate and maneuver said monitor screen and monitor camera in synchronization said rear camera(s) can also operate a function in the same manner when programmed via said cellular telephone programming and setting features.

Reference number 67 shows said cellular telephone "speaker/transmitter pyramid protracted". Reference number 79 shows said cellular telephone "full length rear camera design" slowly protracting at a inclined angle. Another embodiment of said cellular telephone is illustrated in FIG. 51. Right side view shows said cellular telephone "full length rear camera design" in said face up position. Reference number 69 shows said cellular telephone "joystick protracted" feature. Reference number 67 shows said cellular telephone "speaker/transmitter pyramid protracted". Reference number 80 shows said cellular telephone "full length rear camera design" slowly protracting in a horizontal angle. Another embodiment of said cellular telephone is illustrated in FIG. 52. Right side view shows said, "full length rear camera design" face up. Reference number 69 shows said cellular telephone "joystick protracted" feature. Reference number 67 shows said cellular telephone "speaker/transmitter pyramid protracted". Said reference number 81 shows said "full length rear camera design" slowly protracting from within the inner body of said cellular telephone in a reverse horizontal slanting angle with said "full length rear camera design" facing north. Another embodiment of said cellular telephone is illustrated in FIG. 53. Bottom view of said cellular telephone which is designed to slowly slide outward from within the inner body of said cellular telephone when initially pressed down by the user and slowly retracts back inside of the inner body of said cellular telephone when pushed inward by the user. Said "cellular telephone touch screen remote control" can be manufactured without said reference number 94 "remote control clip".

Additional Embodiments FIGS. 1/6/7/8/and 9

FIG. 1. Front view of said cellular telephone shows reference number 61 "monitor screen" and said reference number 70 "monitor camera" retracted in said synchronization. Said cellular telephone reference number 61 "monitor screen and reference number 70 "monitor camera" in synchronization can also rotate and maneuver in a full and complete 360 degree angle rotation via reference number 69 "joystick protracted" feature or as an alternative via said reference number 88 "360 degree rotation dial". The user will have the option to activate said cellular telephone "motion sensor" feature via said cellular telephone programming and setting features. This will allow the user to physically protract or retract said reference numbers 61 cellular telephone "monitor screen" and reference number 70 "monitor camera" in synchronization while said "motion sensor" feature rotate and maneuver in a full and complete 360 degree angle rotation allowing the user to capture ultra-wide angles and dimensional image(s) while taking photographs—video recording—selfies and face timing. Said cellular telephone rear camera(s) can also operate and function in the same manner when programmed via said cellular telephone programming and setting features. Said "motion sensor" feature is designed to detect measure and record physical movements and respond as by transmitting information initiating changes or operation controls. FIG. 6. Back view of said cellular telephone reference number 72 "full length rear camera design" shows a circular outline of said "full length rear camera design" which covers the back of said cellular telephone within its capacity. Said "full length rear camera design" lens is depicted as being fully retracted and its component said reference number 75 "full length rear camera component" is also depicted as being retracted.

Said cellular telephone "motion sensor" is designed to detect measure and record physical motions and movements and respond by transmitting information initiating or changing operation controls. The user will have the option to activate said "motion sensor" feature via said cellular telephone programming and setting features and physically protract or retract said cellular telephone rear camera(s) while said "motion sensor" feature follows said motions and movements helping the user when taking photographs—video recording—selfies and face timing. FIG. 7. Back view of said cellular telephone shows reference number 73 "full length rear camera functions" slowly protracting from within the inner body of said cellular telephone creating a zooming effect. The user will have the option to physically protract or retract said rear camera(s) and its component reference number 75 "full length rear camera component" also in synchronization while said "motion sensor" feature rotate and maneuver in a full and complete 360 degree angle rotation allowing the user to capture ultra-wide angles and dimensional images when taking photo—video recording—selfies and face timing. Said "motion sensor is designed to detect measure and record physical motions and movements and respond as by transmitting information initiating changes or operation controls. FIG. 8. Back view shows reference number 96 "secondary tech full length rear camera design" and its component said reference number 75 "full length rear camera component" fully retracted. Said "motion sensor" is designed to detect measure and record physical motions and movements and respond by transmitting information initiating changes of operation controls. The user will have the option to activate said "motion sensor" feature via said cellular telephone programming and setting features to physically protract or retract said rear camera(s) while said "motion sensor" feature follows said motions and movements helping the user when taking photographs—video recording—selfies and face timing.

FIG. 9. Back view shows said reference number 97 "secondary tech full length rear camera protracting". Slowly protracting from within the inner body of said cellular telephone creating a zooming effect. Said "motion sensor" is designed to detect measure and record physical motions and movements and respond as by transmitting information initiating changes or operation controls. Said "motion sensor" feature will allow the users rear camera(s) to physically rotate and maneuver in a full and complete 360 degree angle rotations while retaining said captured image(s) on the users cellular telephone monitor screen and or said reference number 92 "touch screen remote control monitor screen" which is located at said reference number 82 "cellular telephone touch screen remote control" feature.

Advantages

As set forth a number of advantages of said cellular telephone become clear here all embodiments of said cellular telephone are briefly described.

(a). FIG. 1. Shows reference number 61 "monitor screen" retracted.

ADVANTAGES: Said cellular telephone "monitor screen" retracted can rotate and maneuver in a full and complete 360 degree angle rotation while remaining within the frame/body of said cellular telephone while retracting or protracting or while fully protracted in synchronization with said cellular telephone reference number 70 "monitor camera" which will assist the user with capturing ultra-wide angles and dimensional image(s) when taking photographs—video recording—selfies—face timing or gaming.

(b). FIG. 5. Shows reference number 66 "speaker/transmitter button".

ADVANTAGES: Said cellular telephone "speaker/transmitter button" is an actual speaker/transmitter that allows the user to capture a sharp—crisp and louder sound when communicating via said cellular telephone speaker phone or while listening to music via said cellular telephone through a much larger protractible speaker system. Said reference number 66 "speaker/transmitter button" is designed to protract reference number 67 "speaker/transmitter pyramid protracted" from within the inner body: of said cellular telephone when initially pressed down by the user.

(c). FIG. 5. Shows another embodiment of said cellular telephone reference number 67 "speaker/transmitter pyramid protracted".

ADVANTAGES: Said cellular telephone "speaker/transmitter pyramid protracted" slowly protracts from within the inner body of said cellular telephone creating a 4 level speaker pyramid in which is designed to provide the user with a sharp—crisp and louder sound when communicating via cellular telephone speaker phone or while listening to music via said cellular telephone through a much larger and protractible speaker system.

(d). FIG. 2. Shows reference number 68 "joystick button" which is designed to slowly protract reference number 69 "joystick protracted" feature from within the inner body of said cellular telephone.

ADVANTAGES: Said "joystick button" will allow the user to conveniently gain access to said "joystick protracted" feature. Which is designed to protract or retract and or rotate and maneuver id cellular telephone monitor screen and monitor camera in synchronization in a full and complete 360 degree angle rotation. Said rear camera(s) can also operate and function in the same manner when programmed via said cellular telephone programming and setting features. Said features will aid the user in capturing ultra-wide angles and dimensional image(s) when taking photographs—video recording—selfies—face timing or gaming.

(e). FIG. 2. Shows another embodiment of said cellular telephone. Reference number 69 "joystick (protracted)" feature.

ADVANTAGES: Said cellular telephone "joystick protracted" feature will allow the user to protract or retract and or rotate and maneuver said reference number 61 "monitor screen" and reference number 70 "monitor camera" in synchronization in a full and complete 360 degree angle rotation assisting the user in capturing ultra-wide angles and dimensional image(s) when taking photographs—video recording—selfies—face timing or gaming. Said rear camera(s) can also operate and function in the same manner when programmed via said cellular telephone programming and setting features. Said "joystick protracted" feature slowly retracts back inside of the inner body of said cellular telephone when pressed down by the user for approximately 2 seconds reverting to said reference number 66 "joystick button" feature.

(f). FIG. 1. Shows reference number 70 "monitor camera".

ADVANTAGES: Said cellular telephone "monitor camera" is designed to protract or retract and or rotate and maneuver in a full and complete 360 degree angle rotation in synchronization with said reference number 61 "monitor screen" via said reference number 69 "joystick protracted" feature or as an alternative via said reference number 83 "protraction button" or via reference number 87 "retraction button" or via reference number 88 360 degree rotation dial". Said reference numbers 83/87 and 88 are all found at said reference number 82 "cellular telephone touch screen remote control" feature. Said features will help the user in capturing ultra-wide angles and dimensional image(s) when taking photographs—video recording—selfies—face timing and gaming. Said rear camera(s) can also operate and function in the same manner when programmed via said cellular telephone programming and setting features.

(g). FIG. 4. Shows reference number 71 "monitor camera protracted".

ADVANTAGES: Said cellular telephone "monitor camera protracted" can also protract or retract and or rotate and maneuver in a full and complete 360 degree angle rotation in synchronization with said reference number 61 monitor screen" further aiding the user in capturing ultra-wide dimensional angles when taking photographs—video recording—selfies—face timing and gaming. Said rear camera(s) can also operate and function in the same manner when programmed via said cellular telephone programming and setting features.

(h). FIG. 6. Shows reference number 72 "full length rear camera design".

ADVANTAGES: Said cellular telephone "full length rear camera design" can rotate and maneuver in a full and complete 360 degree angle rotation while remaining within the frame/body of said cellular telephone fully retracted or while in the course of retracting or while in the course of protracting or while fully protracted via said reference number 69 "joystick protracted" feature or as an alternative via said reference number 83 "protraction button" or via 87 "retraction button" or via reference number 88 "360 degree rotation dial". Said reference numbers 83/87 and 88 are all found at said reference number 82 "cellular telephone touch screen remote control" feature. Said features will help the user in capturing ultra-wide angles and dimensional image(s) when taking photographs—video recording—selfies—face timing and gaming.

(i). FIG. 7. Shows reference number 73 "full length rear camera functions"

ADVANTAGES: Said cellular telephone "full length rear camera functions" is designed to protract or retract and or rotate and maneuver in a full and complete 360 degree angle rotation via said reference number 69 "joystick protracted" feature or as an alternative via said reference number 83 "protraction button" or via said reference number 87 "retraction button" or via said reference number 88 "360 degree rotation dial". Said reference numbers 83/87 and 88 are all found at said reference number 82 "cellular telephone touch screen remote control" feature. Said features will aid the user with capturing ultra-wide angles and dimensional image(s) when taking photographs—video recording—selfies—face timing and gaming.

(j). FIGS. 6/7/8/and 9. Shows said reference number 75 "full length rear camera component".

ADVANTAGES: said cellular telephone "full length rear camera component" consist essentially of a close box containing a sensitized plate or film on which an image is formed when light enters the box through a lens or hole. Said "full length rear camera component" is a featured component for said reference numbers 72 "full length rear camera design" reference number 96 "secondary tech full length rear camera design" reference number 97 "secondary tech full length rear camera protracting and reference number 73 "full length rear camera functions" Said rear camera(s) can also protract or retract and or rotate and maneuver in a full and complete 360 degree angle rotation via said reference number 69 "joystick protracted" feature or as an alternative via said reference number 83 "protraction button" or via reference number 87 "retraction button" or via reference number 88 "360 degree rotation dial". Said reference numbers 83/87 and 88 are all found at reference number 82 "cellular telephone touch screen remote control" feature. Said features will help the user in capturing ultra-wide angles and dimensional image(s) when taking photographs—video recording—selfies—face timing and gaming.

(k). FIG. 16. Shows reference number 76 "monitor screen retracted" FIG. 35. Shows said reference number 76 "full length rear camera retracted". Said reference number 76 are identical for both "monitor screen retracted" and "full length rear camera retracted" because both embodiments operate and function in the same manner as depicted in said figures.

ADVANTAGES: Said cellular telephone FIG. 16 or 35 can also protract or retract and or rotate and maneuver in a full and complete 360 degree angle rotation while in the process of protracting or while fully protracted or while retracting or while fully retracted via said reference number 69 "joystick protracted" feature or as an alternative via said reference number 83 "protraction button" or via reference number 87 "retraction button" or via reference number 88 "360 degree rotation dial". Said features will further help the user in capturing ultra-wide angles and dimensional image(s) when taking photographs—video recording—selfies—face timing and gaming.

(l). FIG. 17. Slows reference number 77 "monitor screen protracting". FIG. 36. Shows said reference number 77 "full length rear camera protracting". Reference numbers are identical for both "monitor screen protracting" and "full length rear camera protracting" because both embodiments operate and function in the same manner as depicted in said figures.

ADVANTAGES: Said cellular telephone FIG. 16 or 35 can also protract or retract and or rotate and maneuver in a full and complete 360 degree angle rotation while in the course of protracting or while fully protracted or while in the course of retracting or while fully retracted via said reference number 69 "joystick protracted" feature or as an alternative via said reference number 83 "protraction button" or via reference number 87 "retraction button" or via reference number 88 "360 degree rotation dial" further assisting the user in capturing ultra-wide angles and dimensional image(s) when taking photographs—video recording—selfies—face timing or gaming. Said reference numbers 83/87 and 88 are all found at said reference number 82 "cellular telephone touch screen remote control" feature.

(m). FIG. 18. Shows reference number 78 "monitor screen at an inclined" angle. FIG. 37. Shows said cellular telephone "full length rear camera at a declined" angle. Said reference numbers are identical because both reference numbers operate and function in the same manner and are both positioned in the same declined position or angle as depicted in said figures. ADVANTAGES: Said cellular telephone FIG. 18 or 37 are designed to protract or retract and or rotate and maneuver in a full and complete 360 degree angle rotation while in the course of protracting or while fully protracted or while in the course of retracting or while fully retracted via reference number 69 "joystick protracted" feature or as an alternative via reference number 83 "protraction button" or via reference number 87 "retraction button" or via reference number 88 "360 degree rotation dial". Said reference numbers 83/87 and 88 are found at reference number 82 "cellular telephone touch screen remote control" feature. Said features will help the user in capturing ultra-wide angles and dimensional images when taking photographs—video recording—selfies—face timing or gaming.

(n). FIG. 19. Shows reference number 79 "monitor screen inclined" angle. FIG. 38 shows said reference number 79 "full length rear camera inclined". Reference numbers are identical because both operate and function in the same manner and are both positioned in the same inclined position or angle as depicted in said in said figures.

ADVANTAGES: Said cellular telephone FIG. 19 or 38 are designed to protract or retract and or rotate and maneuver in a full and complete 360 degree angle rotation while in the course of protracting or while fully protracted or while in the course of retracting or while fully retracted via said reference number 69 "joystick protracted" feature or via reference number 83 "protraction button" or via reference number 87 "retraction button" or via reference number 88 "360 degree rotation dial". Said reference numbers 83/87 and 88 are all found at said reference number 82 "cellular telephone touch screen remote control" feature. Said features will help the user in capturing ultra-wide angles and dimensional images when taking photographs—video recording—selfies—face timing or gaming.

(o). FIG. 20. Shows reference number 80 "monitor screen horizontal" angle. FIG. 39 shows said reference number 80 "full length rear camera horizontal angle. Said reference numbers are identical for because both reference numbers operate and function in the same manner and are both positioned in the same horizontal position or angle as depicted in said figures.

ADVANTAGES: Said cellular telephone FIG. 20 or 39 are designed to protract or retract and or rotate and maneuver in a full and complete 360 degree angle rotation via reference number 69 "joystick protracted" feature or as an alternative via reference number 83 "protraction button" or via reference number 87 "retraction button" or via reference number 88 "360 degree rotation dial" and can also rotate and maneuver in said 360 degree angle rotation while in the course of protracting or while fully protracted or while in the course of retracting or while fully retracting further assisting the user in capturing ultra-wide angles and dimensional images while taking photographs—video recording—selfies—face timing or gaming.

(p). FIG. 21. Shows reference number 81 "monitor screen reverse horizontal" angle. FIG. 40 shows said reference number 81 "full length rear camera reverse horizontal" angle. Said reference number 179 are identical because both reference numbers operate and function in the same manner and are both positioned in said reverse horizontal position or angle as depicted in said figures.

ADVANTAGES: Said cellular telephone FIG. 20 or 40 are designed to protract or retract and or rotate and maneuver in a full and complete 360 degree angle rotation via reference number 83 "protraction button" or via reference number 87 "retraction button" or via reference number 88 "360 degree rotation dial". Said reference numbers 20 or 40 can also rotate and maneuver in said 360 degree angle rotation while protracting or while fully protracted or while retracting or while fully retracted further aiding the user in capturing ultra-wide angles and dimensional images when taking photographs—video recording—selfies face timing or gaming.

(q). FIG. 10. Shows reference number 82 "cellular telephone touch screen remote control" feature.

ADVANTAGES: The embodiments of said cellular telephone touch screen remote control feature will allow the user to operate and control their cellular telephone as follows: Reference number 83 "protraction button" will allow the user to protract said cellular telephone "monitor screen" and "monitor camera" in synchronization. Said rear camera(s) can also be protracted by using said "protraction button" when programmed via said cellular telephone programming and setting features. Reference number 84 "volume buttons" will allow the user to adjust and control said cellular telephone volume frequencies. Reference number 85 "remote control power button" will allow the user to turn said cellular telephone touch screen remote control power on when initially pressed down by the user and to cut said cellular telephone touch screen remote control power off when pressed down a second time by the user.

Reference number 86 "remote control input" will allow the user to charge said cellular telephone touch screen remote control via said cellular telephone battery charger when plugged into an electric socket or conductor. Reference number 87 "retraction button" will allow the user to retract said cellular telephone "monitor screen" and "monitor camera" in synchronization. Said rear camera(s) can also retract by using said "retraction button" when programmed via said cellular telephone programming and setting features. Reference number 88 "360 degree rotation dial" will allow the user to rotate and maneuver said cellular telephone "monitor screen" and "monitor camera" in synchronization in a full and complete 360 degree angle rotation. Said rear camera(s) can also rotate and maneuver in the same manner when programmed via said cellular telephone programming and setting features. Reference number 89 "snap picture button" will allow the user to snap photographs capturing all images that's depicted on the user's cellular telephone "monitor screen".

Reference number 90 "speaker pyramid button" will allow the user to protract said cellular telephone "speaker pyramid" when initially pressed down by the user and to retract said "speaker pyramid" when pressed down by the user a second time. This will revert said "speaker pyramid" back to said reference number 66 "speaker/transmitter button". Reference number 91 "cellular telephone programming and setting button" will allow the user to maintain full and complete control and access to their cellular telephone within its entirety. Reference number 92 "touch screen remote control monitor" will allow the user to physically see all depicted images that appears on the users cellular telephone "monitor screen".

(r). FIG. 8. Shows reference number 96 "secondary tech full length rear camera design".

ADVANTAGES: Said cellular telephone "full length rear camera design" will allow the user to protract or retract and or rotate and maneuver said "secondary tech full length rear camera design" in a full and complete 360 degree angle rotation while in the course of protracting or while fully protracted or while in the course of retracting or while fully retracted further assisting the user in capturing ultra-wide angles and dimensional images when taking photographs—video recording—selfies face timing or gaming (s). FIG. 9. Shows reference number 97 "secondary tech full length rear camera protracting"

ADVANTAGES: Said cellular telephone "secondary tech full length rear camera protracting" will allow the user to protract or retract and or rotate and maneuver said "secondary tech full length rear camera protracting" in a full and complete 360 degree angle rotation while in the course of protracting or while fully protracted or while in the course of retracting or while fully retracted further assisting the user in capturing ultra-wide angles and dimensional images while taking photographs—video recording—selfies—face timing or gaming.

(t). FIG. 53. Shows reference number 98 "cellular telephone touch screen remote control compartment".

ADVANTAGES: Said cellular telephone touch screen remote control compartment" is a hidden compartment which is found at the bottom of said cellular telephone which will allow the user to safely secure and carry said cellular telephone touch screen remote control. Said "cellular telephone touch screen remote control compartment slowly slides from within the inner body of said cellular telephone when initially pressed in by the user and slowly slides back inside of the inner body of said cellular telephone when pressed in by the user reverting to said button.

(u). Cellular telephone "motion sensor" feature:

ADVANTAGES: Said cellular telephone "motion sensor" is designed to detect measure and record physical movements and respond as by transmitting information initiating changes or operation controls. Said "motion sensor" feature will allow said cellular telephone reference numbers 61 "monitor screen and reference number 70 "monitor camera" to physically rotate and maneuver in a full and complete 360 degree angle rotation following motions and movements while retaining a visual of said moving image(s) with the user's cellular telephone "monitor screen". Said cellular telephone rear camera(s) can also operate and function in the same manner when programmed via said cellular telephone programming and setting features. Further helping the user in capturing exotic angles and dimensional images when taking photographs—video recording—selfies or gaming.

CONCLUSION, RAMIFICATIONS AND SCOPE

Accordingly, the reader will see that the various embodiments of said cellular telephone will provide the user with a vast variety of options when taking photographs—video recording—selfies—face timing or gaming. And will further provide the user with a much larger and protractible speaker system when communicating via said cellular telephone speaker phone or while listening to music via said cellular telephone. And further will allow the user to safely secure and carry said cellular telephone touch screen remote control in a convenient and accessible location.

Furthermore, said cellular telephone and its embodiments has the additional advantages in that:

said "joystick button" provides an easy and accessible way for the user to protract said joystick feature.

Said joystick feature will provide the user with the option to protract or retract and or rotate and maneuver said cellular telephone monitor screen and monitor camera in synchronization in a full and complete 360 degree angle rotation while in the course of protracting or while fully protracted or while in the course in the course of retracting or while fully retracted which will allow the user to capture never before obtainable angles and images in a convenient way. Further said joystick feature will allow the user to snap desirable pictures.

Said "speaker/transmitter button" will provide the user with an ear crisp and louder sound through a much larger and protractible sound system.

Said "speaker/transmitter pyramid protracted will provide the user with a four-level speaker pyramid sound system which will emit and receive undistorted sound when communicating via said cellular telephone speaker phone or while listening to music via said cellular telephone and will further provide the user with other options an innovative design.

Said "cellular telephone touch screen remote control" feature will allow the user to capture additional ultra-wide angles and dimensional images via reference number 92 "touch screen remote control monitor" in which retains all image(s) depicted on the users cellular telephone this feature will allow the user to position there cellular telephone in a upright position on any sustainable surface and protract or retract and or rotate and maneuver said cellular telephone monitor screen and monitor camera in synchronization. Said cellular telephone rear camera(s) can also operate and function in the same manner when. programmed via said cellular telephone programming and setting features. Said features will also allow the user to participate in photographs and video footage while maintaining complete access and control of their cellular telephone within its entirety. Said "cellular telephone touch screen remote control" feature will also allow the user to snap desirable photographs and protract said reference number 66 "speaker/transmitter button" which will metamorphose into said reference number 67 "speaker/transmitter pyramid protracted"

Furthermore, said "cellular telephone touch screen remote control compartment" will provide the user with a secure and convenient way to carry and protect said cellular telephone touch screen remote control".

I claim:
1. A cellular telephone comprising:
a main body;
a monitor screen;
a monitor camera;
at least one rear-facing camera;
a processor;
a joystick attached to the main body, wherein the joystick is configured to be tilted or twisted in various directions,
wherein the processor is configured to move said monitor screen and monitor camera in synchronization with one another and wherein said rear-facing camera can also move in the same manner such that:
when a user twists said joystick to the right, the processor will slowly protract said monitor screen and monitor camera in synchronization creating a zooming effect;
when the user moves said joystick downward, the processor will slowly tilt said monitor screen and said monitor camera in synchronization in a downward angle;
when the user moves said joystick upward, the processor will slowly tilt said monitor screen and said monitor camera in synchronization in an upward angle;
when the user moves the joystick to the right, the processor will slowly tilt said monitor screen and said monitor camera in synchronization to the right;
when the user moves the joystick to the left, the processor will slowly tilt said monitor screen and said monitor camera in synchronization to the left;
when the user moves the joystick in a circular motion, the processor will slowly rotate and maneuver said monitor screen and monitor camera in synchronization in a 360 degree angle;
when the user twists the joystick to the left, the processor will slowly retract said monitor screen and monitor camera in synchronization into the main body of said telephone;
when the user taps downwardly on the joystick, the processor will capture a photograph with the monitor camera or rear-facing camera; and
can slowly retract said joystick into the main body of said cellular telephone.
2. A cellular telephone system comprising:
a cellular telephone comprising:
a main body;
a monitor camera;
a monitor screen;
at least one rear-facing camera;
a processor;
a speaker pyramid button configured to operate as a speaker, and further configured to, when depressed, protract said speaker pyramid button; and a motion sensor configured to detect, measure, and record physical movements of the cellular telephone and respond by transmitting information or initiating changes to the cellular telephone settings or controls, wherein said motion sensor will allow the monitor screen and monitor camera or rear facing camera to rotate and maneuver in synchronous in a full 360 degree angle thereby following motions and movements of a subject being recorded or photographed while retaining a visual of said subject;

a cellular telephone remote control configured to operate and control said cellular telephone from a distance using radio waves, said cellular telephone touch screen remote control comprising:

a protraction button configured to, when depressed, slowly protract said monitor screen and monitor camera in synchronization or said rear-facing camera of said cellular telephone when programed via said cellular telephone programming and settings feature;

a pair of volume buttons configured to control and adjust said cellular telephone volume levels from a distance;

a power button configured to turn said cellular telephone on and off;

a remote control power input configured to plug into a cellular telephone battery charger thereby providing power to the cellular telephone remote control;

a retraction button configured to slowly retract said monitor screen and monitor camera in synchronization reverting inside of said main body of said cellular telephone, said rear facing-camera can also rotate and maneuver in the same manner when programmed via said cellular telephone programming and setting features;

or a cellular telephone programming and setting button configured to allow the user to access and log into said cellular telephone programming and settings features including accessing photographs, video recordings and text message applications and any other data stored on said cellular telephone; and a touch screen remote control monitor configured to depict image(s) and program settings that appear on the monitor screen of the cellular telephone, wherein said cellular telephone further comprises a compartment at the bottom of the cellular telephone configured to store said cellular telephone remote control, wherein when the cellular telephone remote control is stored in the compartment, the compartment is further configured to cause the cellular telephone remote control to slide out when the cellular telephone remote control is briefly pressed inward by the user, wherein said cellular telephone remote control is configured so that the cellular telephone remote control slowly retracts into the compartment when the cellular telephone remote control is pressed inward by the user, thereby locking and securing said cellular telephone remote control in the cellular telephone, and wherein said cellular telephone is configured so that the cellular telephone remote control can only be removed from the compartment when an identification code is provided.

\* \* \* \* \*